United States Patent
Tomofuji et al.

(12) 
(10) Patent No.: US 6,411,429 B1
(45) Date of Patent: Jun. 25, 2002

(54) OPTICAL AMPLIFYING APPARATUS, WIDE-BAND OPTICAL AMPLIFYING APPARATUS, AND OPTICAL COMMUNICATION SYSTEM

(75) Inventors: Hiroaki Tomofuji; Motoyoshi Sekiya; Takeshi Sakamoto, all of Kawasaki; Makoto Murakami, Sapporo; Chihiro Ohshima; Yoshihito Onoda, both of Kawasaki, all of (JP)

(73) Assignee: Fujitsu Limited, Kawasaki ( * ) Notice: Subject to any disclaimer, the term of this patent is extended or adjusted under 35 U.S.C. 154(b) by 0 days.

(21) Appl. No.: 09/667,433

(22) Filed: Sep. 22, 2000

(30) Foreign Application Priority Data

Oct. 19, 1999 (JP) .......................................... 11-296800
Nov. 25, 1999 (JP) .......................................... 11-334455

(51) Int. Cl.$^7$ ................................................. H01S 3/00
(52) U.S. Cl. ..................................... 359/337; 359/337.4
(58) Field of Search ............................... 359/337, 337.4, 359/341.42

(56) References Cited

U.S. PATENT DOCUMENTS 6,055,094 A * 4/2000 Shima et al. ................ 359/341
6,061,171 A * 5/2000 Taylor et al. ................ 359/341

* cited by examiner

*Primary Examiner*—Mark Hellner
(74) *Attorney, Agent, or Firm*—Staas & Halsey LLP

(57) ABSTRACT

An optical amplifying apparatus for widening the input dynamic range and lowering noises. The optical amplifying apparatus comprises a first optical amplifier, an optical attenuator, a second optical amplifier and a controller. The first optical amplifier changes the target value of output light when the variance amount of input light reaches a predetermined value. The controller changes the attenuation amount of attenuator in accordance with a difference between the target value and the changed target value of the output light level of the first optical amplifier, when the target value of the output light level of the first optical amplifier is changed.

48 Claims, 27 Drawing Sheets

FIG. 3
A.
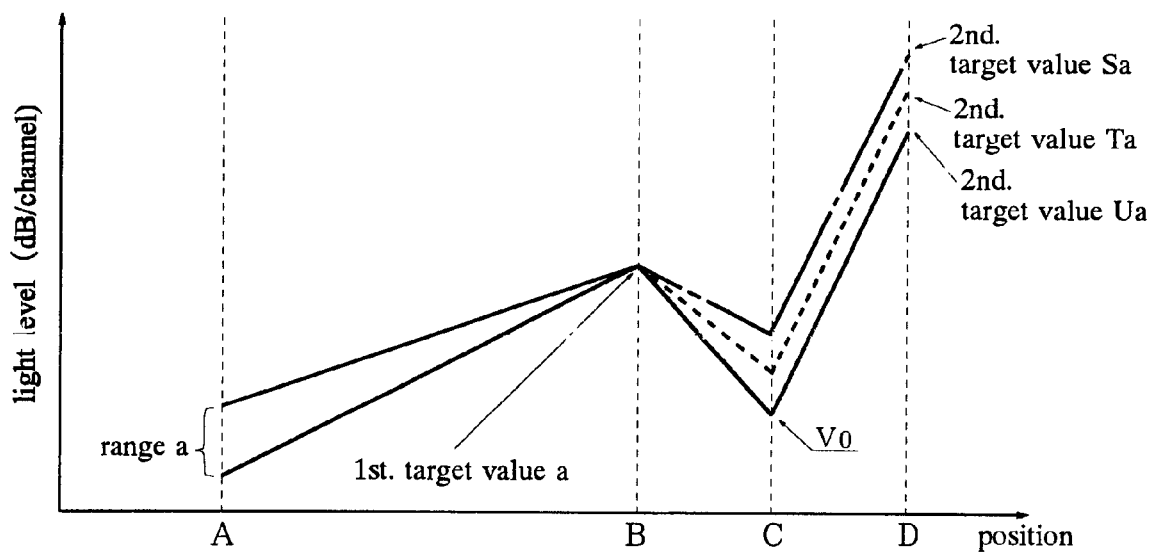
B.
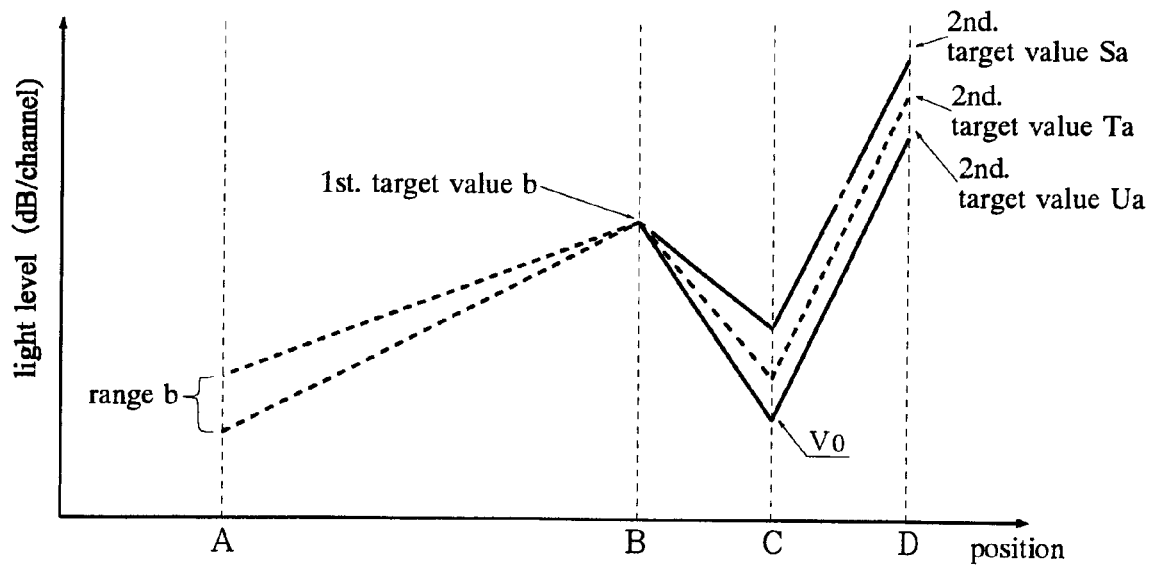

FIG. 7

| mode | front optical amplifying part 101 | | | front optical attenuatting part 102 | middle optical amplifying part 103 | | | back optical attenuatting part 104 | back optical amplifying part 105 | | | gain of amp.101 + gain of amp.103 | total gain |
|---|---|---|---|---|---|---|---|---|---|---|---|---|---|
| | input dBm/ch | gain dB | output dBm/ch | attenuation dB | input dBm/ch | gain dB | output dBm/ch | attenuation dB | input dBm/ch | gain dB | output dBm/ch | dB | dB |
| in-mode 1 | Pin+10 | Gr1-10 | P0 | 12 | P0-12 | 12 | P0 | 2 | P0-2 | 7 | P0+5 | Gr1+2 | Gr2+5 |
| | Pin+5 | Gr1-5 | P0 | 7 | P0-7 | 7 | P0 | 2 | P0-2 | 7 | P0+5 | Gr1+2 | Gr2+10 |
| | Pin | Gr1-5 | P0-5 | 2 | P0-7 | 7 | P0 | 2 | P0-2 | 7 | P0+5 | Gr1+2 | Gr2+15 |
| in-mode 2 | Pin+15 | Gr1-15 | P0 | 12 | P0-12 | 17 | P0+5 | 7 | P0-2 | 7 | P0+5 | Gr1+2 | Gr2 |
| | Pin+10 | Gr1-10 | P0 | 7 | P0-7 | 12 | P0+5 | 7 | P0-2 | 7 | P0+5 | Gr1+2 | Gr2+5 |
| | Pin+5 | Gr1-5 | P0 | 2 | P0-2 | 7 | P0+5 | 7 | P0-2 | 7 | P0+5 | Gr1+2 | Gr2+10 |

FIG. 8
A. level diagram in the in-mode 1
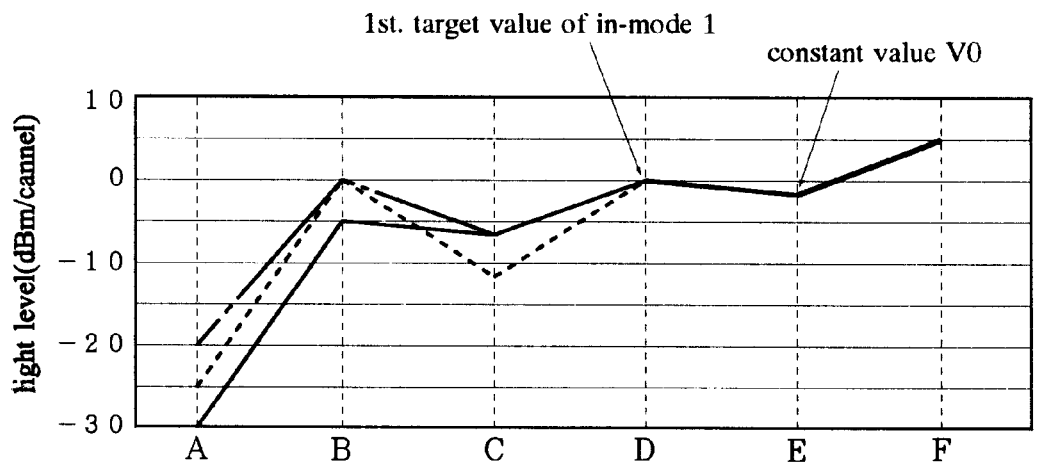
B. level diagram in the in-mode 2
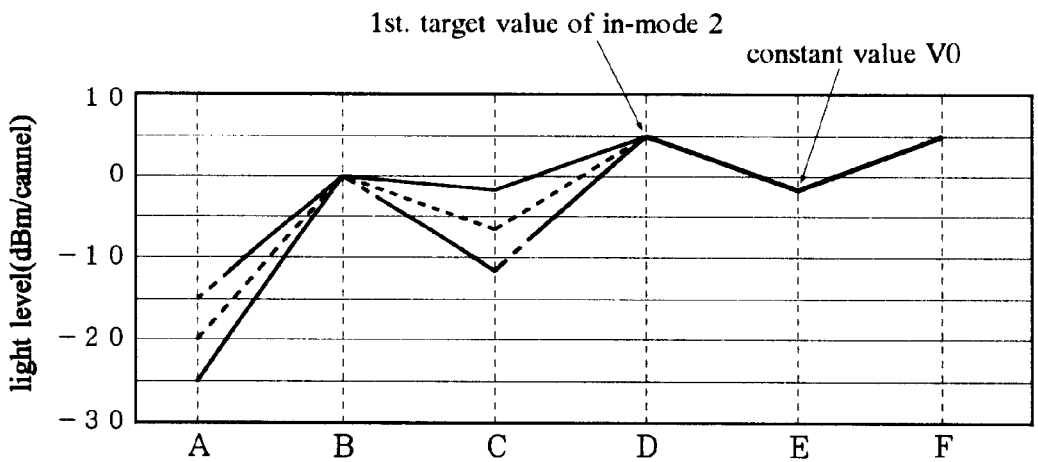
C.
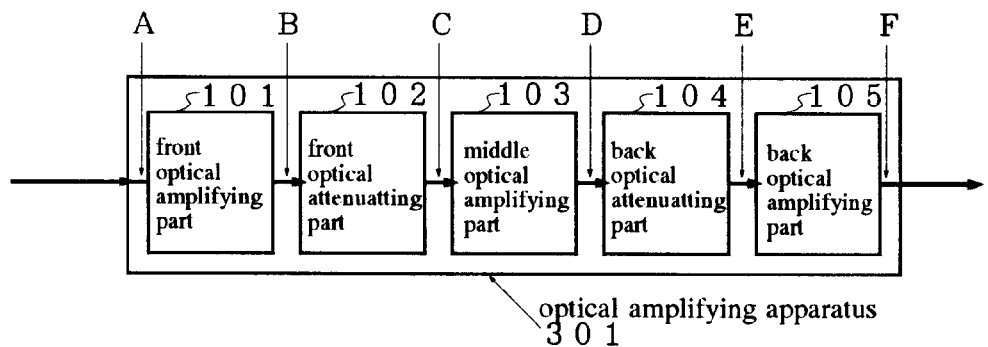

FIG. 9
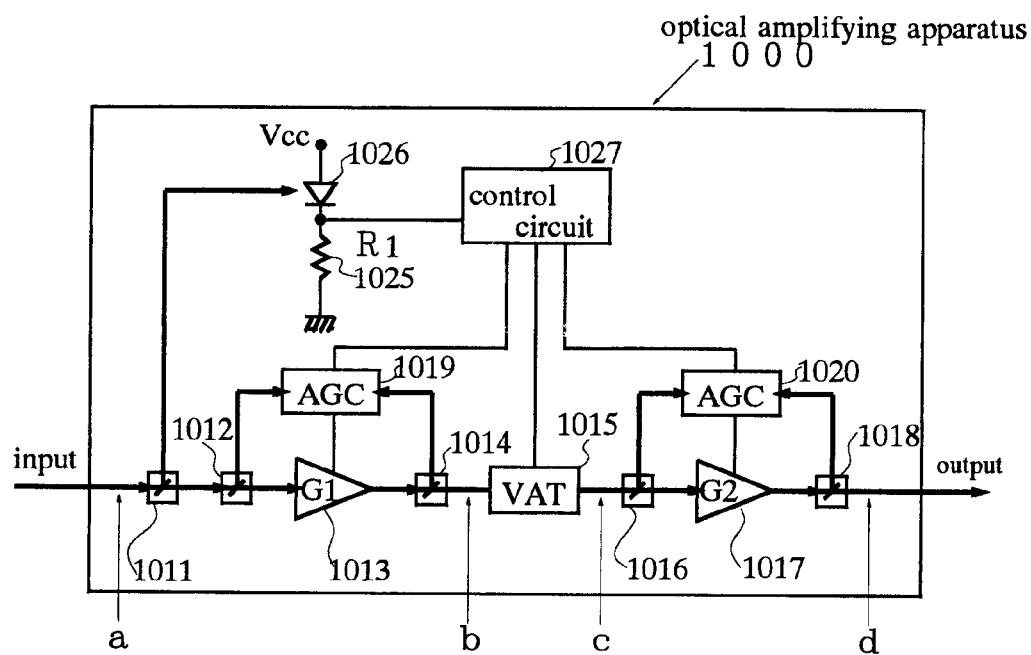
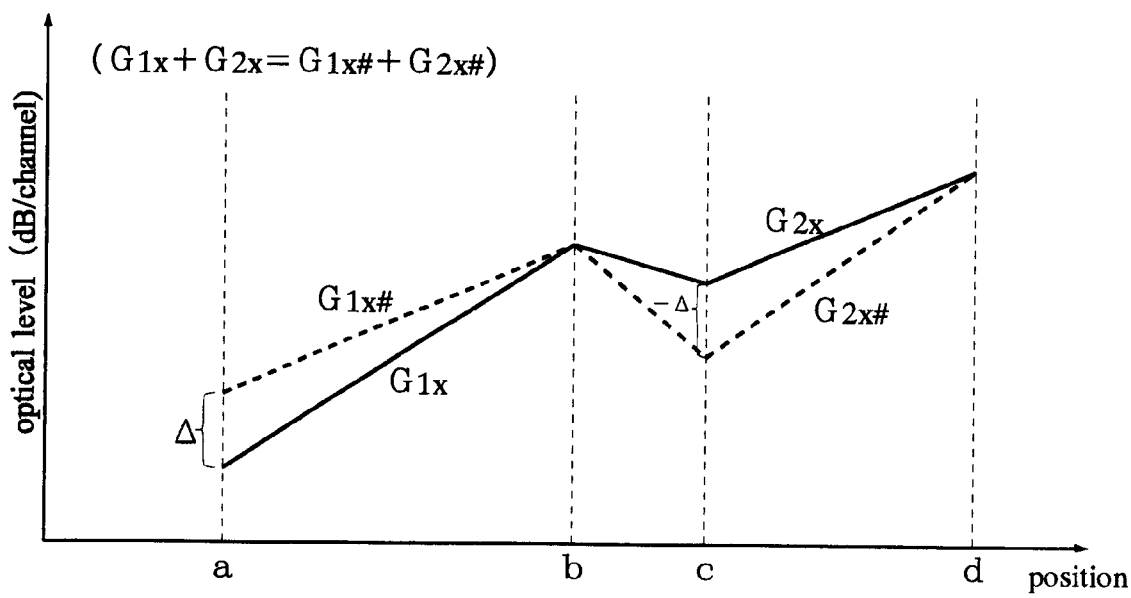

F I G. 11

| optical amplifier 1013 | | | VAT 1015 | optical amplifier 1017 | | | gain of amp.1013 + gain of amp.1017 | total gain |
|---|---|---|---|---|---|---|---|---|
| input dBm/ch | gain dB | output dBm/ch | attenuation dB | input dBm/ch | gain dB | output dBm/ch | dB | dB |
| Pin+15 | Gr1-15 | P0 | 17 | P0-17 | 22 | P0+5 | Gr1+7 | Gr2 |
| Pin+10 | Gr1-10 | P0 | 12 | P0-12 | 17 | P0+5 | Gr1+7 | Gr2+5 |
| Pin+5 | Gr1-5 | P0 | 7 | P0-7 | 12 | P0+5 | Gr1+7 | Gr2+10 |
| Pin | Gr1-5 | P0 | 2 | P0-2 | 7 | P0+5 | Gr1+7 | Gr2+15 |

F I G. 15
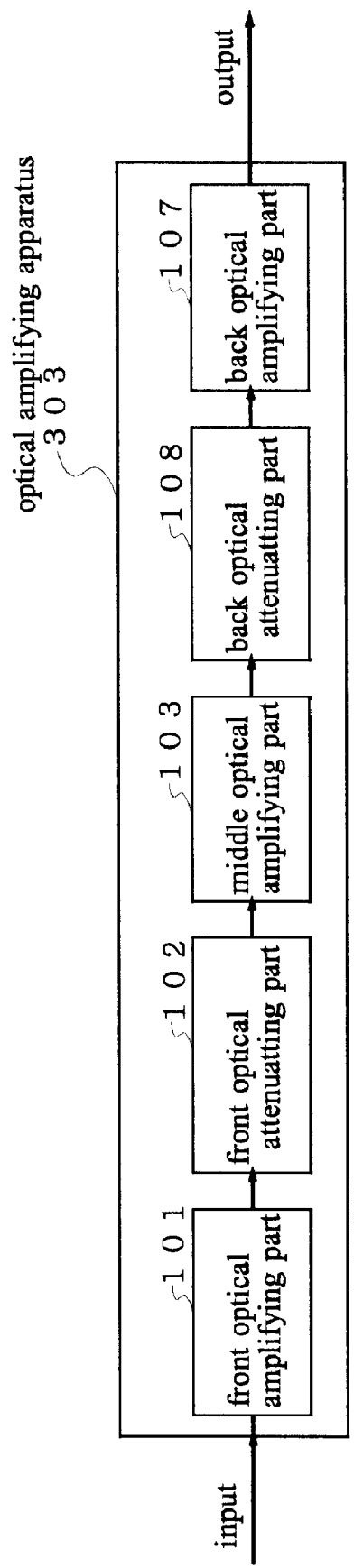

F I G. 17

| mode | system gain dB | amp.101+att.102+amp.103 | | | att.108 | | amp.107 | | kind |
|---|---|---|---|---|---|---|---|---|---|
| | | input dBm/ch | output dBm/ch | gain dB | VAT+ATT dB | DCF dB | input dBm/ch | output dBm/ch | gain dB | |
| out-mode 1 | 25~15 | -21~-11 | +2 | 23~13 | 22 | 3 | -23 | 4 | 27 | NZ-DSF |
| | 30~20 | -26~-16 | -3 | 23~13 | 14 | 6 | -23 | 4 | 27 | |
| out-mode 2 | 25~19 | -17~-11 | +2 | 19~13 | 8 | 13 | -19 | 8 | 27 | SMF |
| | 30~24 | -22~-16 | -3 | 19~13 | 0 | 16 | -19 | 8 | 27 | |

F I G. 18

| system gain dB | optical amplifier 1013 | | | VAT 1015 | | optical amplifier 1017 | | | sum of gain dB | kind |
|---|---|---|---|---|---|---|---|---|---|---|
| | input dBm/ch | output dBm/ch | gain dB | VAT dB | DCF dB | input dBm/ch | output dBm/ch | gain dB | | |
| 15 | -11 | +2 | 13 | 33 | 3 | -34 | 4 | 38 | 51 | NZ-DSF |
| 30 | -26 | +2 | 28 | 15 | 6 | -19 | 4 | 23 | 51 | |
| 19 | -11 | +2 | 13 | 19 | 13 | -30 | 8 | 38 | 51 | SMF |
| 30 | -22 | +2 | 24 | 5 | 16 | -19 | 8 | 27 | 51 | |

OPTICAL AMPLIFYING APPARATUS, WIDE-BAND OPTICAL AMPLIFYING APPARATUS, AND OPTICAL COMMUNICATION SYSTEM

CROSS-REFERENCE TO RELATED APPLICATIONS

This application is related to U.S. patent application Ser. No. 09/264902, filed Mar. 9, 1999, which is incorporated herein by reference.

BACKGROUND OF THE INVENTION

1. Field of the Invention

The present invention relates to an optical amplifying apparatus to be employed in an optical repeater station of an optical communication system and, more particularly, to an optical amplifying apparatus and a wide-band optical amplifying apparatus for realizing a wider input dynamic range and a lower noise. The invention further relates to anoptical communication system including those apparatus.

At present, an optical transmission system with a super-long distance and a high capacity has been demanded for constructing the future multimedia network. As a system for realizing that high capacity, a wavelength-division multiplexing (as will be abbreviated into the "WDM") system has been investigated and developed because of an advantage that it can utilize the wide band and the high capacity of optical fibers.

Especially the long-distant optical communication system is required to have an optical amplifying apparatus for amplifying the WDM optical signals, because these WDM optical signals are attenuated while being transmitted in the super-long distant optical fiber. This optical amplifying apparatus is demanded to achieve a wide input dynamic range and a low noise for the super-long distance transmissions because the distances and transmission losses are different between optical repeater stations.

2. Description of the Related Art

In the optical communication system for transmitting the WDM optical signals, the transmission distance is restricted by the gain gradient based on the gain-wavelength characteristics of the optical amplifying apparatus, if this optical amplifying apparatus is inserted into the optical transmission line. The light is amplified by a semiconductor laser or a rare earth element doped optical fiber amplifier, the gain characteristics of which have a wavelength dependency.

If the optical amplifying apparatus are connected in tandem for elongating the transmission distance, therefore, the gain gradients to be made in the individual optical amplifying apparatus are accumulated so that the optical signal-to-noise ratio (as will be abbreviated into the "optical-SNR") is lowered in the channel of a lower optical level of the WDM optical signal whereas the waveforms are degraded by the nonlinear optical effects or the like in the channel of a higher optical level of the WDM optical signals.

On the other hand, the system gain of the optical communication system is different at the individual optical repeater stations because these optical repeater stations have different distances. The system gain is the difference in the optical levels to be transmitted/received between the optical repeater stations, i.e., the maximum loss value to be obtained between the optical repeater stations and, more specifically, is the value which is calculated by adding a margin to the transmission loss between the optical repeater stations. The transmission loss is dependent not only upon the distance between the optical repeater stations but also upon the temperature fluctuation or the aging of the optical transmission line.

Where the optical amplifying apparatus is to be employed for the optical repeater station, it is demanded to have a wide input dynamic range for matching various system gains. A method for matching the various system gains is exemplified by inputting input light, after this level was lowered by an optical attenuator, to the optical amplifying apparatus. In this method, the fluctuation of the system gain is compensated by the optical attenuator. Where this optical attenuator is not utilized, the input dynamic range of the optical amplifying apparatus has to be wider than the difference between the minimum system gain and the maximum system gain of the optical communication system.

Moreover, it is known that the optical signals to be transmitted through the optical transmission line such as the optical fibers are distorted by the nonlinear optical effects such as the self-phase modulations, the four-wave mixing or the cross phase modulations. These nonlinear optical effects are raised as the optical level of the optical signals to be inputted to the transmission line is raised, so that the optical level of the optical signals to be inputted to the optical transmission line is restricted. The degree of the nonlinear optical effects are different according to the kinds of optical fibers such as the dispersion shift optical fibers (as will be abbreviated into the "DSF"), the non-zero dispersion shift fibers (as will be abbreviated into the "NZ-DSF") or the single-mode optical fibers (as will be abbreviated into the "SMF"), so that the upper limits of the optical levels of the optical signals are also different. of the SMF, the NZ-DSF and the DSF, for example, the SMF has the largest upper limit, and the DSF has the smallest upper limit. This difference in the upper limits is as large as several dB. In order that a single optical amplifying apparatus may cover those kinds of optical fibers, the optical attenuator is connected in the prior art with the output terminals of the optical amplifying apparatus.

In order to ensure the safety of the operator, moreover, the optical amplifying apparatus has an output terminal opening detecting function. This output terminal opening detecting function is to detect whether or not the output terminals of the optical amplifying apparatus are opened, in terms of a reflection light reflected from the open terminals, and to lower the optical level of the output light of the optical amplifying apparatus if the terminals are opened.

Here, the optical amplifying apparatus may be degraded in its noise figure if it covers a wider input dynamic range, because the output light level generally has an upper limit. Where the optical attenuator is utilized, as described above, for covering the wider input dynamic range, the optical amplifying apparatus is designed to match the maximum system gain and is used by lowering the input light level with the optical attenuator. As a result, the optical amplifying apparatus is employed with its optical-SNR being degraded, so that its transmission distance is reduced.

Moreover, the optical amplifying apparatus has to be provided with a variety of output light levels so that it may be able to be connected with many kinds of optical fibers laid already. If this necessity for the connections with the existing various optical fibers is to be satisfied by the optical attenuator, whether or not the output terminals of the optical amplifying apparatus are opened has to be detected not only at the output terminals of the optical amplifying apparatus but also at the output terminals of the optical attenuator. This m makes it necessary to detect the weak reflection light and makes it difficult to detect the opening of the output terminals.

SUMMARY OF THE INVENTION

An object of the invention is to provide an optical amplifying apparatus with little degradation in noise figure but a wide input dynamic range.

Another object of the invention is to provide an optical amplifying apparatus having various output light levels so that it can be connected with many kinds of laid optical fibers.

Another object of the invention is to provide an optical amplifying apparatus which can be connected with many kinds of optical fibers without degrading the output terminal opening detecting function.

Another object of the invention is to provide an optical amplifying apparatus capable of amplifying light having a wider bandwidth.

Still another object of the invention is to provide an optical communication system in which an optical amplifying apparatus having a wide input dynamic range without a degradation in noise figure is employed as an optical repeater station or the like.

The above-specified objects are achieved by an optical amplifying apparatus which comprises a first optical amplifying part, an optical attenuating part and a second optical amplifying part connected in tandem and a controlling part, wherein the controlling part controls the attenuation amount of the optical attenuating part in accordance with a difference of the target values of output light level corresponding to the variation amount of the input light of the first optical amplifying part or in accordance with a difference of the target values of the output light level corresponding to the variation amount of the output light of the second optical amplifying part.

Moreover, the above-specified objects are achieved by a wide-band optical amplifying apparatus which wavelength-divides input light over a wide-wavelength band and amplifies the input light in every divided wavelength band by the above optical amplifying apparatus.

Moreover, the objects are achieved by an optical communication system comprising the optical amplifying apparatus or the wide-band optical amplifying apparatus in at least one of an optical sending station, an optical repeater station and an optical receiving station.

For example, when the target value of output light level of the first optical amplifying part is changed, the controlling part changes the attenuation amount of the optical attenuating part in accordance with a difference between the target value and the changed target value. On the other hand, when the target value of the output light level of the second optical amplifying part is changed, the controlling part changes the attenuation amount of the optical attenuating part in accordance with a difference between the target value and the changed target value. Moreover, the predetermined value of the input light level is a value within one of a plurality of divided ranges of input light level and each target value of the output light level of the first optical amplifying part is respectively set in every divided range.

The optical amplifying apparatus of the invention can widen the input dynamic range without a degradation in noise figure. Moreover, a monitor circuit for detecting the input light level also covers a wide. dynamic range. The optical amplifying apparatus of the invention can be connected with many kinds of optical fibers without degrading the output terminal opening detecting function. The optical amplifying apparatus of the invention can amplify light having a wide wavelength band since it amplifies a plurality of wavelength bands. The optical amplifying apparatus can adapt to various kinds of optical transmission lines. This leads to effectively exploiting laid optical transmission lines. In addition, the optical amplifying apparatus can transmit in longer distance, resulting in reducing the number of optical repeater stations.

BRIEF DESCRIPTION OF THE DRAWING

The nature, principle, and utility of the invention will become more apparent from the following detailed description when read in conjunction with the accompanying drawings in which like parts are designated by identical reference numbers, in which:

FIGS. 3A and 3B are graphs showing level diagrams in the optical amplifying apparatus of the first embodiment;

FIG. 7 is a diagram enumerating the simulation results of a level diagram in the optical amplifying apparatus of the second embodiment;

FIGS. 8A to 8C are diagrams showing level diagrams in the optical amplifying apparatus of the second embodiment;

FIG. 9 presents diagrams showing a construction and a level diagram of an optical amplifying apparatus to be compared with the second embodiment;

FIG. 11 is a diagram tabulating simulation results of a level diagram in an optical amplifying apparatus to be compared with the second embodiment;

FIG. 15 is a diagram showing a construction of an optical amplifying apparatus according to a fourth embodiment;

FIG. 17 is a diagram enumerating the simulation results of a level diagram in the optical amplifying apparatus of the fourth embodiment;

FIG. 18 is a diagram tabulating simulation results of a level diagram in an optical amplifying apparatus to be compared;

DESCRIPTION OF THE PREFERRED EMBODIMENTS

Figure 1:
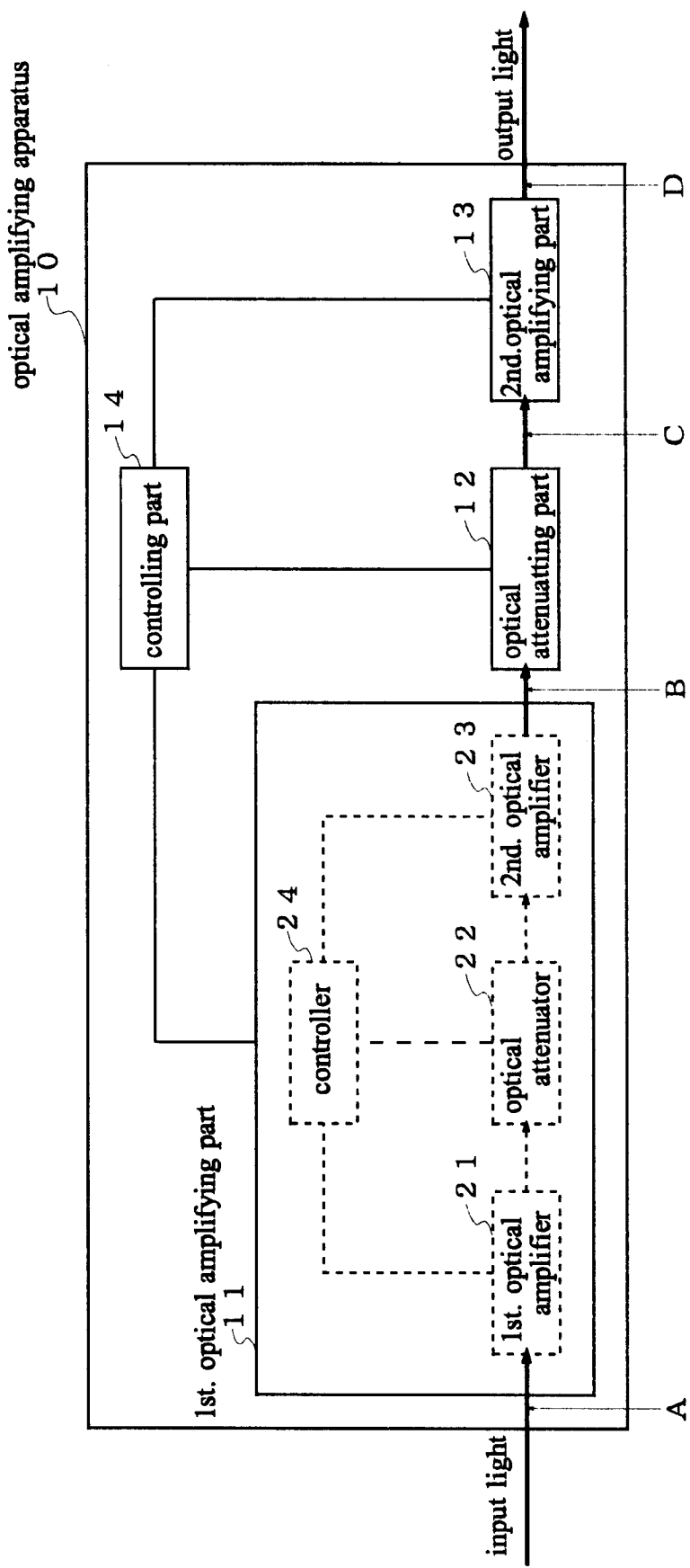
FIG. 1 is a diagram showing a construction of an optical amplifying apparatus according to a first embodiment.

Embodiments of the invention will be described with reference to the accompanying drawings. In these Figures, the same constructions are designated by the same reference numerals, and their repeated description may be omitted.

First Embodiment

In FIG. 1, an input light, as inputted to an optical amplifying apparatus 10, is inputted to a first optical amplifying part 11. This first optical amplifying part 11 is an optical amplifying part for changing the target value of output light level (optical level of output light), where the input light changes to a predetermined value. The output light of the first optical amplifying part 11 is outputted to an optical attenuating part 12. This optical attenuating part 12 attenuates the output light of the first optical amplifying part 11 and outputs its output light to a second optical amplifying part 13. This second optical amplifying part 13 amplifies the output light of the optical attenuating part 12 and outputs its output light as the output light of the optical amplifying apparatus 10.

This optical amplifying apparatus 10 is provided with a controlling part 14 for changing the attenuation amount of the optical attenuating part 12. The controlling part 14 changes, when it changes the target value of output light level of the first optical amplifying part 11, the attenuation amount of the optical attenuating part 12 in accordance with the difference between the target value and the changed target value of output light level of the first optical amplifying part 11.

Figure 2:
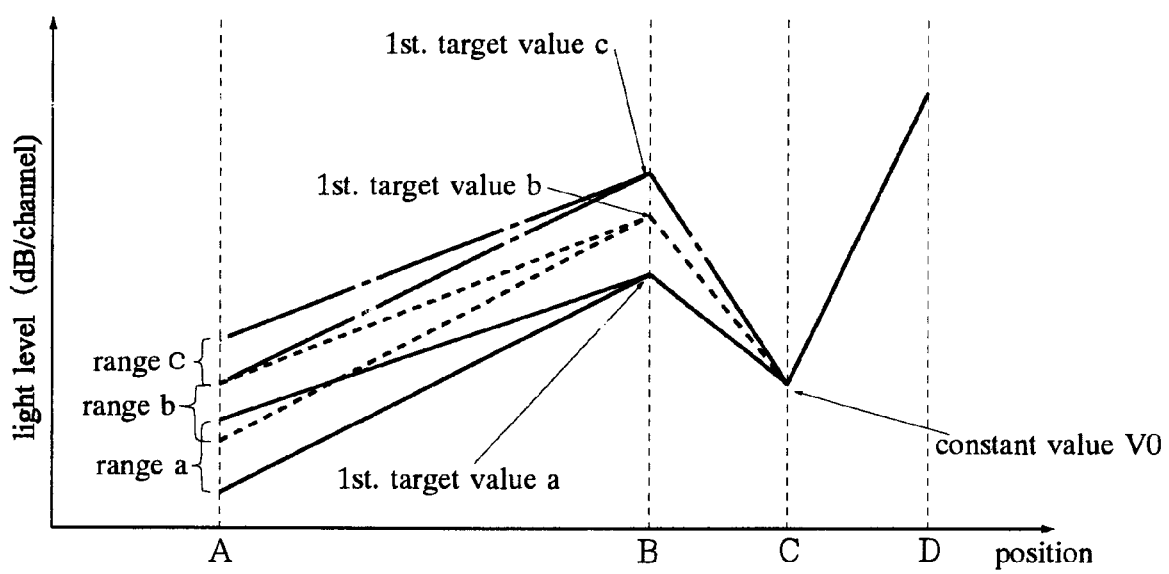
FIG. 2 is a graph showing a level diagram in the optical amplifying apparatus of the first embodiment.

The predetermined value of the input light is a plurality of values sectioned for predetermined ranges from the light level of the input light, and the target value of output light levels of the first optical amplifying part 11 are set to the individual sectioned values. For example, FIG. 2 shows a level diagram of the case in which the modes (e.g., the in-modes) of the input light are three, for example. In an in-mode a of a range a, a first target value a is set as a first target value; in an in-mode b of a range b, a first target value b is set as the first target value; and in an in-mode c of a range c, a first target value c is set as the first target value.

Here, the individual ranges are defined such that portions of the ranges may overlap, as for the range a and the range b, or such that the boundaries of the ranges may contact with each other, as for the range b and the range c.

In FIGS. 2 and 3, the ordinates indicate the light level (dBm/channel), and the abscissas indicate the position. Positions A, B, C and D correspond to portions A, B, C and D, respectively, as shown in FIG. 1. Specifically: the portion A is located on the input side of the first optical amplifying part 11; the portion B is located between the first optical amplifying part 11 and the optical attenuating part 12; the portion C is located between the optical attenuating part 12 and the second optical amplifying part 13; and the portion D is located on the output side of the second optical amplifying part 13.

Where an in-mode is selected in the optical amplifying apparatus 10, the output light level of the first optical amplifying part 11 does not depend on the input light level (optical level of input light) within the range but is fixed substantially at the first target value corresponding to that in-mode.

Where the in-mode a is selected as the mode of the input light, as indicated by solid lines in FIG. 2, the output (at the portion B of FIG. 2) of the first optical amplifying part 11 is fixed substantially at the first target value a even if the input light level changes within the range a.

Here in FIG. 2, the level diagram of the in-mode b is indicated by broken lines, and the level diagram of the in-mode c is indicated by single-dotted lines. The level diagram from the portion C to the portion D is apparently indicated exclusively by the solid lines because the level diagrams of the in-mode a, the in-mode b and the in-mode c are identical.

Where the mode of the input light is changed, the attenuation amount of the optical attenuating part 12 is adjusted by an amount of the same sign but smaller in the absolute value than a value X which is calculated by subtracting the first target value after changed from the first target value before changed. Therefore, the output light level (at the portion C of FIG. 2) of the optical attenuating part 12 does not become smaller than the value before the mode of the input light is changed, even after the change in the mode of the input light.

Especially in the construction described above, the output light of the optical attenuating part 12 is at a constant value independent of the target value of output light level of the first optical amplifying part 11.

If the attenuation amount of the optical attenuating part 12 is adjusted, where the mode of the input light is changed, by an amount of the same sign but equal in its absolute value to the value X calculated by subtracting the first target value changed from the first target value before changed, for example, the output light level of the optical attenuating part 12 is equal to that (i.e., a constant value V0) before the change of the mode of the input light even after the change of the mode of the input light, as shown in FIG. 2.

In the invention, therefore, the optical amplifying apparatus 10 can suppress the degradation of the noise figure before and after that change.

In the invention, the input dynamic range can be widened by setting a plurality of input light modes in accordance with the input light levels. In the invention, the individual first target values are set correspond to the modes of the individual input lights to adjust the attenuation amount of the optical attenuating part 12, so that the noise figure is not degraded even if the input dynamic range is widened.

In the foregoing description, there has been described the case in which the input dynamic range is sectioned into the three in-modes, but this embodiment can be likewise applied to an arbitrary number of input light modes.

The "in-modes" will be termed as the individual modes of the input light, and the later-described "out-modes" will be termed as the individual modes of the output light.

In the optical amplifying apparatus 10, as shown in FIG. 1, the second optical amplifying part 13 amplifies the output light of the optical attenuating part 12 to a predetermined target value of output light level. The optical amplifying apparatus 10 may be constructed, where the controlling part 14 changes the target value of output light level of the second optical amplifying part 13, of a circuit for changing the attenuation amount of the optical attenuating part 12 in accordance with the summed value of the difference between the target value of output light level of the first optical amplifying part 11 and the target value of output light level of the first optical amplifying part 11 after changed and the difference between the target value of output light level of the second optical amplifying part 13 and the target value of output light level of the second optical amplifying part 13 after changed.

In FIG. 1, moreover, the optical amplifying apparatus 10 is provided with the first optical amplifying part 11, the optical attenuating part 12 for attenuating the output light of the first optical amplifying part 11, the second optical amplifying part 13 for amplifying the output light of the optical attenuating part 12 to the predetermined target value of output light level, and the controlling part 14 for changing the attenuation amount of the optical attenuating part 12. The controlling part 14 may be constructed of a circuit for changing the attenuation amount of the optical attenuating part 12 in accordance with the difference between the target value of output light level of the second optical amplifying part 13 and the target value of output light level of the second optical amplifying part 13 after changed.

Here, FIG. 3A shows a level diagram of the case in which the level of the input light is within the range a, and FIG. 3B shows a level diagram of the case in which the level of the input light is within the range b.

The optical amplifying apparatus 10 is set with three output light modes of an out-mode Sa, an out-mode Ta and an out-mode Ua, as shown in FIG. 3A, where the in-mode a is selected as the input light mode. In the out-mode Sa, moreover, a second target value Sa is defined as the second target value; in the out-mode Ta, a second target value Ta is defined as the second target value; and in the out-mode Ua, a second target value Ua is defined as the second target value. Where the in-mode b is selected as the input light mode, as shown in FIG. 3B, there are set three out-modes. In the out-mode Sa, a second target value Sa is defined as the second target value; in the out-mode Ta, a second target value Ta is defined as the second target value; and in the out-mode Ua, a second target value Ua is defined as the second target value. Where the in-mode c is selected as the input light mode, moreover, the second target values are likewise defined, although not shown.

Where the in-mode a is selected as the input light mode in such optical amplifying apparatus 10, for example, even if the input light level is varied within the range a, as has been described before, the output light level (as indicated at the portion B in FIG. 3A) of the first optical amplifying part 11 is fixed substantially at the first target value a, and the output light level (as indicated at the portion C in FIG. 3A) of the optical attenuating part 12 takes the predetermined constant value V0. This behavior is shown by solid lines in FIG. 3A.

Where the mode of the output light is changed, the attenuation amount of the optical attenuating part 12 is smaller in the absolute value than a value Y which is calculated by subtracting the second changed target value from the original second target value and it is further adjusted by an the attenuation amount of the inverse sign.

On the other hand, where the mode of the output light is changed, the attenuation amount of the optical attenuating part 12 may be equal to the value Y in the absolute value and may also be further adjusted by the attenuation amount of the inverse sign.

Alternatively, the attenuation amount of the optical attenuating part 12 may also be adjusted by an amount of −(X−Y) of the inverse sign but equal in the absolute value to a value which is calculated by subtracting the value Y from the value X after the value X was calculated by subtracting the first target value after changed from the first target value before changed and after the value Y was calculated by subtracting the second target value after changed from the second target value after changed.

Therefore, this optical amplifying apparatus 10 can not only gain the aforementioned effect of suppressing the degradation of the noise figure before and after the variation of the input light level but also select the out-mode according to the output light level of the optical amplifying apparatus 10, so that it can output an output light at the optimum light level for the kind of the fiber as an optical transmission line to be connected with the output side of the optical amplifying apparatus 10. As a result, since the optimum output power level for the kind of fiber can be selected, the output light is not seriously degraded in its waveform, as might otherwise be caused by the nonlinear optical effect such as the self-phase modulation, the cross phase modulation, or the four-wave mixing, while propagating in the optical transmission line.

In FIG. 1, on the other hand, the optical amplifying apparatus 10 may also be modified such that the input light to be inputted to the first optical amplifying part 11 is a WDM optical signal and such that the output light of the second optical amplifying part 13 set the output light level of a specific wavelength in the WDM optical signal to a constant value. The WDM optical signal is a signal in which a plurality of optical signals having different wavelengths are wavelength-multiplexed.

This optical amplifying apparatus 10 can compensate the dispersion among the products on the attenuation amount of the optical attenuator to be used in the optical attenuating part 12, because the second optical amplifying part 13 controls the output level to a constant (for the output constant control). As a result, the output light level of the optical amplifying apparatus 10 is kept substantially at a constant.

In FIG. 1, on the other hand, the optical amplifying apparatus 10 may be modified such that the input light to be inputted to the first optical amplifying part 11 is the WDM optical signal and such that the output light of the second optical amplifying part 13 controls the gain to a constant (for the gain constant control).

In FIG. 1, moreover, the optical amplifying apparatus 10 may be provided with: the first optical amplifying part 11; a first optical amplifier 21 and a second optical amplifier 23 for amplifying the light; an optical attenuator 22 connected between the first optical amplifier 21 and the second optical amplifier 23; and a controller 24 for adjusting the attenuation amount of the optical attenuator 22 so that the sum of the gain of the first optical amplifier 21 and the gain of the second optical amplifier 23 and the output light level of the second optical amplifier 23 may be constant.

In FIG. 1, on the other hand, the optical amplifying apparatus 10 may also be provided with: the first optical amplifying part 11 and the second optical amplifying part 13; the first optical amplifier 21 and the second optical amplifier 23 for amplifying the lights; the optical attenuator 22 connected between the first optical amplifier 21 and the second optical amplifier 23; and the controller 24 for adjusting the attenuation amount of the optical attenuator 22 so that the sum of the gain of the first optical amplifier 21 and the gain of the second optical amplifier 23 and the output light level of the second optical amplifier 23 may be constant. Here, the aforementioned detailed construction of the second optical amplifier 13 is omitted from FIG. 1.

Here will be described another embodiment of the invention.

Construction of Second Embodiment

Figure 4:
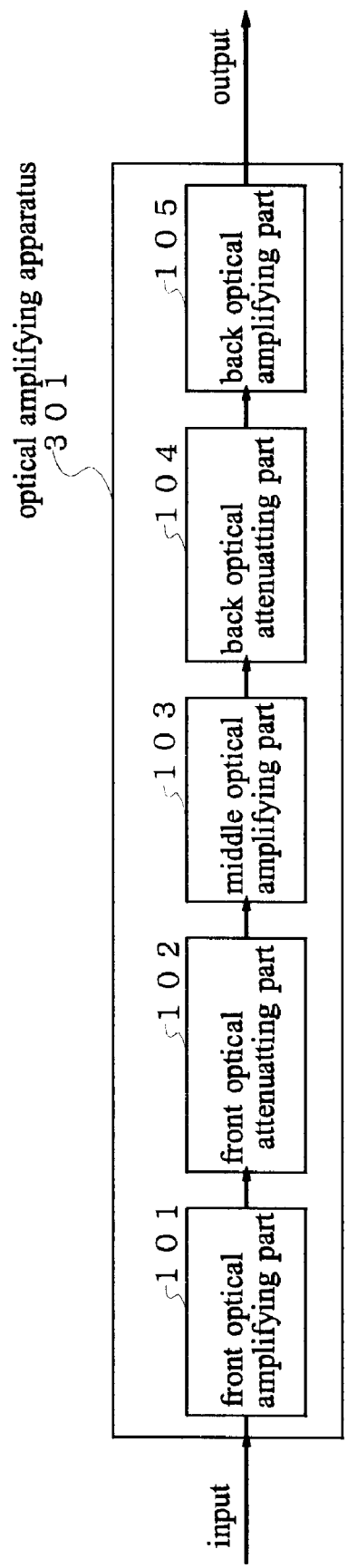
FIG. 4 is a diagram showing a construction of an optical amplifying apparatus according to a second embodiment.

In FIG. 4, the WDM optical signal to be inputted to an optical amplifying apparatus 301 in the second embodiment is inputted to and amplified by a front optical amplifying part 101. The WDM optical signal amplified is inputted to and attenuated by a front optical attenuating part 102. The WDM optical signal attenuated is inputted to and amplified by a middle optical amplifying part 103. The WDM optical signal amplified is inputted to and attenuated by a back optical attenuating part 104. The WDM optical signal attenuated is inputted to and amplified by a back optical amplifying part 105. The WDM signal amplified is outputted as the output light of the optical amplifying apparatus 301.

The WDM optical signal is an optical signal set to a wavelength band (i.e., 1,530 to 1,570 nm) of the C band.

The optical amplifying apparatus 301 has two input light modes of an in-mode 1 and an in-mode 2. For examples, the in-mode 1 is the input light mode corresponding to the case in which the input light level is −30 to −20 (dBm/channel), and the in-mode 2 is the input light mode corresponding to the case in which the input light level is −25 to −15 (dBm/channel).

Here will be sequentially described the individual constructions of the front optical amplifying part 101, the front optical attenuating part 102, the middle optical amplifying part 103, the back optical attenuating part 104 and the back optical amplifying part 105.

First of all, the construction of the front optical amplifying part 101 will be described with reference to FIGS. 5A and 5B.

In FIG. 5A, the WDM optical signal to be inputted to the optical amplifying apparatus 301 in the second embodiment is inputted to an optical coupler (as will be abbreviated into the "CPL") 111 in the front optical amplifying part 101. This CPL 111 is an optical part for branching the input light into two. The remaining CPLs, as will be described hereinafter, are similar. The CPL is exemplified by a minute optical element type optical coupler such as a half mirror, a fiber type optical coupler such as a fiber fused coupler, or a guided-wave type optical coupler.

Of the WDM optical signals branched at the CPL 111, one is inputted to a PD 121 whereas the other is inputted to an optical isolator (as will be abbreviated into the "ISO") 112. The PD 121 is a photoelectric converter for generating an electric current according to the optical power of the received light, and the remaining later-described PDs are similar. The ISO 112 is an optical part for transmitting a light only in one direction, and the remaining later-described ISOes are similar. The ISO can be constructed, for example, by arranging a Farady rotator between two polarizers having polarized light faces arranged with a displacement of 45 degrees. The ISO prevents the reflected light, as generated at the joints of the individual optical parts in the apparatus, from propagating far away. Especially when the reflected light returns to a semiconductor laser, this semiconductor laser is stimulated by the reflected light having various phases and amplitudes, to change its oscillation mode or to generate noises. Thus, the ISO is employed to prevent those adverse affects.

The output of the PD 121 is inputted to a variable gain electrical amplifier 133 and a switch (as will be abbreviated into the "SW") 127.

This SW 127 is a switch having one input and four outputs. These four output terminals of the SW 127 are individually connected with any of resistors: a resistor 128 of a resistance R1; a resistor 129 of a resistance R2; a resistor 130 of a resistance R3; and a resistor 131 of a resistance R4, which are individually grounded to the earth. The resistances R1 to R4 are determined according to the modes of the input lights of the optical amplifying apparatus 301. The terminal voltage of the resistor, which has been connected with the PD 121 by the SW 127, is supplied as the output of the PD 121 through the variable gain amplifier 133 to an automatic gain controlling circuit (as will be abbreviated into the "AGC") 122 and a logarithmic amplifier (as will be abbreviated into the "LOG") 124.

The gain of the variable gain amplifier 133 is made so variable that the gain from the PD 121 to the output of the gain variable amplifier 133 may be kept constant when the SW 127 is switched.

The circuit, as composed of the PD 121, the SW 127 and the resistors 128, 129, 130 and 131, is a monitor circuit for detecting the optical level of the WDM optical signal, as inputted to the optical amplifying apparatus 301.

The WDM optical signal from the ISO 112 is inputted to the CPL 113.

To the CPL 113, on the other hand, there is also inputted the laser beam of a laser diode (as will be abbreviated into the "LD") 119 as a pump light of a later-described erbium-doped fiber 114. The LD 119 can be exemplified by various semiconductor lasers such as the Fabry-Perot resonating type laser, the distributed feedback laser or the distributed bragg reflector laser. The remaining later-described LDs are similar.

The WDM optical signal from the ISO 112 and the laser beam from the LD 119 are combined and then inputted to the erbium-doped fiber (as will be abbreviated into the "EDF") 114. The erbium element is one rare earth element of the lanthanum series and has an element symbol Er and an atomic number 68. The elements belonging to the lanthanum series have similar characteristics.

In the EDF 114, the Er ions are excited by compensating the pump light of the LD 119 thereby to generate the population inversion. When the WDM optical signal is inputted with the population inversion being formed, a stimulated emission is caused by the WDM optical signal so that the WDM optical signal is amplified. The remaining later-described EDFs amplify the light likewise.

Since the LD 119 is the pump source for the EDF 114, its oscillatory wavelength is set to the excitation wavelength of the EDF 114, e.g., 1,480 nm. This setting may also be to 980 nm.

The WDM optical signal, as amplified by the EDF 114, is inputted through an ISO 115 to a gain equalizer (as will be abbreviated into the "GEQ") 116. This GEQ 116 is an optical part for compensating the gain wavelength characteristics curve of the EDF 114 so that it is flat in the wavelength band of the WDM optical signal, and the remaining later-described GEQs are similar excepting the different EDF to be compensated. The GEQ can be exemplified by an optical filter or fiber grating which has its loss wavelength characteristics curve adjusted to the shapes generally identical to those of the gain wavelength characteristics curve of the EDF to be compensated.

The WDM optical signal from the GEQ 116 is inputted to a CPL 117. Of the WDM optical signals branched by the CPL 117, one is inputted to a variable optical attenuator (as will be abbreviated into "VAT") 141 in the front optical attenuating part 102 whereas the other is inputted to a PD 120.

The output of the PD 120 is converted in its current value into a terminal voltage by a resistor (although not shown in FIGS. 5A and 5B) and is then inputted to the AGC 122 and a LOG 123. Unless otherwise explicitly specified, the outputs of the later-described PDs are converted, as in the PD 120, in their current values into terminal voltages by the (not-shown) resistors and are then outputted.

The AGC 122 judges the gain of the EDF 114 from the output of the PD 120 and the output of the PD 121 through the gain variable amplifier 133. An AGC 122 adjusts the driving current (or the injection current) of the LD 119 within a range for the injection current not to reach a limiter value, thereby to adjust the gain of the EDF 114 to a constant with a predetermined gain. This predetermined gain is considered to reduce the noise figure of the WDM optical signal at a low optical level, as inputted to the optical amplifying apparatus 301.

The LOG 123 converts the output of the PD 120 into the logarithmic value of the voltage level, which is inputted to one input terminal of a subtracter 125. The LOG 124 converts the output of the PD 121 through the gain variable amplifier 133, into the logarithmic value of the voltage level and inputs the converted logarithmic value to the other input terminal of the subtracter 125. This subtracter 125 outputs the value, which is obtained by subtracting the output of the LOG 124 from the output of the LOG 123, to a subtracter 126. The value, as obtained by subtracting the output of the LOG 124 from the output of the LOG 123, corresponds to the gain of the EDF 114.

The subtracter 126 outputs the value, which is obtained by subtracting the output of the subtracter 125 from a predetermined reference voltage Vref1, to an adder 161 in the middle optical amplifying part 103. The reference voltage Vref1 is a voltage value to be referred to so that the sum of the gain of the front optical amplifying part 101 and the gain of the middle optical amplifying part 103 may be a predetermined constant value Gs1.

Next, the construction of the front optical attenuating part 102 will be described with reference to FIGS. 5A and 5B.

The WDM optical signal, as outputted from the CPL 117 in the front optical amplifying part 101, is inputted through the VAT 141 to a CPL 151 in the middle optical amplifying part 103.

The VAT 141 is an optical part capable of attenuating a light inputted and changing the attenuation amount of the same, and the remaining later-described VATs are similar. The VAT can be exemplified: either by an optically variable attenuator which is prepared by inserting an attenuating disc between an input light and an output light and by depositing the surface of the attenuating disc with a metallic film having a thickness continuously varied in the rotating direction and which is enabled to adjust the attenuation amount by rotating the attenuating disc; or by an optically variable attenuator which is prepared by inserting a magneto-optic crystal between the input light and the output light and a polarizer on the output side of the magneto-optic crystal and which is enabled to adjust the attenuation amount by applying a magnetic field to the magneto-optic crystal to vary the intensity of the magnetic field.

On the other hand, the output according to the output light level of the WDM optical signal, as outputted from the middle optical amplifying part 103 to the back optical attenuating part 104, is inputted from a PD 159 in the middle optical amplifying part 103 to a LOG 144 in the front optical attenuating part 102.

The LOG 144 converts that input into a logarithmic value of the voltage level, which is inputted to one input terminal of an automatic level controlling circuit (as will be abbreviated into the "ALC") 143. This ALC 143 compares the value of the output voltage of the LOG 144 with a predetermined reference voltage Vref2 thereby to adjust the attenuation amount of the VAT 141 so that the optical level of the WDM optical signal per channel outputted from the middle optical amplifying part 103 may be constant. The reference voltage Vref2 is a voltage value for reference used in order to adjust the output light level to be outputted from CPL 156 of the portion composed of the front optical amplifying part 101, the front optical attenuating part 102 and the middle optical amplifying part 103 to the back optical attenuating part 104 to a first target value. The number of reference voltage Vref2 is equal to that of the modes of the input light such as a reference voltage Vref2M1 for the in-mode 1 or a reference voltage VrefM2 for the in-mode 2.

Next, the construction of the middle optical amplifying part 103 will be described with reference to FIG. 5.

The WDM optical signal, as outputted from the VAT 141 in the front optical attenuating part 102, is inputted to the CPL 151 in the middle optical amplifying part 103.

Of the WDM optical signals branched by the CPL 151, one is inputted to a PD 157 whereas the other is inputted to a GEQ 152. This GEQ 152 compensates the gain wavelength characteristics curve of an EDF 155 so that it is generally flat.

The WDM optical signal, as outputted from the GEQ 152, is inputted to an ISO 153 to a CPL 154. To this CPL 154, there is also inputted the laser beam from an LD 158. The WDM optical signal, as outputted from the ISO 153, and the laser beam of the LD 158 are combined by the CPL 154 and are then inputted to the EDF 155.

The EDF 155 amplifies the WDM optical signal inputted and outputs the amplified optical signal to the CPL 156. Of the WDM optical signals branched by the CPL 156, one is inputted to an optical attenuator (as will be abbreviated into the "ATT") 171 (FIG. 6) in the back optical attenuating part 104, whereas the other is inputted to the PD 159.

The output of this PD 159 is inputted to an AGC 162 and the LOG 144 in the front optical attenuating part 102.

On the other hand, the output of the PD 157 is inputted to a LOG 160. This LOG 160 converts the output of the PD 157 into a logarithmic value of the voltage level and inputs the converted logarithmic value to one input terminal of the adder 161. To the other input of the adder 161, there is inputted the output of the subtracter 126 in the front optical amplifying part 101.

The adder 161 adds the output of the LOG 160 and the output of the subtracter 126 and outputs the added value to an antilogarithmic amplifier (as will be abbreviated into the "Anti-LOG") 163. This Anti-LOG 163 convert the added value inversely logarithmically and outputs the converted value to the AGC 162.

The AGC 162 adjusts the gain of the EDF 155 by adjusting the driving current or the injection current of the LD 158 so that the sum of the gain of the front optical amplifying part 101 and the gain of the middle optical amplifying part 103 may be constant from the output of the PD 159 and the output of the Anti-LOG 163.

Figure 6:
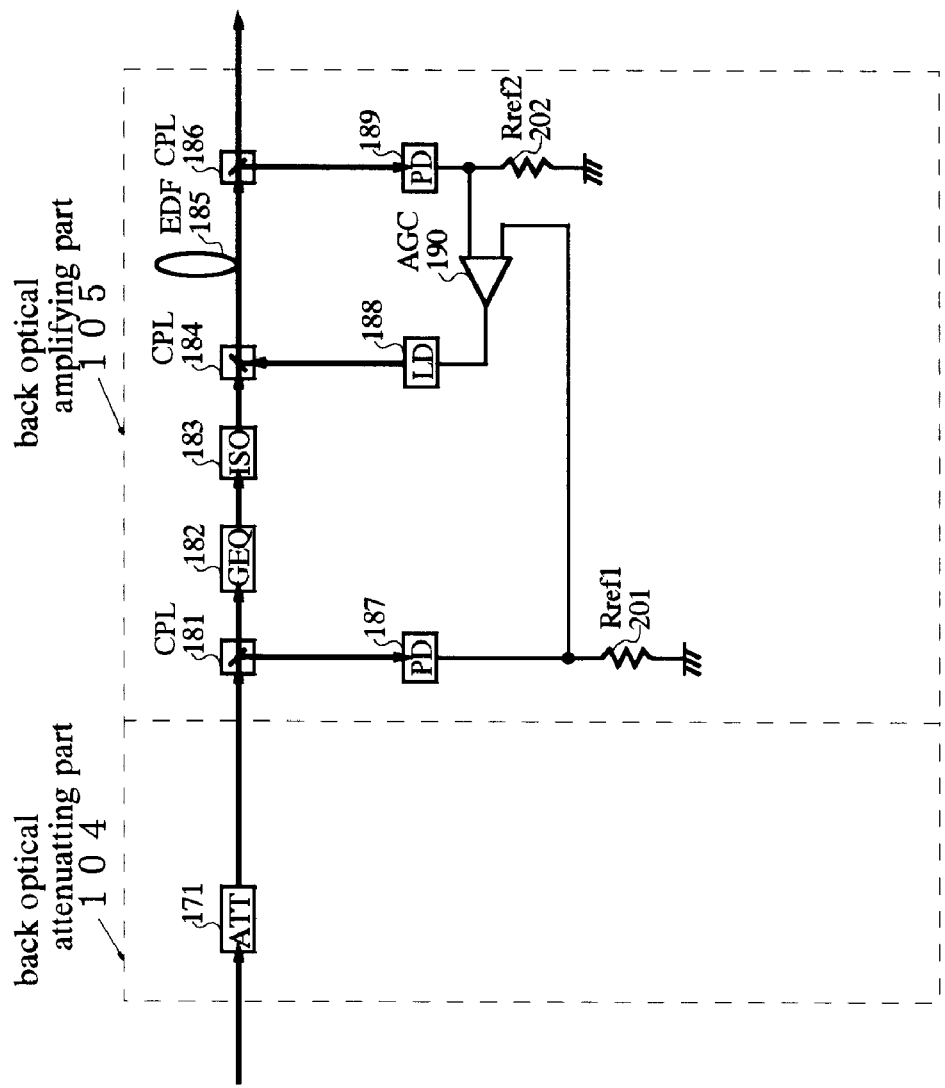
FIG. 6 is a diagram showing constructions of a back attenuating part and a back optical amplifying unit in the second embodiment.

Next, the construction of the back optical attenuating part 104 will be described with reference to FIG. 6.

The WDM optical signal, as outputted from the CPL 156 in the middle optical amplifying part 103, is inputted through the ATT 171 to a CPL 181 in the back optical amplifying part 105. The ATT 171 is prepared for each mode of the input light, and the attenuation amount of the ATT 171 for the in-mode 1 is set considering the output light level of the optical amplifying apparatus 301. The attenuation amount of the ATT 171 for the in-mode 2 is set larger by the value, which is calculated by subtracting the input light level of the case of the in-mode 1 from the input light level of the case of the in-mode 2, than the attenuation amount of the ATT 171 for the in-mode 1.

Next, the construction of the back optical amplifying part 105 will be described with reference to FIG. 6.

The WDM optical signal, as outputted from the ATT 171 in the back optical attenuating part 104, is inputted to the CPL 181 in the back optical amplifying part 105.

Of the WDM optical signals branched by the CPL 181, one is inputted to a PD 187 whereas the other is inputted through a GEQ 182 and an ISO 183 to a CPL 184.

The PD 187 is grounded to the earth through a resistor 201 of the resistance Rref1, and the terminal voltage of the resistor 201 is outputted as the output of the PD 187 to one terminal of an AGC 190. The GEQ 182 compensates the gain wavelength characteristics curve of an EDF 185 so that it is generally flat. To the GEQ 182, there is also inputted the laser beam of an LD 188. The WDM optical signal, as outputted from the ISO 183, and the laser beam of the LD 188 are combined by the CPL 184 and are then inputted to the EDF 185.

The EDF 185 amplifies the WDM optical signal inputted and then outputs the amplified signal to a CPL 186. Of the WDM optical signals branched by the CPL 186, one is outputted as the output light of the optical amplifying apparatus 301 whereas the other is inputted to a PD 189. This PD 189 is grounded to the earth through a resistor 202 of a resistance Rref2, and the terminal of the resistor 202 is outputted as the output of the PD 189 to the other terminal of the AGC 190.

The AGC 190 judges the gain of the EDF 185 from the output of the PD 187 and the output of the PD 189, and adjusts the gain of the EDF 185 by adjusting the driving current (or the injection current) of the LD 188 so that the gain may be a predetermined constant value. Therefore, the gain of the back optical amplifying part 105 is so set by making the predetermined value in the AGC 190 variable that the output ratio between the PD 189 and the PD 187 may be a predetermined constant value.

More specifically, the AGC 122, 162 or 190 is equipped, as shown in FIG. 5B, with a dividing circuit 135 and an operational amplifier 137, and two inputs Pia and Pib are inputted to the dividing circuit 135 so that their ratio Pia/Pib is calculated by the dividing circuit 135. This ratio is inputted to one terminal of the operational amplifier 137, and a predetermined value is inputted to the other terminal of the same. The operational amplifier 137 compares that ratio and a predetermined value and outputs an output value according to the result. The later-described AGC is similar.

Operations and Effects of Second Embodiment

When the optical amplifying apparatus 301 of the second embodiment is installed as a repeater station of the optical communication system, the modes of the input light and the SW 127 are set according to the optical level which is outputted from the optical transmission line connected with the input side of the optical amplifying apparatus 301.

Where the optical level is at −30 to −20 (dBm/channel), for example, the in-mode 1 is selected so that the reference voltage Vref2 is set to the reference voltage Vref2M1 for the in-mode 1, whereas the ATT 171 is set to the ATT having the attenuation amount for the in-mode 1. The monitor circuit selects a resistor such as the resistor 128 corresponding to the case, in which the optical level is at −30 to −20 (dBm/channel), and the SW 127 is switched to connect the PD 121 and the resistor 128. As a result, the terminal voltage of the resistor 128 is inputted to the AGC 122 and the LOG 124.

Figure 23:
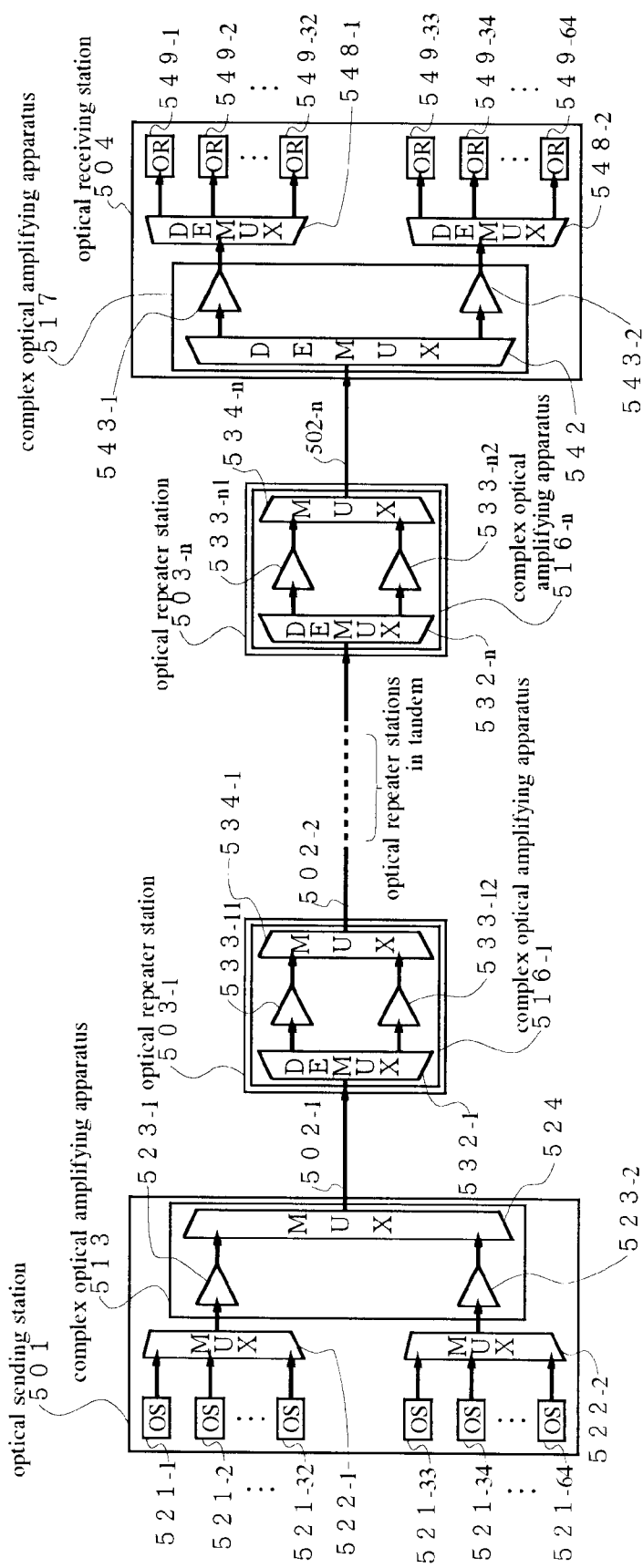
FIG. 23 is a diagram showing a construction of an optical communication system of a seventh embodiment.

If the monitor circuit were constructed of one resistor irrespective of the input light level, as shown in FIG. 23, the varying ratio of the terminal voltage of the resistor to the variation of the input light level would be small where the input light level variation over a wide range, so that the input light level would be difficult to detect. However, the optical amplifying apparatus 301 of the second embodiment can select the resistor of the monitor circuit in accordance with the input light level. Where the input light level changes over a range of the mode of the input light selected, therefore, the optical amplifying apparatus 301 can set optimum the varying ratio of the terminal voltage of the resistor to the variation of the input light level. As a result, the optical amplifying apparatus 301 can detect the input light level easily but reliably.

Here, the reason why the monitor circuit is constructed of four resistors more than the number of the modes of the input light is to match the input light levels more finely in the mode of each input light. The number of the resistors in the monitor circuit may be equal to that of modes of the input light or more than four.

In the optical amplifying apparatus 301 set with the in-mode 1 and the resistor 128, the AGC 122 outputs a signal according to the ratio of the output of the PD 120 with reference to the output of the PD 121, to the LD 119 thereby to control the gain of the EDF 114 so that the ratio may take a predetermined value. Since the EDF 114 is thus controlled to the constant gain, therefore, the WDM optical signal, as inputted to the front optical amplifying part 101, is amplified at a predetermined constant gain. The adjustment of the predetermined constant gain may be made by adjusting the ratio between the resistance R1 of the resistor 128 for converting the current value of the PD 121 into the voltage value and the resistance of the resistor for converting the current value of the PD 120 into the voltage value.

The AGC 162 outputs the signal according to the ratio of the output from the PD 159 with reference to the output from the Anti-LOG 163, to the LD 158 thereby to control the gain of the EDF 155 so that the ratio may take a predetermined value. As a result, the EDF 155 is controlled to the constant gain.

The output of the Anti-LOG 163 has a value obtained by adding a value of the output of the subtracter 126 to the optical level of the WDM optical signal inputted to the middle optical amplifying part 103. The output of the subtracter 126 has a value obtained by subtracting the gain of the front optical amplifying part 101 from the sum Gs1 of the gains of the front optical amplifying part 101 and the middle optical amplifying part 103. Therefore, the AGC 162 adjusts the gain of the EDF 155 with reference to the output of the Anti-LOG 163 so that the sum of the gain of the front optical amplifying part 101 and the gain of the middle optical amplifying part 103 is substantially kept at the value Gs1. In other words, the portion composed of the front optical amplifying part 101, the front optical attenuating part 102 and the middle optical amplifying part 103 satisfies the following Equation (3).

On the other hand, the ALC 143 outputs the signal according to the difference from the output of the PD 159 with reference to the reference voltage Vref2M1, to the VAT 141 thereby to control the attenuation amount of the VAT 141 so that the difference may be "0". As a result, the output light level of the middle optical amplifying part 103 is controlled to a constant.

Since the front optical amplifying part 101, the front optical attenuating part 102 and the middle optical amplifying part 103 thus acts, the output light level of the middle optical amplifying part 103 is kept at a first target value T1M1 corresponding to the in-mode 1, irrespective of the fluctuation of the input light level within the range of the in-mode 1.

The back optical amplifying part 105 attenuates at a constant rate corresponding to the in-mode 1 so that the input light level of the back optical amplifying part 105 is kept at a substantially constant value.

In the back optical amplifying part 105, the AGC 190 outputs the signal according to the ratio of the output of the PD 189 with reference to the output of the PD 187, to the LD 188 thereby to control the gain of the EDF 185 so that the ratio may take a predetermined value. This predetermined value is separately given as a reference value in the AGC 190. As a result, the EDF 185 is controlled to the constant gain, and the WDM optical signal, as inputted to the back optical amplifying part 105, is amplified at a predetermined constant gain. Since the input light level of the back optical amplifying part 105 is substantially constant, moreover, the output light level of the back optical amplifying part 105 (or the output light level of the optical amplifying apparatus 301) is kept at a substantially constant value.

Where the optical level is at −25 to −15 (dBm/channel) when the optical amplifying apparatus 301 is installed as another optical repeater station., on the other hand, the in-mode 2 is selected. As a result, the reference voltage Vref2 is set to the reference voltage Vref2M2 for the in-mode 2, whereas the ATT 171 is set to the ATT having the attenuation amount for the in-mode 2. The monitor circuit selects a resistor such as the resistor 130 corresponding to the case, in which the optical level is at −25 to −15 (dBm/channel), and the SW 127 is switched to connect the PD 121 and the resistor 130. As a result, the terminal voltage of the resistor 130 is inputted to the AGC 122 and the LOG 124.

The AGCs 122 and 162 and the ALC 143 act as in the case of the aforementioned in-mode 1, but the reference voltage Vref2 is set to the reference voltage Vref2M2 for the in-mode 2 so that the output light level of the middle optical amplifying part 103 takes a first target value T1M2 for the in-mode 2. The ATT 171 is also set to the ATT having an attenuation amount for the in-mode 2 so that the output light level of the back optical attenuating part 104 is equal to that of the in-mode 1.

As a result, the optical amplifying apparatus 301 is enabled to cover the wide input dynamic range by having the two input light modes. Since the output light level of the back optical attenuating part 104 is kept substantially constant, moreover, the optical amplifying apparatus 301 is freed from the degradation in the noise figure when the modes of the input light are switched.

In order to explain the aforementioned operations and effects more specifically, there is simulated the level diagram in the optical amplifying apparatus 301.

In FIG. 7, there are sequentially enumerated from the lefthand side: the modes of the input light; the input, gain and output in the front optical amplifying part 101; the attenuation amount of the front optical attenuating part 102; the input, gain and output in the middle optical amplifying part 103; the attenuation amount of the back optical attenuating part 104; the input, gain and output in the back optical amplifying part 105; the sum of the gain of the front optical amplifying part 101 and the gain of the middle optical amplifying part 103; and the total gain of the optical amplifying apparatus 301.

The upper row presents the simulation results of the case of the in-mode 1, and the lower row presents the simulation results of the case of the in-mode 2. In the in-mode 1, calculations are made on the case in which Pin+10, Pin+5 and Pin are inputted to the front optical amplifying part 101. In the in-mode 2, calculations are made on the case in which Pin+15, Pin+10 and Pin+5 are inputted to the front optical amplifying part 101.

The first target value (or the output light level of the middle optical amplifying part 103) is set to P0 in the in-mode 1 and to P0+5 in the in-mode 2. The attenuation amount of the back optical attenuating part 104 is set to 2 in the in-mode 1 and to 7 in the in-mode 2. This difference between the these attenuation amounts is a difference in the first target value between the in-mode 2 and the in-mode 1. The gain of the back optical amplifying part 105 is set to 7 in both the modes. On the other hand, the sum of the gain of the front optical amplifying part 101 and the gain of the middle optical amplifying part 103 is set to Gr1+2.

Here, gains Gr1 and Gr2 in FIG. 7 are expressed by the following Equations:

$$Gr1 = P0 - Pin \qquad (Eq.\ 1);$$

and $$Gr2 = Gr1 - 10 \qquad (Eq.\ 2).$$

The results, as calculated under the above-specified conditions, are enumerated in FIG. 7.

Under the above-specified conditions, the level diagrams in the modes for Pin=−30 (dBm/channel) and P0=0 (dBm/channel) are shown in FIGS. 8A to 8C.

FIG. 8A is a diagram showing a level diagram in the in-mode 1, and FIG. 8B is a diagram showing a level diagram in the in-mode 2. FIG. 8C is a diagram showing FIG. 4 again so as to make clear the positional relations between the level diagrams and the optical amplifying apparatus 301. The ordinates of FIGS. 8A and 8B indicate the light level per channel, and the abscissas indicate the positions of the optical amplifying apparatus. Letters A, B, C, D, E and F designate the individual portions of the optical amplifying apparatus 301 shown in FIG. 8C. Specifically: the portion A is located on the input side of the front optical amplifying part 101; the portion B is located between the front optical amplifying part 101 and the front optical attenuating part 102; the portion C is located between the front optical attenuating part 102 and the middle optical amplifying part 103; the portion D is located between the middle optical amplifying part 103 and the back optical attenuating part 104; the portion F is located between the back optical attenuating part 104 and the back optical amplifying part 105; and the portion F is located on the output side of the back optical amplifying part 105.

By setting the first target value in each mode and the attenuation amount of the ATT to the aforementioned values, as seen from FIGS. 7 and 8A to 8C, the output light level (as located at the portion E of FIG. 8) of the back optical attenuating part 104 takes a constant value of −2 (dBm/channel) independently of the in-mode selected. As a result, the optical amplifying apparatus 301 in the second embodiment is freed from degrading the noise figure even when the modes of the input light are switched.

In order to compare the effects of the second embodiment, here are calculated the level diagrams in an optical amplifying apparatus 1000 which is not provided with the modes of the input light and the modes of the output light, as shown in FIG. 9.

The optical amplifying apparatus 1000 keeping the gain wavelength characteristics curve substantially flat has been proposed by the same Applicant as that of the present invention in the Specification of the not yet published Japanese Patent Application No. 11-074371, filed Mar. 18, 1999 (corresponding to U.S. patent application Ser. No. 09/264902).

First of all, here will be described the construction of the optical amplifying apparatus 1000.

In FIG. 9A, an input light to an optical amplifying apparatus 1000 is inputted through a CPL 1011 and a CPL 1012 to an optical amplifier 1013 so that it is amplified at a gain G1. The amplified light is inputted through a CPL 1014 to a VAT 1015 so that it is attenuated. The attenuated light is inputted through a CPL 1016 to an optical amplifier 1017 so that it is amplified at a gain G2. The amplified light is outputted as the output light of the optical amplifying apparatus 1000 through a CPL 1018.

The light, as dropped by the CPL 1011, is inputted to a PD 1026 so that it is photoelectrically converted. This PD 1026 is connected at its anode terminal with the power source of a voltage Vcc and is grounded at its cathode terminal to the earth through a resistor 1025 of the resistance R1. The terminal voltage of the resistor 1025 is inputted as the output of the PD 1026 to a controlling circuit 1027, which adjusts the attenuation amount of the VAT 1015 on the basis of the output of the PD 1026. On the basis of the output of the PD 1026, the controlling circuit 1027 adjusts the gains of the optical amplifiers 1013 and 1017 through AGCs 1019 and 1020. The PD 1026 and the resistor 1025 construct a monitor circuit for detecting the input light level.

The light branched by the CPL 1012 and the light branched by the CPL 1014 are inputted to the AGC 1019 so that the AGC 1019 is based on the optical powers of those lights to judge and adjust the gain of the optical amplifier 1013 to the gain The light branched by the CPL 1016 and the light branched by the CPL 1018 are inputted to the AGC 1020 so that the AGC 1020 is based on the optical powers of those lights to judge and adjust the gain of the optical amplifier 1017 to the gain G2.

FIG. 9B is a level diagram of the optical amplifying apparatus 1000 and shows optical levels at the individual portions a, b, c and d shown in FIG. 9A. In FIG. 9B, the abscissa indicates the position, and the ordinate indicates the optical level.

In FIG. 9B, the light, as inputted to the optical amplifying apparatus 1000, is amplified between the portions a and b by the optical amplifier 1013, attenuated between the portions b and c by the VAT 1015, and is amplified again between the portions c and d by the optical amplifier 1017, until it is outputted.

Where the input light level fluctuates by Δ, as shown in FIG. 9B, the optical amplifying apparatus 1000 acts to keep the sum of the gain G1 of the optical amplifier 1013 and the gain G2 of the optical amplifier 1017 constant by changing the attenuation amount of the VAT by −66 .

Specifically, the optical amplifying apparatus 1000 acts to satisfy the following Equation (3), if the gain G1 of the optical amplifier 1013 and the gain G2 of the optical amplifier 1017 before and after the fluctuation of the input light level are designated by G1$x$ and G1$x$# by G2$x$ and G2$x$#, respectively:

$$G1x+G2x=G1x\#+G2x\# \qquad (Eq.\ 3).$$

By these operations, the optical amplifying apparatus 1000 is enabled to amplify the input light to a desired optical level and to keep the gain wavelength characteristics curve substantially flat.

This is because of the following phenomena occurring in the optical amplifiers.

Figure 10:
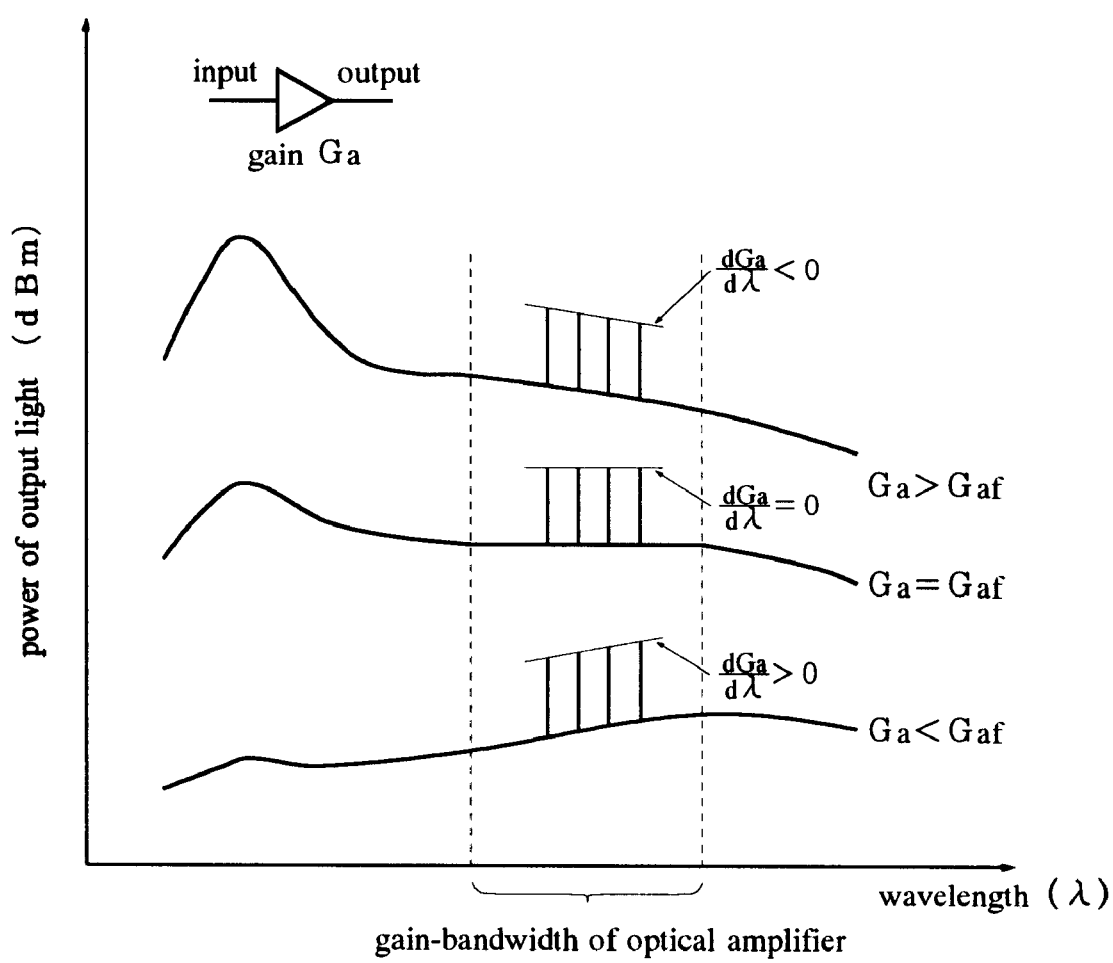
FIG. 10 is a diagram showing a gain and gain wavelength characteristics of an optical amplifier.

If a gain of the optical amplifier is at a gain Gaf, as indicated by a center curve in FIG. 10, the gain wavelength characteristics curve is flat (dGa/dλ=0) in a gain bandwidth for amplifying the WDM optical signal. If the gain Ga of the optical amplifier is made larger than the gain Gaf, as indicated by an upper curve, the gain wavelength characteristics curve has a negative gradient (dGa/dλ<0) in the gain-bandwidth. If the gain Ga of the optical amplifier is made smaller than the gain Gaf, as indicated by a lower curve, on the other hand, the gain wavelength characteristics curve has a positive gradient (dGa/dλ>0) in the gain-bandwidth.

With these phenomena, the optical amplifying apparatus 1000 are enabled to keep the gain wave length characteristics curve generally flat by causing the optical amplifier 1013 and the optical amplifier 1017 to act to have inverse gain gradients by raising one gain and lowering the other gain in response to the fluctuation of the input light level.

On the other hand, the noise figure NF of the optical amplifying apparatus 1000 is given by the following Equation:

$$10^{(NF/10)}=10^{(NF1/10)}+10^{((NF2-Pout+Lvat+Pin)/10)} \qquad (Eq.\ 4).$$

Here: NF (dB) indicate the noise figure of the optical amplifying apparatus 1000; NF1 (dB) the synthetic noise figure which is the sum of the losses of the CPL 1011 and the CPL 1012 to the noise figure of the optical amplifier 1013; NF2 (dB) the synthetic noise figure which is the sum of the loss of the CPL 1016 to the noise figure of the optical amplifier 1017; Pout (dB/channel) the output light level of the optical amplifier 1013; Lvat (dB) the attenuation amount of the VAT 1015; and Pin (dB/channel) the noise figure of the optical amplifier 1013.

Next, FIG. 11 is a diagram of the simulation results of the level diagram in the optical amplifying apparatus 1000.

In FIG. 11, there are sequentially enumerated from the lefthand side: the input, gain and output in the optical amplifier 1013; the attenuation in the VAT 1015; the input, gain and output in the optical amplifier 1017; the sum of the gain of the optical amplifier 1013 and the gain of the optical amplifier 1017; and the total gain of the optical amplifying apparatus 1000.

For comparisons with the simulation results of FIG. 7, calculations are made in FIG. 11 on the case in which Pin+15, Pin+10, Pin+5 and Pin are inputted to the optical amplifier 1013 and in which P0+5 is outputted from the optical amplifier 1017.

From the comparisons of FIG. 7 with FIG. 11, it is found that the attenuation amount of the VAT 1015 has to correspond to 17 to 2 (dB), and that the gain of the optical amplifier 1017 has to correspond to 17 to 2 (dB). It is not easy to fabricate such VAT and optical amplifier. In the optical amplifying apparatus 301 of the second embodiment, on the other hand, the attenuation amount of the front optical attenuating part 102 may correspond to 12 to 2 (dB), and the attenuation amount of the back optical attenuating part 104 may correspond to 2 or 7 (dB). The gain of the front optical amplifying part 101 may correspond to "Gr1-15" to "Gr1-5" (dB); the gain of the middle optical amplifying part 103 may correspond to 17 to 7 (dB); and the gain of the back optical amplifying part 105 may correspond to 7 (dB). Thus, the optical amplifying apparatus 301 of the second embodiment is easy to fabricate.

Figure 12:
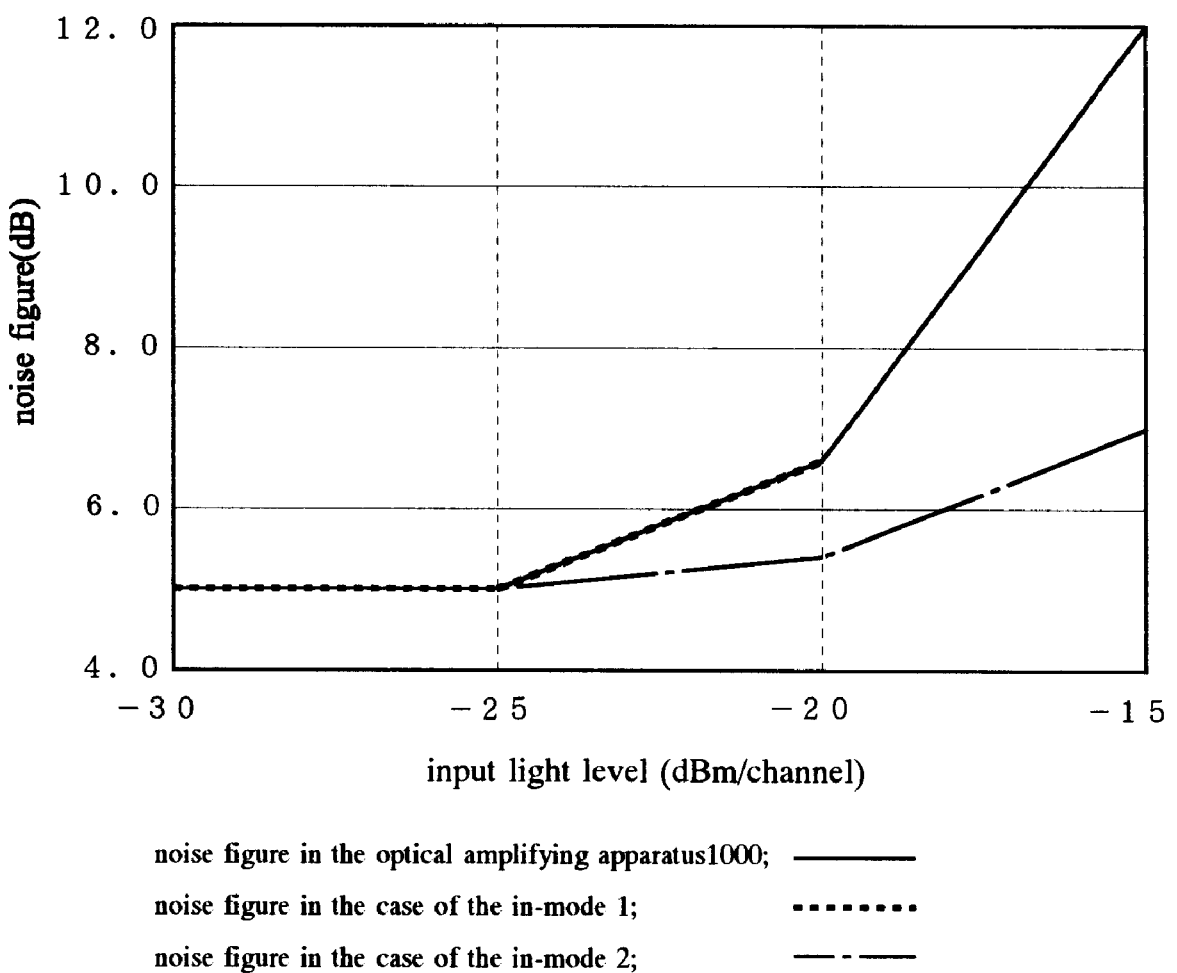
FIG. 12 is a graph showing a relation between an input light level and a noise figure and contrasting the case of the optical amplifying apparatus of the second embodiment and the comparison case of the optical amplifying apparatus.

Next, the relations, as based on the aforementioned simulations, between the input light level and the noise figure are shown in FIG. 12.

The ordinate of FIG. 12 indicates the noise figure (dB), and the abscissa indicates the input light level (dBm/channel). The broken curve indicates the noise figure of the case of the in-mode 1 in the optical amplifying apparatus 301 of the second embodiment, and the single-dotted curve indicates the noise figure of the case of the in-mode 2 in the optical amplifying apparatus 301 of the second embodiment. The solid curve indicates the noise figure of the case of the optical amplifying apparatus 1000.

Where the input light level changes within a range of –30 to –15 (dBm/channel), as shown in FIG. 12, the noise figure of the optical amplifying apparatus 301 of the second embodiment is 5 to 7 (dB), whereas the noise figure of the optical amplifying apparatus 1000 is 5 to 12 (dB). Especially by switching the mode to the in-mode 2 within the range of the input light level of –25 to –15 (dBm/channel), the optical amplifying apparatus 301 in the second embodiment is enabled to lower the noise figure drastically, as compared with the optical amplifying apparatus 1000.

Here will be described another embodiment of the invention.

Construction of Third Embodiment

This third embodiment is an optical amplifying apparatus 302 which uses a back optical attenuating part 106 in place of the back optical attenuating part 104 in the optical amplifying apparatus 301 of the second embodiment and a back optical amplifying part 107 in place of the back optical amplifying part 105.

Figure 13:
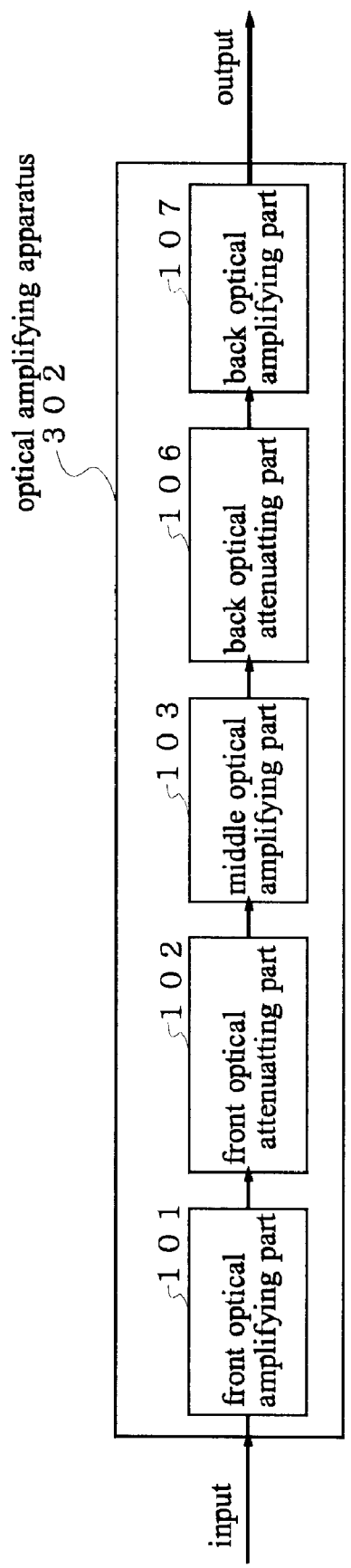
FIG. 13 is a diagram showing a construction of an optical amplifying apparatus according to a third embodiment.

In FIG. 13, the WDM optical signal to be inputted to an optical amplifying apparatus 302 in the third embodiment is inputted to and amplified by a front optical amplifying part 101. The WDM optical signal amplified is inputted to and attenuated by a front optical attenuating part 102. The WDM optical signal attenuated is inputted to and amplified by a middle optical amplifying part 103. The WDM optical signal amplified is inputted to and attenuated by a back optical attenuating part 106. The WDM optical signal attenuated is inputted to and amplified by a back optical amplifying part 107. The WDM signal amplified is outputted as the output light of the optical amplifying apparatus 302.

The optical amplifying apparatus 302 has two input light modes of an in-mode 1 and an in-mode 2. For examples, the in-mode 1 is the input light mode corresponding to the case in which the input light level is –30 to –20 (dBm/channel), and the in-mode 2 is the input light mode corresponding to the case in which the input light level is –25 to –15 (dBm/channel).

Figure 5:
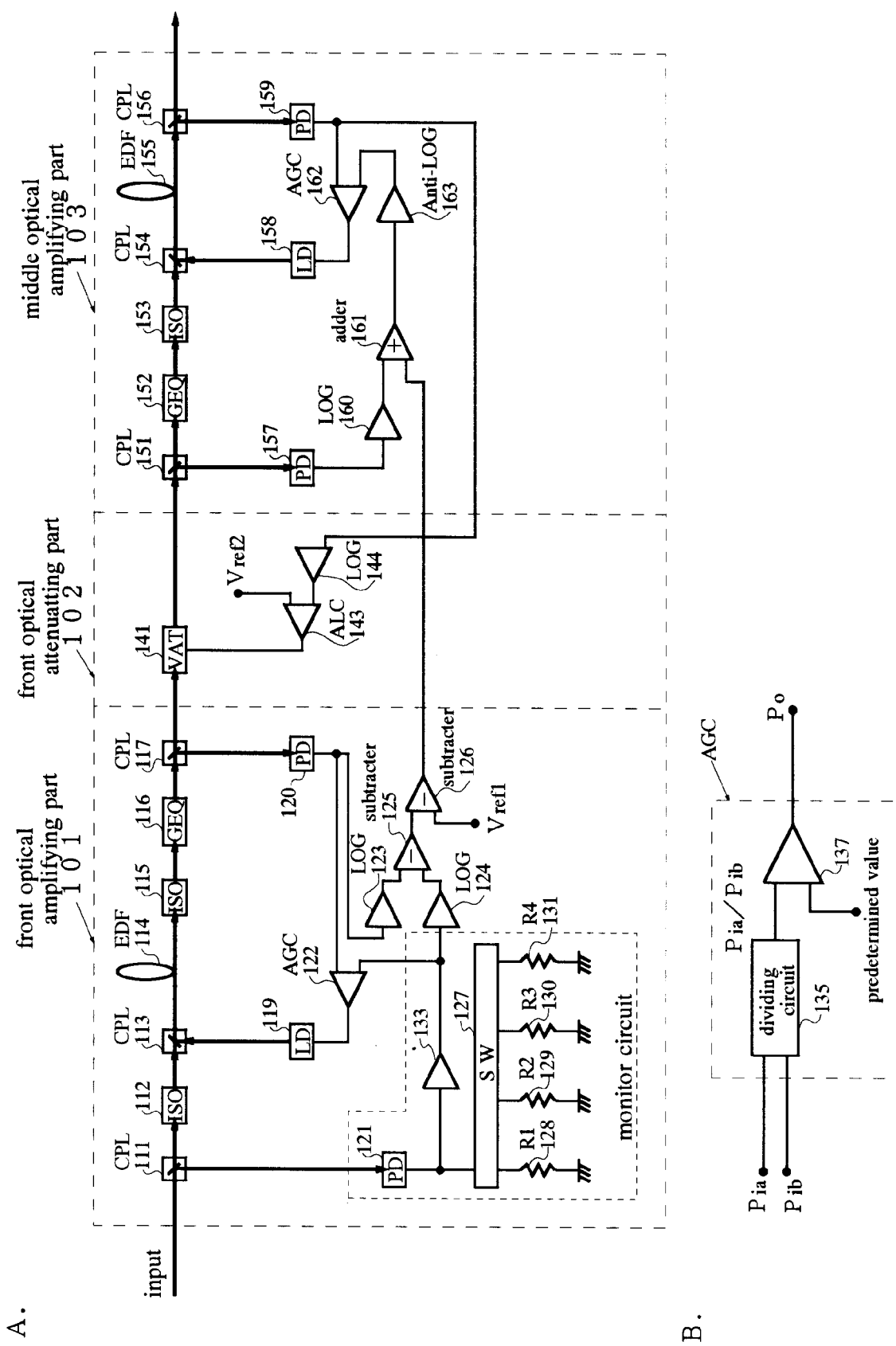
FIGS. 5A and 5B are diagrams showing constructions of a front optical amplifying part, a front optical attenuating part and a middle optical amplifying part in the second embodiment.

Here, the constructions of the front optical amplifying part 101, the front optical attenuating part 102 and the middle optical amplifying part 103 are identical to those of the second embodiment shown in FIG. 5 so that their description will be omitted.

Here will be described the constructions of the back optical attenuating part 106 and the back optical amplifying part 107.

First of all, the construction of the back optical attenuating part 106 will be described with reference to FIG. 14.

Figure 14:
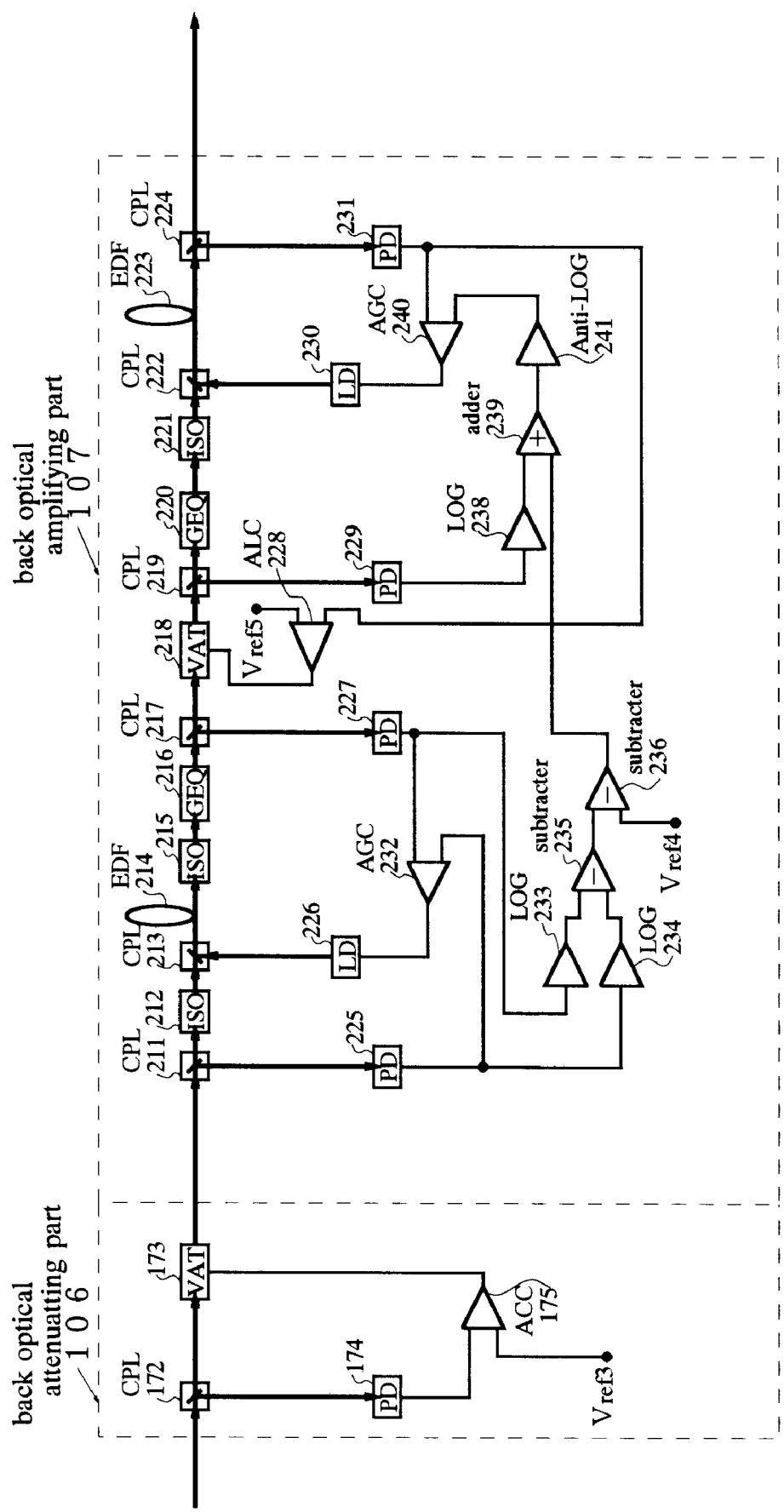
FIG. 14 is a diagram showing constructions of a back optical attenuating part and a back optical amplifying part in the third embodiment.

In FIG. 14, the WDM optical signal, as outputted from the CPL 156 (FIG. 5) in the middle optical amplifying part 103, is inputted to a CPL 172. Of the WDM optical signals branched by the CPL 172, one is inputted through a VAT 173 to a CPL 211 in the back optical amplifying part 107 whereas the other is inputted to a PD 174.

The attenuation amount of the VAT 173 is initially set to an attenuation amount for the in-mode 1. An attenuation controlling circuit (as will be abbreviated into the "ACC") 175 adjusts the attenuation amount of the VAT 173 to that for the in-mode 2 by outputting a control signal to the VAT 173. The attenuation amount for the in-mode 2 is set to a value larger than the attenuation amount for the in-mode 1 by a value which is calculated in the back optical attenuating part 106 by subtracting the input light level for the in-mode 1 from the input light level for the in-mode 2.

The output of the PD 174 is inputted to one input terminal of the ACC 175. To the other input terminal of the ACC 175, there is inputted a predetermined reference voltage Vref3. This reference voltage Vref3 is set to a voltage value which is equal to the output of the PD 174 where the WDM optical signal of the first target value for the in-mode 1 is inputted to the back optical attenuating part 106.

The ACC 175 adjusts the attenuation amount of the VAT 173 by comparing the output of the PD 174 and the reference voltage Vref3 and by outputting a signal according to the difference or the comparison result to the VAT 173. Where the WDM optical signal of the in-mode 1 is inputted to the optical amplifying apparatus 302, more specifically, the output of the PD 174 is equal to the reference voltage Vref3 so that the ACC 175 outputs no signal to the VAT 173. Where the WDM optical signal of the in-mode 2 is inputted to the optical amplifying apparatus 302, on the other hand, the output of the PD 174 makes a different from the reference voltage Vref3 so that the ACC 175 outputs a signal according to that difference, to the VAT 173.

Next, the construction of the back optical amplifying part 107 will be described with reference to FIG. 14.

In FIG. 14, the WDM optical signal, as outputted from the VAT 173 in the back optical attenuating part 106, is inputted to the CPL 211 in the back optical amplifying part 107.

Of the WDM optical signals branched by the CPL 211, one is inputted to a PD 225 whereas the other is inputted to an ISO 212. The output of the PD 225 is inputted to an AGC 232 and a LOG 234. The WDM optical signal, as outputted from the ISO 212, is inputted to a CPL 213.

To the CPL 213, on the other hand, there is also inputted the laser beam of an LD 226. The WDM optical signal from the ISO 212 and the laser beam from the LD 226 are combined and inputted to an EDF 214. In this EDF 214, a population inversion is generated by the laser beam of the LD 226 in the EDF 214 so that the WDM optical signal is amplified by the stimulated emission in the EDF 214.

The WDM optical signal, as amplified by the EDF 214, is inputted through an ISO 215 and a GEQ 216 to a CPL 217. The GEQ 216 compensates the gain wave length characteristics curve of the EDF 214 that it is generally flat. Of the WDM optical signals branched by the CPL 217, one is inputted to a VAT 218 whereas the other is inputted to a PD 227. The output of this PD 227 is inputted to the AGC 232 and a LOG 233.

The AGC adjusts the gain of the EDF 214 to a predetermined constant gain by judging the gain of the EDF 214 from the output of the PD 227 and the output of the PD 225 and by adjusting the driving current (or the injection current) of the LD 226.

The LOG 233 converts the output of the PD 227 into the logarithmic value of the voltage level, and the converted logarithmic value is inputted to one input terminal of a subtracter 235. The LOG 234 converts the output of the PD 225 into a logarithmic value of the voltage level, and the converted logarithmic value is inputted to the other input terminal of the subtracter 235. This subtracter 235 outputs the value, as calculated by subtracting the output of the LOG 234 from the output of the LOG 233, to a subtracter 236. The value, as calculated by subtracting the output of the LOG 234 from the output of the LOG 233, corresponds to the gain of the EDF 214.

The subtracter 236 outputs the value, which is obtained by subtracting the output of the subtracter 235 from a predetermined reference voltage Vref 4, to an adder 239. This reference voltage Vref4 is a voltage value which is to be referred to when the sum of the gain of the EDF 214 and the gain of an EDF 223 is set to a predetermined constant value Gs2.

On the other hand, the WDM optical signal, as attenuated by the VAT 218, is inputted to a CPL 219. Of the WDM optical signals branched by the CPL 219, one is inputted to a PD 229 whereas the other is inputted through a GEQ 220 and an ISO 221 to the CPL 222. The GEQ 220 compensates the gain wavelength characteristics curve of the EDF 223 so that it is substantially flat. A laser beam of an LD 230 is inputted to the CPL 222 and is combined with the WDM optical signal, as outputted from the ISO 221, and inputted to the EDF 223.

The EDF 223 amplifies the WDM optical signal and then outputs it to a CPL 224. Of the WDM optical signals branched by the CPL 224, one is outputted as the output light of the optical amplifying apparatus 302, whereas the other is inputted to a PD 231. The output of this PD 231 is inputted to an AGC 240 and an ALC 228.

This ALC 228 adjusts the attenuation amount of the VAT 218 by comparing a predetermined reference voltage Vref5 and the output of the PD 231 so that the optical level per channel of the WDM optical signal, as outputted from the optical amplifying apparatus 302, may be constant. Therefore, the reference voltage Vref5 is a voltage value which is to be referred to so that it may be at a constant output light level with respect to the input light level of the back optical amplifying part 107.

The output of the PD 229 is inputted to an LOG 238. This LOG 238 converts the output of the PD 229 into a logarithmic value of the voltage level, and the converted logarithmic value is inputted to one input terminal of the adder 239. To the other input terminal of the adder 239, there is inputted the output of the aforementioned subtracter 236.

The adder 239 adds the output of the LOG 238 and the output of the subtracter 236 and outputs the added value to an Anti-LOG 241. This Anti-LOG 241 converts the added value into an antilogarithmic value and outputs the converted value to the AGC 240.

This AGC 240 adjusts the gain of the EDF 223 by adjusting the driving current (or the injection current) of the LD 230 so that the sum of the gain of the EDF 214 and the gain of the EDF 223 may be constant from the output of the PD 231 and the output of the Anti-LOG 241.

Operations and Effects of Third Embodiment

When the optical amplifying apparatus 302 of the third embodiment is installed as a repeater station in the optical communication system, the modes of the input light and the SW 127 are set according to the optical level which is outputted from the optical transmission line connected with the input side of the optical amplifying apparatus 302.

Where the optical level is at −30 to −20 (dBm/channel), for example, the in-mode 1 is selected so that the reference voltage Vref2 is set to the reference voltage Vref2M1 for the in-mode 1. The monitor circuit selects a resistor such as the resistor 128 corresponding to the case, in which the optical level is at −30 to −20 (dBm/channel), and the SW 127 is switched to connect the PD 121 and the resistor 128. As a result, the terminal voltage of the resistor 128 is inputted to the AGC 122 and the LOG 124.

In the optical amplifying apparatus 302 set to have the in-mode 1 and the resistor 128, the operations and effects of the front optical amplifying part 101, the front optical attenuating part 102 and the middle optical amplifying part 103 are similar to those of the second embodiment so that their description will be omitted.

The optical level of the WDM optical signal to be inputted to the back optical attenuating part 106 is kept at the first target value T1M1 for the in-mode 1, as has been described in the second embodiment, irrespective of the fluctuation of the input light level of the front optical amplifying part 101 within the range of the in-mode 1. Therefore, the difference between the output of the PD 174 and the reference voltage Vref3 is substantially at "zero" so that the ACC 175 outputs no signal to the VAT 173. The attenuation amount of the VAT 173 is kept at the constant value for the in-mode 1, and the WDM optical signal is attenuated to the attenuation amount for the in-mode 1. Therefore, the input light level of the back optical amplifying part 107 is kept substantially constant.

In the back optical amplifying part 107, the AGC 232 outputs the signal according to the ratio of the output of the PD 227 to the output of the PD 225, to the LD 226 thereby to control the gain of the EDF 214 so that the ratio may be a predetermined value. As a result, the EDF 214 is controlled to a constant gain.

The AGC 240 outputs the signal according to the ratio of the output of the PD 231 to the output of the Anti-LOG 241, to the LD 230 thereby to control the gain of the EDF 223 so that the ratio may be a predetermined value. As a result, the EDF 223 is controlled to a constant gain.

The output of the Anti-LOG 241 is the sum which is calculated by adding the output of the subtracter 236 to the optical level of the WDM optical signal inputted to the back optical amplifying part 107. The output of the subtracter 236 is the value which is calculated by subtracting the gain of the EDF 214 from the sum Gs2 of the gain of the EDF 214 and the gain of the EDF 223. Therefore, the AGC 240 adjusts the gain of the EDF 223 with reference to the output of the Anti-LOG 241 so that the sum of the gain of the EDF 214 and the gain of the EDF 223 is kept substantially at the value Gs2. In short, the portion composed of the EDF 214 and the EDF 223 satisfies the (Equation 3).

The ALC 228 controls the attenuation amount of the VAT 218 by outputting the signal according to the difference between the reference voltage Vref5 and the output of the PD 231 to the VAT 218 so that the difference may be at "zero". As a result, the output light level of the back optical amplifying part 107 is controlled to a constant value.

Where the optical level is at −25 to −15 (dBm/channel) when the optical amplifying apparatus 302 is installed as another optical repeater station, on the other hand, the in-mode 2 is selected. As a result, the reference voltage Vref2 is set to the reference voltage Vref2M2 for the in-mode 2. The monitor circuit selects are resistor such as the resistor 130 corresponding to the case, in which the optical level is at −25 to −15 (dBm/channel), and the SW 127 is switched to connect the PD 121 and the resistor 130.

On the other hand, the gain of the gain variable amplifier 133 is switched so that the a signal at the same level is outputted if the input power of the PD 121 is equal. For this, the terminal voltage of the resistor 130 is inputted to the AGC 122 and the LOG 124.

The AGCs 122 and 162 and the ALC 143 act as in the foregoing in-mode 1, but the reference voltage Vref2 is set to the Vref2M2 for the in-mode 2, so that the output light level of the middle optical amplifying part 103 is the first target value T1M2 for the in-mode 2.

Here in the back optical attenuating part 106, the optical level of the WDM optical signal to be inputted to the back optical attenuating part 106 is kept at the first target value T1M2 so that a difference is made between the output of the PD174 and there ference voltage Vref3. The ACC 175 outputs a signal according to that difference, to the VAT 173. Therefore, the attenuation amount of the VAT 173 is kept at a constant value for the in-mode 2, and the WDM optical signal is attenuated with the attenuation amount for the in-mode 2. As a result, the output light level of the back optical attenuating part 106 is equal to that of the case of the in-mode 1.

Then, the back optical amplifying part 107 acts as in the aforementioned case of the in-mode 1.

As a result, the optical amplifying apparatus 302 is enabled to cover the wide input dynamic range by having the two input light modes. Since the output light level of the back optical attenuating part 106 is kept substantially constant, moreover, the optical amplifying apparatus 302 is freed from the degradation in the noise figure when the modes of the input light are switched.

Here in the third embodiment, too, the simulation results, as shown in FIG. 7, can be obtained by setting the first target value and the attenuation amount of the VAT 173 in each mode to ones similar to those the second embodiment and by setting the output light level of the back optical amplifying part 107 to P0+5.

Here will be described another embodiment of the invention.

Construction of Fourth Embodiment

This fourth embodiment is an optical amplifying apparatus 303 which uses a back optical attenuating part 108 in place of the back optical attenuating part 104 in the optical amplifying apparatus 301 of the second embodiment and a back optical amplifying part 107 in place of the back optical amplifying part 105.

In FIG. 15, the WDM optical signal to be inputted to an optical amplifying apparatus 303 in the fourth embodiment is inputted to and amplified by a front optical amplifying part 101. The WDM optical signal amplified is inputted to and attenuated by a front optical attenuating part 102. The WDM optical signal attenuated is inputted to and amplified by a middle optical amplifying part 103. The WDM optical signal amplified is inputted to and attenuated by a back optical attenuating part 108. The WDM optical signal attenuated is inputted to and amplified by a back optical amplifying part 107. The WDM signal amplified is outputted as the output light of the optical amplifying apparatus 303.

The optical amplifying apparatus 303 has two input light modes of an in-mode 1 and an in-mode 2. For examples, the in-mode 1 is the input light mode corresponding to the case in which the input light level is −30 to −20 (dBm/channel), and the in-mode 2 is the input light mode corresponding to the case in which the input light level is −25 to −15 (dBm/channel).

Moreover, the optical amplifying apparatus 303 is given two modes of the output light, i.e., an out-mode 1 and an out-mode 2. Of these, the out-mode 1 is an output light mode in which the output light level is 4 (dBm/channel), and the out-mode 2 is an output light mode in which the output light level is 8 (dBm/channel).

Here, the constructions of the front optical amplifying part 101, the front optical attenuating part 102 and the middle optical amplifying part 103 are identical to those of the second embodiment shown in FIG. 5 so that their description will be omitted. On the other hand, the construction of the back optical amplifying part 107 is similar to that of the third embodiment shown in FIG. 14 excepting that a reference voltage Vref8 of the ALC 228 is changed according to the mode of the output light, so that its description will be omitted.

The construction of the back optical attenuating part 108 will be described with reference to FIG. 16.

Figure 16:
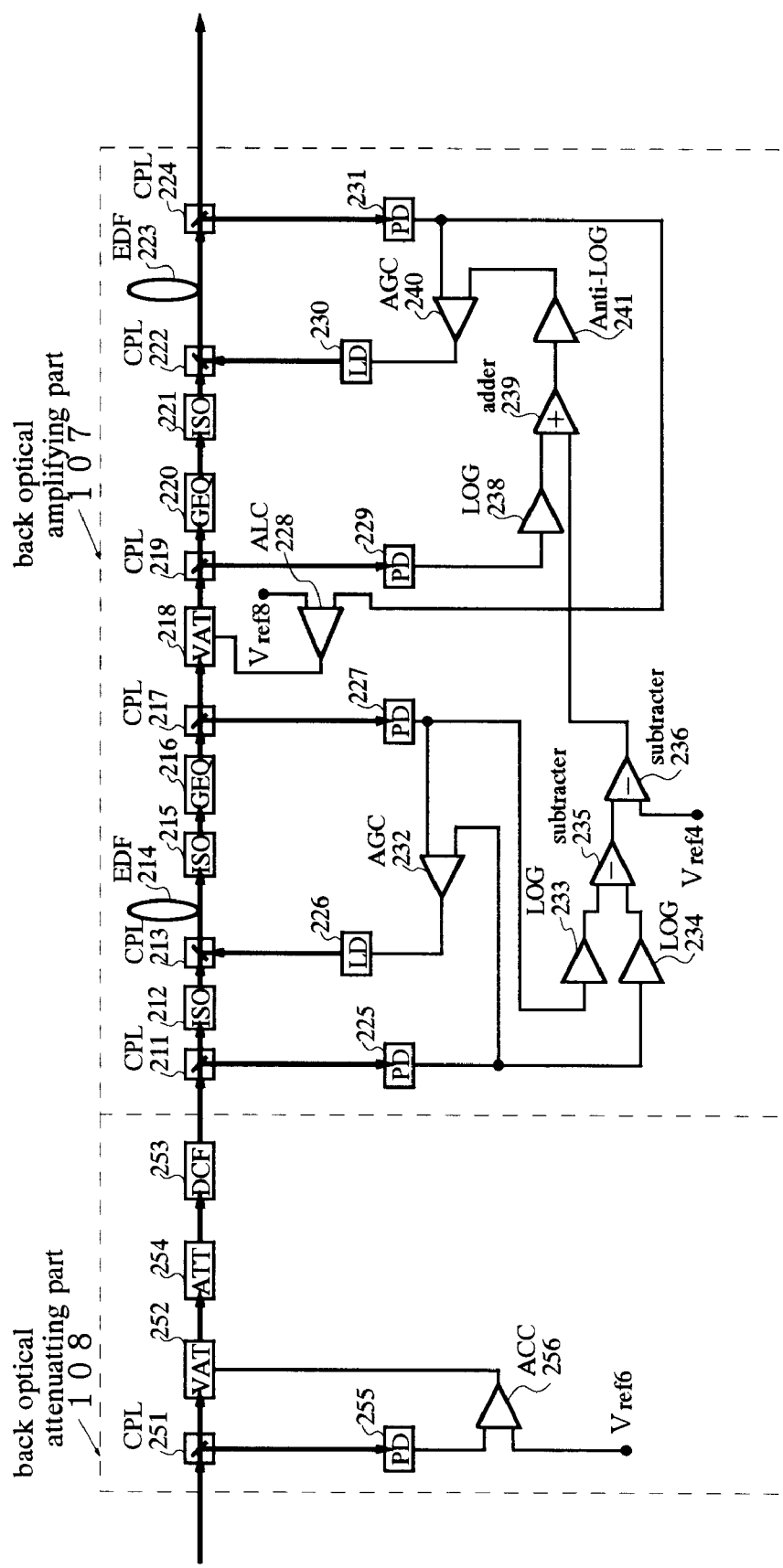
FIG. 16 is a diagram showing constructions of a back optical attenuating part and a back optical amplifying part in the fourth embodiment.

In FIG. 16, the WDM optical signal, as outputted from the CPL 156 (FIG. 5) in the middle optical amplifying part 103, is inputted to a CPL 251. Of the WDM optical signals branched by the CPL 251, one is inputted through a VAT 252, an ATT 254 and a dispersion compensating fiber (as will be abbreviated into the "DCF") 253 to the CPL 211 in the back optical amplifying part 107, whereas the other is inputted to a PD 255.

The attenuation amount of the VAT 252 is initially to the value for the in-mode 1 and then to the value for the in-mode 2 in accordance with the output of an ACC 256 for adjusting the attenuation amount of the VAT 252. The attenuation amount for the in-mode 2 is set larger, by the value which is calculated in the back optical attenuating part 108 by subtracting the input light level of the case of the in-mode 1 from the input light level of the case of the in-mode 2, than the attenuation amount for the in-mode 1.

The output of the PD 255 is inputted to one input terminal of the ACC 256. To the other input terminal of the ACC 256, there is inputted a predetermined reference voltage Vref6. This reference voltage Vref6 is set to a voltage value equal to the output of the PD 255 of the case in which the WDM optical signal of the first target value for the in-mode 1 is inputted to the back optical attenuating part 108.

The ACC 256 adjusts the attenuation amount of the VAT 252 by comparing the output of the PD 255 and the reference voltage Vref6 and by outputting a signal according to the difference to the VAT 252. Where the WDM optical signal of the in-mode 1 is inputted to the optical amplifying apparatus 303, more specifically, the output of the PD 255 is equal to the reference voltage Vref6 so that the ACC 256 outputs no signal to the VAT 252.

Where the WDM optical signal of the in-mode 2 is inputted to the optical amplifying apparatus 303, on the other hand, the output of the PD 255 makes a difference from the reference voltage Vref6 so that the ACC 256 outputs a signal according to that difference, to the VAT 252.

The DCF 253 compensates a chromatic dispersion occurring in the optical transmission line connected with the optical amplifying apparatus 303 to transmit the WDM optical signal and a chromatic dispersion occurring in the optical amplifying apparatus 303. The DCF 253 is an optical fiber having chromatic dispersion characteristics of the inverse sign inverted from that of the dispersion value of the WDM optical signal and it is necessary for using the zero-dispersion fibers of 1.3 microns already laid massively, in the bandwidth of 1.55 microns.

Here, the DCF 253 may be replaced by a dispersion compensator such as the chirped grating or the phase conjugator.

The ATT 254 is prepared for each mode of the output light, and its attenuation amount is set with the output light level of the optical amplifying apparatus 303 taken into consideration. The attenuation amount of the ATT 254 for the out-mode 2 causes a transmission loss in the DCF 253, too, so that the sum of the attenuation amount of the ATT 254 and the attenuation amount of the DCF 253 is set smaller, by the value which is calculated in the back optical amplifying part 107 by subtracting the output light level of the case of the out-mode 1 from the output light level of the case of the out-mode 2, than the attenuation amount of the ATT 254 for the out-mode 1. Where the output light level of the out-mode 1 is 4 whereas the output light level of the out-mode 2 is 8, for example, the attenuation amount of the ATT 254 for the out-mode 2 is set to the value which is calculated by further subtracting the attenuation amount produced at the DCF 253 from the value calculated by subtracting the output light level 4 of the case of the out-mode 1 from the output light level 8 of the case of the out-mode 2.

In the back optical amplifying part 107, the reference voltage Vref8 to be supplied to one input terminal of the ALC 228 is set to correspond to each out-mode of the modes of the output light so that a reference voltage Vref8M1 for the out-mode 1 and a reference voltage Vref8M2 for the out-mode 2 can be supplied.

Operations and Effects of Fourth Embodiment

When the optical amplifying apparatus 303 of the fourth embodiment is installed as a repeater station of the optical communication system, the modes of the input light and the SW 127 are set according to the optical level which is outputted from the optical transmission line connected with the input side of the optical amplifying apparatus 303.

Where the optical level is at −30 to −20 (dBm/channel), for example, the in-mode 1 is selected so that the reference voltage Vref2 is set to the reference voltage Vref2M1 for the in-mode 1. The monitor circuit selects a resistor such as the resistor 128 corresponding to the case, in which the optical level is at −30 to −20 (dBm/channel), and the SW 127 is switched to connect the PD 121 and the resistor 128. AGC 133 is switched so that the gain of the sum from the PD 121 to the AGC 133 is kept at the constant value. As a result, the terminal voltage of the resistor 128 is inputted to the AGC 133.

In the optical amplifying apparatus 303 set to have the in-mode 1 and the resistor 128, the operations and effects of the front optical amplifying part 101, the front optical attenuating part 102 and the middle optical amplifying part 103 are similar to those of the second embodiment so that their description will be omitted.

Moreover, the mode of the output light is set according to the kind of the optical transmission line to be connected with the output side of the optical amplifying apparatus 303.

Where the kind of the optical transmission line is the NZ-DSF, for example, the out-mode 1 is selected, and the ATT 254 is connected with an optical attenuator having an attenuation amount for the out-mode 1. The reference voltage Vref8 is set to the voltage value Vref8M1 for setting the output light level of the back optical amplifying part 107 to 4 (dBm/channel).

The optical level of the WDM optical signal to be inputted to the back optical attenuating part 108 is so kept that the output light level of the middle optical amplifying part-103 is at the first target value T1M1 corresponding to the in-mode 1, as has been described in connection with the second embodiment. Therefore, the difference between the output of the PD 172 and the reference voltage Vref6 is substantially "zero" so that the ACC 256 outputs no signal to the VAT 252. As a result, the attenuation amount of the VAT 252 is kept at the constant value for the in-mode 1, with which the WDM optical signal is attenuated.

The WDM optical signal, as attenuated in the VAT 252, is attenuated in the ATT 254 and the DCF 253 at a constant rate corresponding to the out-mode 1 so that the input light level of the back optical amplifying part 107 is kept substantially constant irrespective of the WDM optical signal to be inputted to the optical amplifying apparatus 303.

In the back optical amplifying part 107, the AGC 232 outputs a signal according to the ratio of the output of the PD 227 to the output of the PD 225, to the LD 226 thereby to control the gain of the EDF 214 so that the ratio may take a predetermined value. As a result, the EDF 214 is controlled with a constant gain.

The AGC 240 outputs a signal according to the ratio of the output of the PD 231 to the output of the Anti-LOG 241, to the LD 230 thereby to control the gain of the EDF 223 so that the ratio may take a predetermined value. As a result, the EDF 223 is controlled with a constant gain.

The output of the Anti-LOG 241 is the sum of the optical level of the WDM optical signal, as inputted to the back optical amplifying part 107, and the output of the subtracter 236. The output of this subtracter 236 is calculated by subtracting the gain of the EDF 214 from the sum Gs2 of the gain of the EDF 214 and the gain of the EDF 223. Therefore, the AGC 240 adjusts the gain of the EFD 223 with reference to the output of the Anti-LOG 241, so that the sum of the gain of the EDF 214 and the gain of the EDF 223 is kept substantially at the value Gs2. In short, the portion composed of the EDF 214 and the EDF 223 satisfies the (Equation 3).

The ALC 228 outputs a signal according to the difference between the reference voltage Vref8M1 set for the out-mode 1 and the output of the PD 231, to the VAT 218 thereby to control the attenuation amount of the VAT 218 so that the difference may be "zero". As a result, the output light level of the back optical amplifying part 107 is controlled substantially constant to the optical level 4 of the out-mode 1.

Where this optical amplifying apparatus 303 is installed as another optical repeater station, on the other hand, the input light level is not different from the aforementioned one. Where the kind of the optical transmission line to be connected with the output side is an SMF, however, the out-mode 2 is selected so that the ATT 254 is connected with the optical attenuator having the attenuation amount for the out-mode 2. The reference voltage Vref8 is set to the voltage value Vref 8M2 for setting the output light level of the back optical amplifying part 107 to 8 (dBm/channel).

In the back optical attenuating part 108, the optical level of the WDM optical signal to be inputted remains in the in-mode 1 so that it is kept at the first target value T1M1 corresponding to the in-mode 1. As a result, the attenuation amount of the VAT 252 is kept at the constant rate for the in-mode 1, at which the WDM optical signal is attenuated.

On the other hand, the WDM optical signal, as attenuated in the VAT 252, is attenuated in the ATT 254 and the DCF 253 at the constant rate corresponding to the out-mode 2.

In the back optical amplifying part 107, the ALC 228 outputs a signal according to the difference between the reference voltage Vref 8M2 set for the out-mode 2 and the output of the PD 231, to the VAT 218 thereby to control the attenuation amount of the VAT 218 so that the difference may be "zero". As a result, the output light level of the back optical amplifying part 107 is controlled substantially constant to the light level 8 of the out-mode 2.

Thus, the optical amplifying apparatus 303 can set the output light level in accordance with the kind of the optical transmission line so that no nonlinear optical effect is caused in the WDM optical signal on the optical transmission line.

The optical amplifying apparatus 303 can compensate the dispersion of the losses of the ATT 254 and the DCF 253 because the back optical amplifying part 107 controls the output to the constant.

In order to explain the aforementioned operations and effects more specifically, here is simulated the level diagram in the optical amplifying apparatus 303.

In FIG. 17, there are sequentially enumerated from the lefthand side: the modes of the output light; the system gain; the input, the gain and the output in the single optical amplifying section composed of the front optical amplifying part 101, the front optical attenuating part 102 and the middle optical amplifying part 103; the inputs, the gains and the outputs of the back optical attenuating part 108 and the back optical amplifying part 107; and the kinds of the optical fibers.

The upper row presents the simulation results of the case of the out-mode 1, and the lower row presents the simulation results of the case of the out-mode 2. In the out-mode 1, the calculations were made where −21 to −11 and −26 to −16 (dBm/channel) were inputted to the front optical amplifying part 101. In the out-mode 2, the calculations were made where −17 to −11 and −26 to −16 (dBm/channel) were inputted to the front optical amplifying part 101.

The second target value (or the output light level of the back optical amplifying part 107) was set at 4 (dBm/channel) in the out-mode 1 and at 8 (dBm/channel) in the out-mode 2. The attenuation amounts of the back optical attenuating part 108 are set, as enumerated in FIG. 17, according to the fluctuation of the transmission loss of the DCF 253.

The results, as have been calculated under the above-specified conditions, are enumerated in FIG. 17. Thus, the optical amplifying apparatus 303 can set the output light levels in accordance with the kinds of the optical transmission line.

In order to compare the effects of the fourth embodiment, there was calculated the level diagram of the optical amplifying apparatus, as shown in FIG. 9.

In FIG. 18, there are sequentially enumerated from the lefthand side: the system gain; the input, the gain and the output in the optical amplifier 1013; the inputs, the gains and the outputs of the VAT 1015 and the optical amplifier 1017; the sum of the gains of the optical amplifiers; and the kinds of the optical fibers.

In order to compare the simulation results of FIG. 17, the calculations were made in FIG. 18 where −11 to −26 (dBm/channel) were inputted to the optical amplifier 1013 and where 4 (dB) was outputted from the optical amplifier 1017. Other calculations were also made where −11 to −22 (dBm/channel) were inputted to the optical amplifier 1013 and where 8 (dB) was outputted from the optical amplifier 1017.

As will be understood by comparing the out-mode 1 of FIG. 17 with the two upper rows of FIG. 18, the gain of the optical amplifier 1017 has to correspond to 23 and 38 (dB). As will be understood by comparing the out-mode 2 of FIG. 17 and the two lower rows of FIG. 18, moreover, the gain of the optical amplifier 1017 has to correspond 27 and 38 (dB). It is not easy to fabricate such optical amplifier. In the optical amplifying apparatus 303 of the fourth embodiment, on the other hand, the back optical amplifying part 107 may correspond to 27b (dB). Thus in the optical amplifying apparatus 303 of the fourth embodiment, the fabrication is within an easy range.

Here will be described another embodiment of the invention.

Construction of Fifth Embodiment

This fifth embodiment is an optical amplifying apparatus 304 which uses a back optical attenuating part 109 in place of the back optical attenuating part 104 in the optical amplifying apparatus 301 of the second embodiment.

Figure 19:
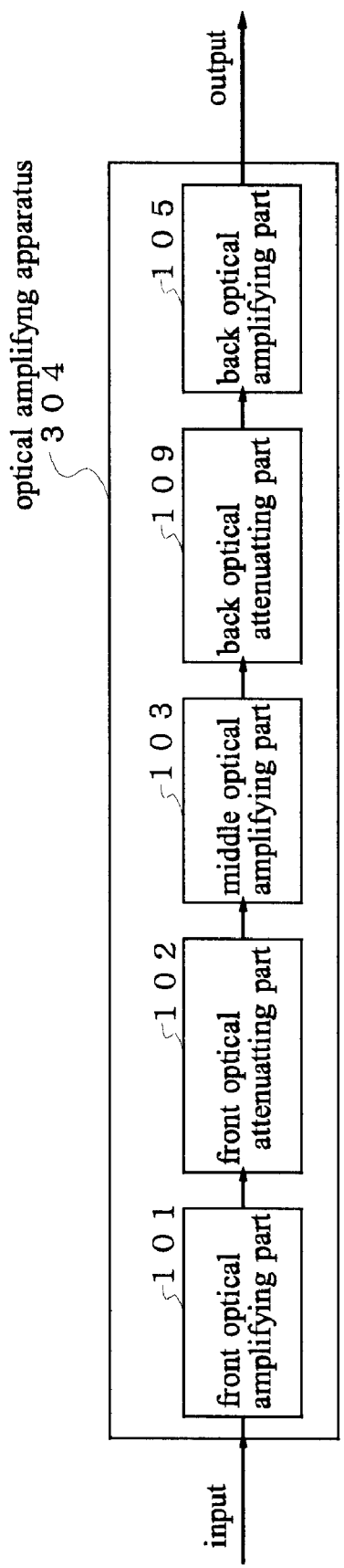
FIG. 19 is a diagram showing a construction of an optical amplifying apparatus according to a fifth embodiment.

In FIG. 19, the WDM optical signal to be inputted to an optical amplifying apparatus 304 in the fifth embodiment is inputted to and amplified by a front optical amplifying part 101. The WDM optical signal amplified is inputted to and attenuated by a front optical attenuating part 102. The WDM optical signal attenuated is inputted to and amplified by a middle optical amplifying part 103. The WDM optical signal amplified is inputted to and attenuated by a back optical attenuating part 109. The WDM optical signal attenuated is inputted to and amplified by a back optical amplifying part 105. The WDM signal amplified is outputted as the output light of the optical amplifying apparatus 304.

The WDM optical signal is an optical signal set to a wavelength band of the C band.

The optical amplifying apparatus 304 has two input light modes of an in-mode 1 and an in-mode 2. For examples, the in-mode 1 is the input light mode corresponding to the case in which the input light level is −30 to −20 (dBm/channel), and the in-mode 2 is the input light mode corresponding to the case in which the input light level is −25 to 15 (dBm/channel).

Moreover, the optical amplifying apparatus 304 is given two modes of the output light, i.e., an out-mode 1 and an out-mode 2. Of these, the out-mode 1 is an output light mode in which the output light level is 4 (dBm/channel), and the out-mode 2 is an output light mode in which the output light level is 8 (dBm/channel).

Here, the constructions of the front optical amplifying part 101, the front optical attenuating part 102 and the middle optical amplifying part 103 are identical to those of the second embodiment shown in FIG. 5 so that their description will be omitted.

The construction of the back optical amplifying part 105 is similar to that of the second embodiment excepting that the predetermined to be utilized for setting the gain in the AGC 190 is changed according to the mode of the output light, so that its description will be omitted.

The construction of the back optical attenuating part 109 will be described with reference to FIGS. 20 and 21.

Figure 20:
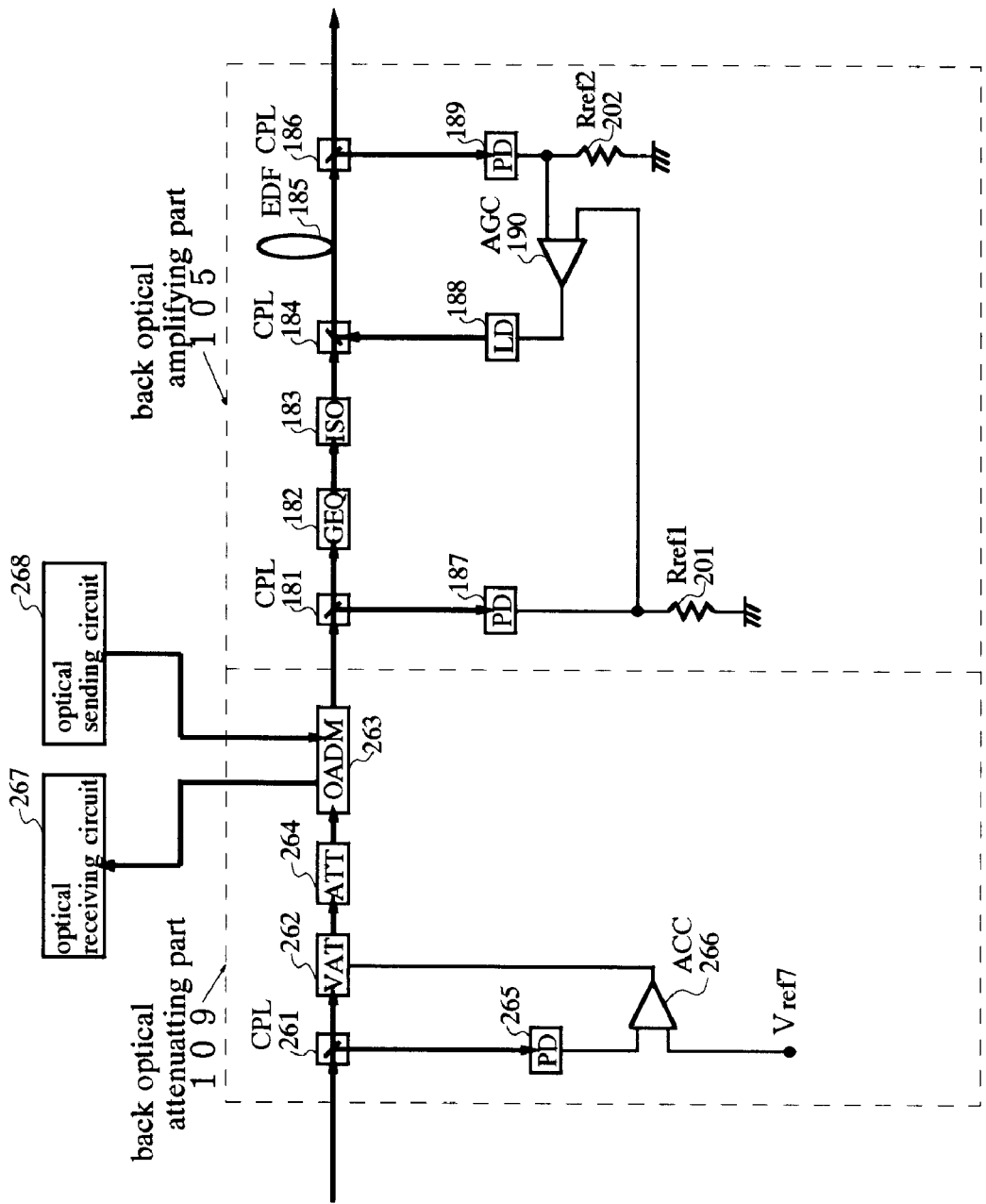
FIG. 20 is a diagram showing constructions of a back optical attenuating part and a back optical amplifying part in the fifth embodiment.

In FIG. 20, the WDM optical signal, as outputted from the CPL 156 (FIG. 5) in the middle optical amplifying part 103, is inputted to a CPL 261 in the back optical attenuating part 109. Of the WDM optical signals branched by the CPL 261, one is inputted through a VAT 262, an ATT 264 and an optical add/drop multiplexer (as will be abbreviated into the "OADM") 263 to the CPL 181 in the back optical amplifying part 105, whereas the other is inputted to a PD 265.

The attenuation amount of the VAT 262 is initially to the value for the in-mode 1 and then to the value for the in-mode 2 in accordance with the output of an ACC 266 for adjusting the attenuation amount of the VAT 262. The attenuation amount for the in-mode 2 is set larger, by the value which is calculated in the back optical attenuating part 109 by subtracting the input light level of the case of the in-mode 1 from the input light level of the case of the in-mode 2, than the attenuation amount for the in-mode 1.

The output of the PD 265 is inputted to one input terminal of the ACC 266. To the other input terminal of the ACC 266, there is inputted a predetermined reference voltage Vref7. This reference voltage Vref7 is set to a voltage value equal to the output of the PD 265 of the case in which the WDM optical signal of the first target value for the in-mode 1 is inputted to the back optical attenuating part 109.

The ACC 266 adjusts the attenuation amount of the VAT 262 by comparing the output of the PD 265 and the reference voltage Vref7 and by outputting a signal according to the difference to the VAT 262. Where the WDM optical signal of the in-mode 1 is inputted to the optical amplifying apparatus 304, more specifically, the output of the PD 265 is equal to the reference voltage Vref7 so that the ACC 266 outputs no signal to the VAT 262.

Where the WDM optical signal of the in-mode 2 is inputted to the optical amplifying apparatus 304, on the other hand, the output of the PD 265 makes a difference from the reference voltage Vref7 so that the ACC 266 outputs a signal according to that difference, to the VAT 262.

The ATT 264 is prepared for each mode of the output light, and its attenuation is set considering the output light level of the optical amplifying apparatus 304. The attenuation amount of the ATT 264 for the out-mode 2 causes a transmission loss in the OADM 263, too, so that the sum of the attenuation amount of the ATT 264 and the attenuation amount of the OADM 263 is set smaller, by the value which is calculated in the back optical amplifying part 105 by subtracting the out-put light level of the case of the out-mode 1 from the output light level of the case of the out-mode 2, than the at of the ATT 264 for the out-mode 1. Where the output light level of the out-mode 1 is 4 whereas the output light level of the out-mode 2 is 8, for example, the attenuation amount of the ATT. 264 for the out-mode 2 is set to the value which is calculated by further subtracting the attenuation caused at the OADM 263 from the value calculated by subtracting the output light level 4 of the case of the out-mode 1 from the output light level 8 of the case of the out-mode 2.

The OADM 263 is an optical circuit for dropping/adding/transmitting an optical signal (or channel) from the WDM optical signal to be transmitted on the optical transmission line. This OADM 263 is exemplified by a fixed wavelength type OADM capable of dropping/adding an optical signal of a fixed wavelength or by an arbitrary wavelength type OADM capable of dropping/adding an optical signal of an arbitrary wavelength. One example of the construction of the OADM 263 will be described with reference to FIG. 21.

Figure 21:
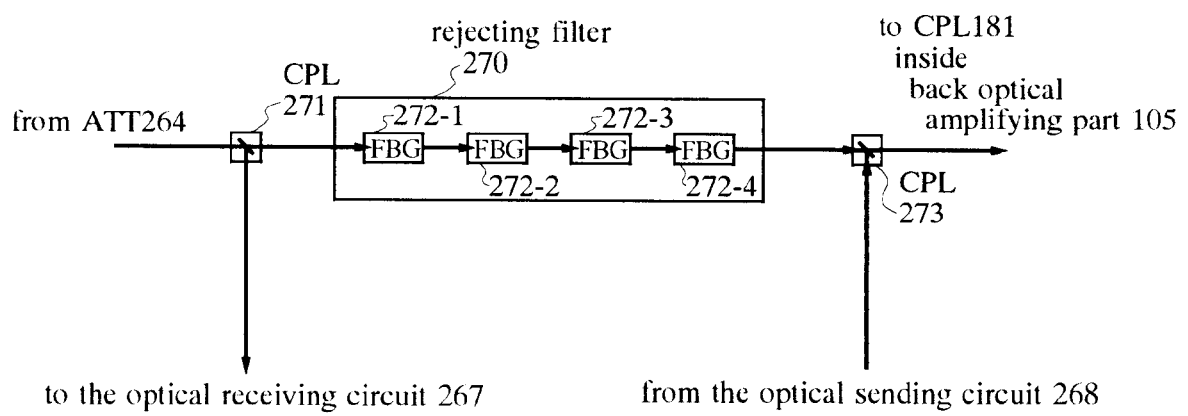
FIG. 21 is a diagram showing a construction example of an OADM in a back optical attenuating part of the fifth embodiment.

In FIGS. 20 and 21, the WDM optical signal, as outputted from the ATT 264 is inputted to a CPL 271 in the OADM. Of the WDM optical signals branched in the CPL 271, one is outputted to an optical receiving circuit 267 whereas the other is inputted to a rejecting filter 270.

This rejecting filter 270 is an optical circuit for eliminating four optical signals (or four channels) from the WDM optical signal. For these eliminations, the rejecting filter 270 has four optical fiber bragg grating filters (as will be abbreviated into the "FBG") 272-1 to 272-4 connected in tandem. These FBGs272 are exemplified by band-elimination filters having their elimination bands set not to eliminate the optical signals adjoining the optical signals to be eliminated.. The elimination bands of the individual FBGs 272-1 to 272-4 are individually set to have their individual center wavelengths at those of the optical signals to be dropped by the OADM.

Where the WDM optical signal is wavelength-mutiplexed with thirty two channels and where the channel 2, the channel 5, the channel 10 and the channel 13 are to be dropped by that OADM 263, for example: the center wavelength of the elimination band in the FBG 272-1 is set to the wavelength of the channel 2; the center wavelength of the elimination band in the FBG 272-2 is set to the wavelength of the channel 5; the center wavelength of the elimination band in the FBG 272-3 is set to the wavelength of the channel 10; and the center wavelength of the elimination band in the FBG 272-4 is set to the wavelength of the channel 13.

Although there has been described the case in which the four optical signals are to be dropped, the number of the FBGs 272 is decided according to the number of the optical signal to be dropped.

The optical receiving circuit 267 receives/processes the optical signals which have been dropped by the OADM 263.

The WDM optical signal, from which the optical signal to be dropped by the OADM 263 has been eliminated by the rejecting filter 270, is inputted to a CPL 273.

An optical sending circuit 268 generates the optical signal to be added by the OADM. The optical signal, as outputted from the optical sending circuit 268, is inputted to the CPL 273 and is wavelength-multiplexed with the WDM optical signal which has been outputted from the rejecting filter 270 and from which a predetermined optical signal has been eliminated. The WDM optical signal, as has been wavelength-multiplexed with the optical signal to be added, is outputted to a CPL 181 in the back optical amplifying part 105.

In this fixed wavelength type OADM, the channel to be dropped/added in the optical amplifying apparatus 304, is decided when the optical amplifying apparatus 304 is to be installed in the optical communication system.

Operations and Effects of Fifth Embodiment

When the optical amplifying apparatus 304 of the fifth embodiment is installed as a repeater station of the optical communication system, the modes of the input light and the SW 127 are set according to the optical level which is outputted from the optical transmission line connected with the input side of the optical amplifying apparatus 303.

Where the optical level is at −30 to −20 (dBm/channel), for example, the in-mode 1 is selected so that the reference voltage Vref2 is set to the reference voltage Vref2M1 for the in-mode 1. The monitor circuit selects a resistor such as the resistor 128 corresponding to the case, in which the optical level is at −30 to −20 (dBm/channel), and the SW 127 is switched to connect the PD 121 and the resistor 128. As a result, the terminal voltage of the resistor 128 is inputted to the AGC 122 and the LOG 124. The gain of the AGC 133 is switched so that the gain of the sum from the PD 121 to the AGC 133 is kept at the constant value.

In the optical amplifying apparatus 304 set to have the in-mode 1 and the resistor 128, the operations and effects of the front optical amplifying part 101, the front optical attenuating part 102 and the middle optical amplifying part 103 are similar to those of the second embodiment so that their description will be omitted.

Moreover, the mode of the output light is set according to the kind of the optical transmission line to be connected with the output side of the optical amplifying apparatus 304.

Where the kind of the optical transmission line is the NZ-DSF, for example, the out-mode 1 is selected, and the ATT 264 is connected with an optical attenuator having an attenuation for the out-mode 1. The AGC 190 controls the output light level of the back optical amplifying part 105 to 4 (dBm/channel).

The optical level of the WDM optical signal to be inputted to the back optical attenuating part 109 is so kept that the output light level of the middle optical amplifying part 103 is at the first target value T1M1 corresponding to the in-mode 1, as has been described in connection with the second embodiment. Therefore, the difference between the output of the PD 265 and the reference voltage Vref7 is substantially "zero" so that the ACC 266 outputs no signal to the VAT 262. As a result, the attenuation amount of the VAT 262 is kept at the constant value for the in-mode 1, with which the WDM optical signal is attenuated.

The WDM optical signal, as attenuated in the VAT 262, is attenuated in the OADM 263 and the ATT 264 at a constant rate corresponding to the out-mode 1 so that the input light level of the back optical amplifying part 105 is kept substantially constant irrespective of the WDM optical signal to be inputted to the optical amplifying apparatus 304.

In the back optical amplifying part 105, the AGC 190 outputs a signal according to the ratio of the output of the PD 189 to the output of the PD 187, to the LD 188 thereby to control the gain of the EDF 185 so that the ratio may take a predetermined value. As a result, the EDF 185 is controlled with a constant gain.

The WDM optical signal, as inputted to the back optical amplifying part 105, is amplified at a predetermined constant gain. The input light level of the back optical amplifying part 105 is substantially constant so that the output light level of the back optical amplifying part 105 (or the output light level of the optical amplifying apparatus 304) is kept substantially constant to the optical level 4 of the out-mode 1.

Where this optical amplifying apparatus 304 is installed as another optical repeater station, on the other hand, the input light level is not different from the aforementioned one. Where the kind of the optical transmission line to be connected with the output side is an SMF, however, the out-mode 2 is selected so that the ATT 264 is connected with the optical attenuator having the attenuation amount for the out-mode 2. The ratio between the resistance Rref1 and the resistance Rref2 is set to the voltage value for setting the output light level of the back optical amplifying part 105 to 8 (dBm/channel).

In the back optical attenuating part 109, the optical level of the WDM optical signal to be inputted remains in the in-mode 1 so that it is kept at the first target value T1M1 corresponding to the in-mode 1. As a result, the attenuation amount of the VAT 262 is kept at the constant rate for the in-mode 1, at which the WDM optical signal is attenuated.

On the other hand, the WDM optical signal, as attenuated in the VAT 262, is attenuated in the OADM 263 and the ATT 264 at the constant rate corresponding to the out-mode 2.

In the back optical amplifying part 105, the AGC 190 outputs a signal according to the ratio between the output of the PD 187 and the output of the PD 189, to the LD 188 thereby to control the gain of the EDF 185 so that the ratio may take a predetermined value. As a result, the EDF 185 is controlled with a constant gain corresponding to the out-mode 2. The WDM optical signal, as inputted to the back optical amplifying part 105, is amplified at a predetermined constant gain. The input light level of the back optical amplifying part 105 is substantially constant so that the output light level of the back optical amplifying part 105 (i.e., the output light level of the optical amplifying apparatus 304) is kept substantially constant at the output light 8 of the out-mode 2.

As a result, the optical amplifying apparatus 304 can set the output light level in accordance with the kind of the optical transmission line so that it does not cause a serious waveform distortion, as might otherwise be caused by the nonlinear optical effects in the WDM optical signal on the optical transmission line.

Here in the fifth embodiment, the loss to be adjusted in the ATT 264 might be realized exclusively by the VAT 262 by giving the loss to be adjusted in the ATT 264 in the offset to the control voltage of the VAT 262.

In the fifth embodiment, on the other hand, the OADM 263 is exemplified by the fixed wavelength type OADM but might be exemplified by the arbitrary wavelength type OADM.

Here will be described another embodiment of the invention.

Construction of Sixth Embodiment

Figure 22:
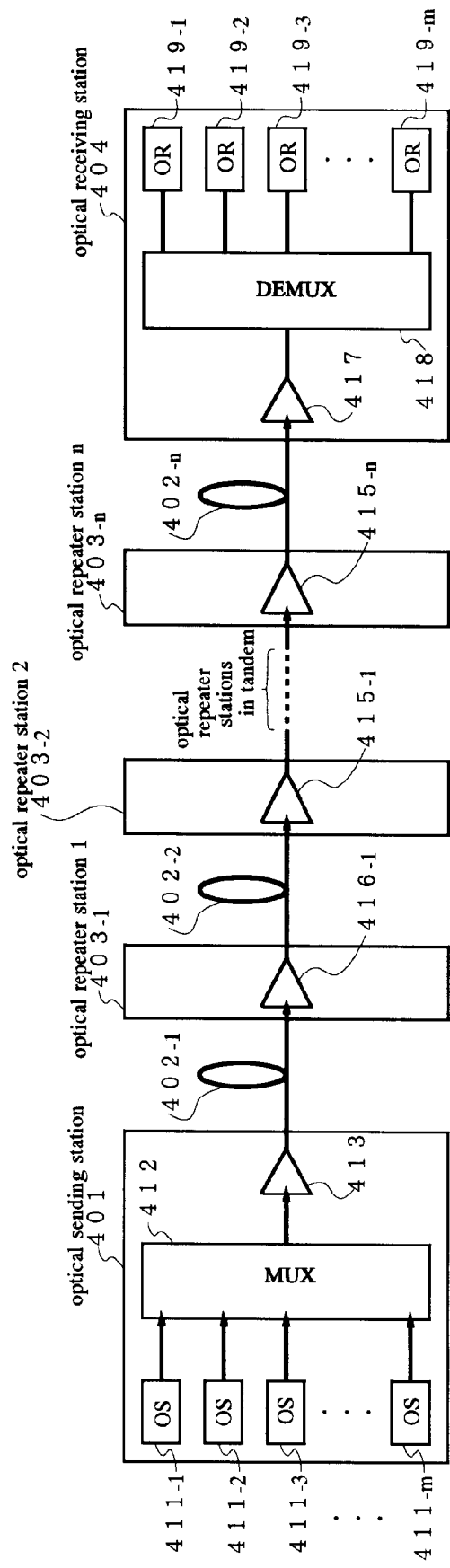
FIG. 22 is a diagram showing a construction of an optical communication system of a sixth embodiment.

In FIG. 22, the optical communication system is constructed to include: an optical sending station 401 for generating WDM optical signals of a plurality of m-waves; an optical transmission line 402 for transmitting the WDM optical signal outputted from the optical sending station 401; and an optical receiving station 404 for inputting the WDM optical signal sent and for receiving/processing the WDM optical signal. In this optical communication system, moreover, an optical repeater station 403 is connected between the optical transmission lines 402. Here, the optical repeater station 403, as connected between the optical transmission lines 402, should not be limited to one but may be a plurality, if necessary.

The optical sending station 401 is constructed to include: a plurality (or an m-number of) optical senders (as will be abbreviated into the "OS") 411-1 to 411-m for generating the optical signals of the individual channels of the WDM optical signal; an optical multiplexer (as will be abbreviated into the "MUX") 412 for wavelength-multiplexing the individual optical signals outputted from the OSes 411-1 to 411-m; and an optical amplifying apparatus 413 for amplifying the WDM optical signal outputted from the MUX 412. The number of the OSes 411 accords to the channel number of the WDM optical signals. A like accordance applies to the number of optical receivers 419, as will be described hereinafter.

The OS 411 can be constructed, for example, to include a semiconductor laser for oscillating a laser beam with a predetermined wavelength, and an external modulator for modulating the laser beam with the information to be sent. The external modulator is exemplified by a Mach-Zehnder interferometer optical modulation. The MUX 412 can be exemplified by a dielectric multilayer optical filter, i.e., a kind of an interference filter, or an arrayed waveguide grating type optical multi/demultiplexer.

The optical transmission line 402 is made of optical fibers, which can be exemplified by a variety of optical fibers such as zero-dispersion single mode fibers of 1.3 micron band or dispersion shift fibers of 1.5 micron band.

The receiving station 404 is constructed, for example, to include an optical amplifying apparatus 417, an optical demultiplexer (as will be abbreviated into the "DEMUX") 418, and optical receivers (as will be abbreviated into the "OR") 419-1 to 419-16. The WDM optical signal, as inputted from the optical transmission line 402 to the optical amplifying apparatus 417, is amplified and then outputted to the DEMUX 418, in which it is wavelength-divided into optical signals for the individual channels. The divided optical signals for the individual channels are individually inputted to and received/processed by the ORs 419-1 to 419-m each composed of a photodiode and a demodulator.

The optical repeater station 403 is either a station including an optical amplifying apparatus 415 for compensating the transmission loss of the optical transmission line 402, or a station including an optical amplifying apparatus 416 for compensating the transmission loss of the optical transmission line 402 and for dropping/adding the channels from the WDM optical signal to be transmitted through the optical transmission line 402.

The optical amplifying apparatus 413 in the optical sending station 401 is exemplified by any of the optical amplifying apparatus 10 and 301 to 303 of the first to fourth embodiments, and the optical amplifying apparatus 416 in the optical repeater station 403 is exemplified by any of the optical amplifying apparatus 10 and 301 to 304 of the first to fifth embodiments.

For example: the optical amplifying apparatus 413 is exemplified by the optical amplifying apparatus 301 of the second embodiment; the optical amplifying apparatus 417 is exemplified by the optical amplifying apparatus 302 of the third embodiment; the optical amplifying apparatus 416-1 is exemplified by the optical amplifying apparatus 304 of the fifth embodiment; and the optical amplifying apparatus 415-1 to 415-n are exemplified by the optical amplifying apparatus 303 of the fourth embodiment. The optical repeater station 403-1 is an optical repeater station 40 having an ADM (add/Drop Multiplexer) function. Here, the optical communication system may be provided with a plurality of optical repeater stations having such ADM function.

Operations and Effects of Sixth Embodiment

In this optical communication system, where the optical sending station 401 is provided with the optical amplifying apparatus 413, The mode of the input light of the optical amplifying apparatus 413 can be adjusted to the output light level of the MUX 412, and the mode of the output light of the optical amplifying apparatus 413 can be adjusted to the input light level of the optical transmission line 402-1.

Where the optical repeater station 403 is provided with the optical amplifying apparatus 415 and 416, moreover, the modes of the input lights of the optical amplifying apparatus 415 and 416 can be adjusted to the output light levels of the optical transmission line 402 on the input side, and the modes of the output lights of the optical amplifying apparatus 415 and 416 can be adjusted to the input light level of the optical transmission line 402 on the output side.

Where the optical receiving station 404 is provided with the optical amplifying apparatus 417, moreover, the mode of the input light of the optical amplifying apparatus 417 can be adjusted to the output light level of the optical transmission line 402, and the mode of the output light of the optical amplifying apparatus 417 can be adjusted to the input light level of the DEMUX 418.

Therefore, this optical communication system can match the various optical transmission lines 402 such as the SMF or the NZ-DSF. As a result, the existing optical transmission lines can be effectively exploited. In this optical communication system, the degradation of the noise figure, as experienced in the optical amplifying apparatus 413, 415, 416 and 417, is suppressed so that a longer-distance transmission can be made than that of the case of the optical communication system lacking the optical amplifying apparatus according to the invention, thereby to reduce the number of optical repeater stations.

Here will be described another embodiment of the invention.

Construction of Seventh Embodiment

In this optical communication system, as shown in FIG. 23, a WDM optical signal of thirty two waves are generated by an optical sending station 501 individually for the C-bandwidth (1,530 to 1,570 nm) and the L-bandwidth (1,570 to 1,610 nm), and the WDM optical signal of these sixty four waves are repeated in multiple stages by an optical repeater station 503 and are received/processed by an optical receiving station 504. Moreover, a supervising signal for the C-band and a supervising signal for the L-band are generated by the optical sending station 501. The supervising signal for the C-band is wavelength-multiplexed toward the shorter wavelength side than a channel 1, and the supervising signal for the L-band is wavelength-multiplexed toward the longer wavelength side than a channel 64. These two supervising signals are transmitted together with the WDM optical signal of sixty four waves. Each of the optical sending station 501, the optical repeater station 503 and the optical receiving station 504 is provided with the complex optical amplifying apparatus according to the invention.

Each supervising signal contains information necessary for running and maintaining the optical communication system. More specifically, each supervising signal contains information such as the wavelength number (or the channel number) of the WDM optical signals for each band, the operating situations of each EDF and the troubling conditions of the local station. The operating situations of the EDF vary with the control states such as the constant gain control of the EDF or the constant output control of the EDF.

In FIG. 23, thirty two OSes 521-1 to 521-32 of the sixty four OSes 521-1 to 521-64 individually generate optical signals corresponding to the channel 1 to the channel 32 of the C-band. The individual optical signals generated are inputted to and wavelength-multiplexed by a MUX 522-1 so that they become the WDM optical signal of thirty two waves in the C-band. The WDM optical signal in the C-band is inputted to a complex optical amplifying apparatus 513.

The WDM optical signal, as generated by wavelength-multiplexing the channels 33 to 64 of the L-band, are generated by a construction which is constructed of the OSes 521-33 to 521-64 and an MUX 522-2 as in the foregoing construction. The WDM optical signal in the L-band is inputted to the complex optical amplifying apparatus 513.

The WDM optical signal in the C-band, as inputted to the complex optical amplifying apparatus 513, are amplified by the optical amplifying apparatus 523-1 for the C-band and are then inputted together with the supervising signal for the C-band to a MUX 524. The WDM optical signal in the L-band, as inputted to the complex optical amplifying apparatus 513, are amplified by the optical amplifying apparatus 523-2 for the L-band and are then inputted together with the supervising signal for the L-band to the MUX 524.

These individual optical signals are wavelength-multiplexed in the MUX 524 to the WDM optical signal in two wavelength bands. The WDM optical signal in the two wavelength bands is outputted to an optical transmission line 502-1 so that it is transmitted to an optical repeater station 5031 at the next stage.

The transmitted WDM optical signal of the two wavelength bands is inputted to a DEMUX 532 in a complex optical amplifying apparatus 516-1 inside the optical repeater station 503-1.

The DEMUX 532 wavelength-divides the WDM optical signal of the two wavelength bands into the supervising signal for the C-band and the WDM optical signal in the C-band and into the supervising signal for the L-band and the WDM optical signal in the L-band. The wavelength-divided WDM optical signal in the C-band is amplified by an optical amplifying apparatus 533-11 for the C-band and is then inputted to a MUX 534-1. The wavelength-divided WDM optical signal in the L-band is amplified by an optical amplifying apparatus 533-12 for the L-band and is then inputted to an MUX 534-2.

The MUX 534-1 wavelength-multiplexes the WDM optical signal in the individual bands together with the supervising signal for the individual bands. Moreover, the optical signals, as turned again into the WDM optical signal in two wavelength bands, are outputted to an optical transmission line 502-2 and transmitted to an optical repeater station 503-2 at the next stage.

The WDM optical signal in the two wavelength bands is sequentially amplified by the optical repeater station 503 and is then inputted to the optical receiving station 504.

The inputted WDM optical signal in the two wavelength bands is inputted to a DEMUX 542 inside a complex optical amplifying apparatus 517 so that it is wavelength-divided into the supervising signal for the C-band and the WDM optical signal in the C-band and into the supervising signal for the L-band and the WDM optical signal in the L-band.

The wavelength-divided WDM optical signal in the C-band is amplified by an optical amplifying apparatus 543-1 and is then inputted to a DEMUX 548-1. The WDM optical signal in the C-band is wavelength-divided for the individual channels, and these channels is inputted to individually corresponding ORs 549-1 to 549-32 so that it is received/processed. The wavelength-divided WDM optical signal in the L-band is amplified and received/processed by a construction composed of an optical amplifying apparatus 543-2, a DEMUX 548-2 and ORs 549-33 to 549-64 as in the foregoing construction.

Here will be described the complex optical amplifying apparatus 513, 516 and 517. The complex optical amplifying apparatus 516 will be described at first, but the complex optical amplifying apparatus 513 and 517 will then be described exclusively on the difference from the complex optical amplifying apparatus 516.

Figure 24:
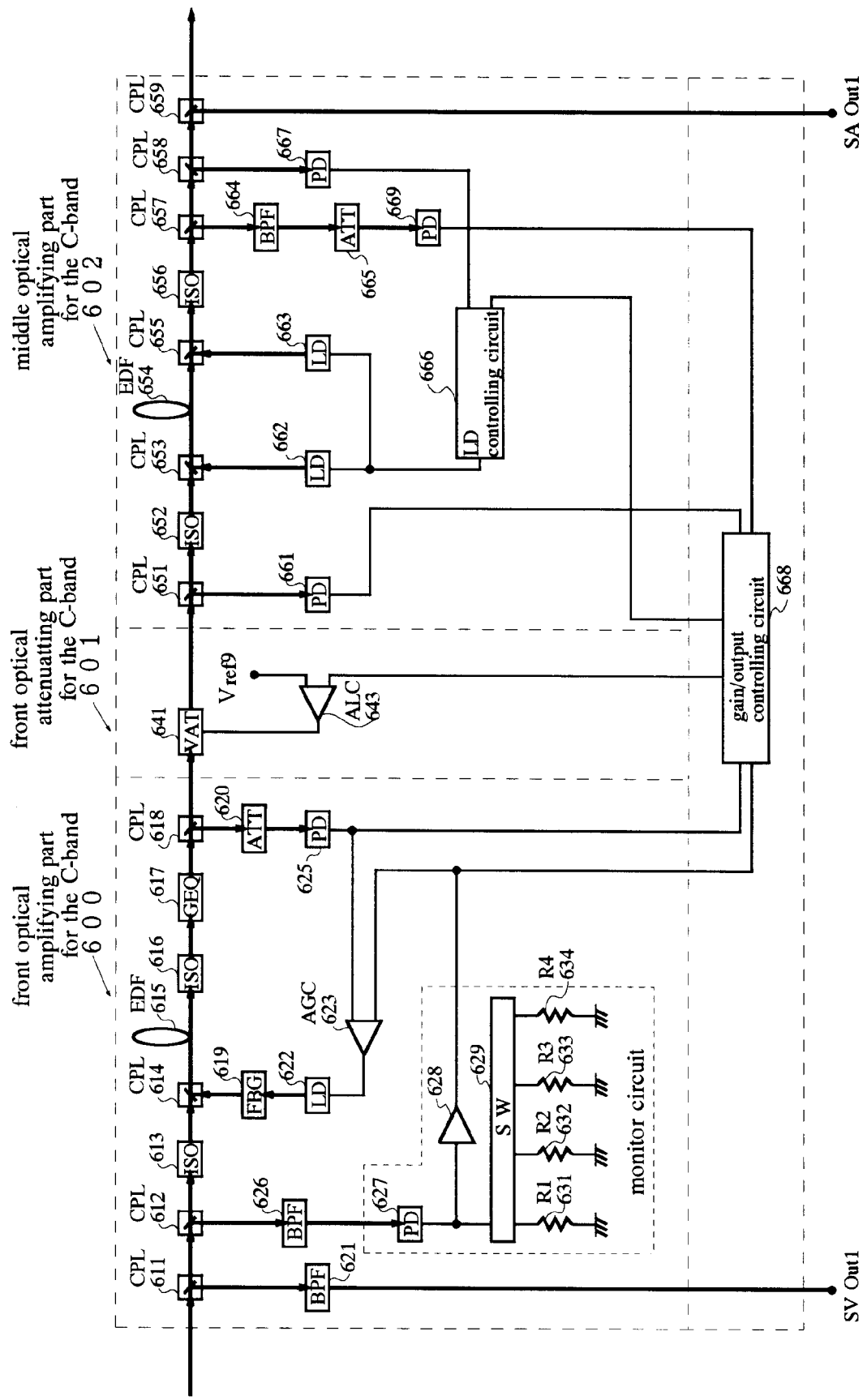
FIG. 24 is a diagram showing constructions of a front optical amplifying part, a front optical attenuating part and a back optical amplifying part for a C-band in the seventh embodiment.
Figure 25:
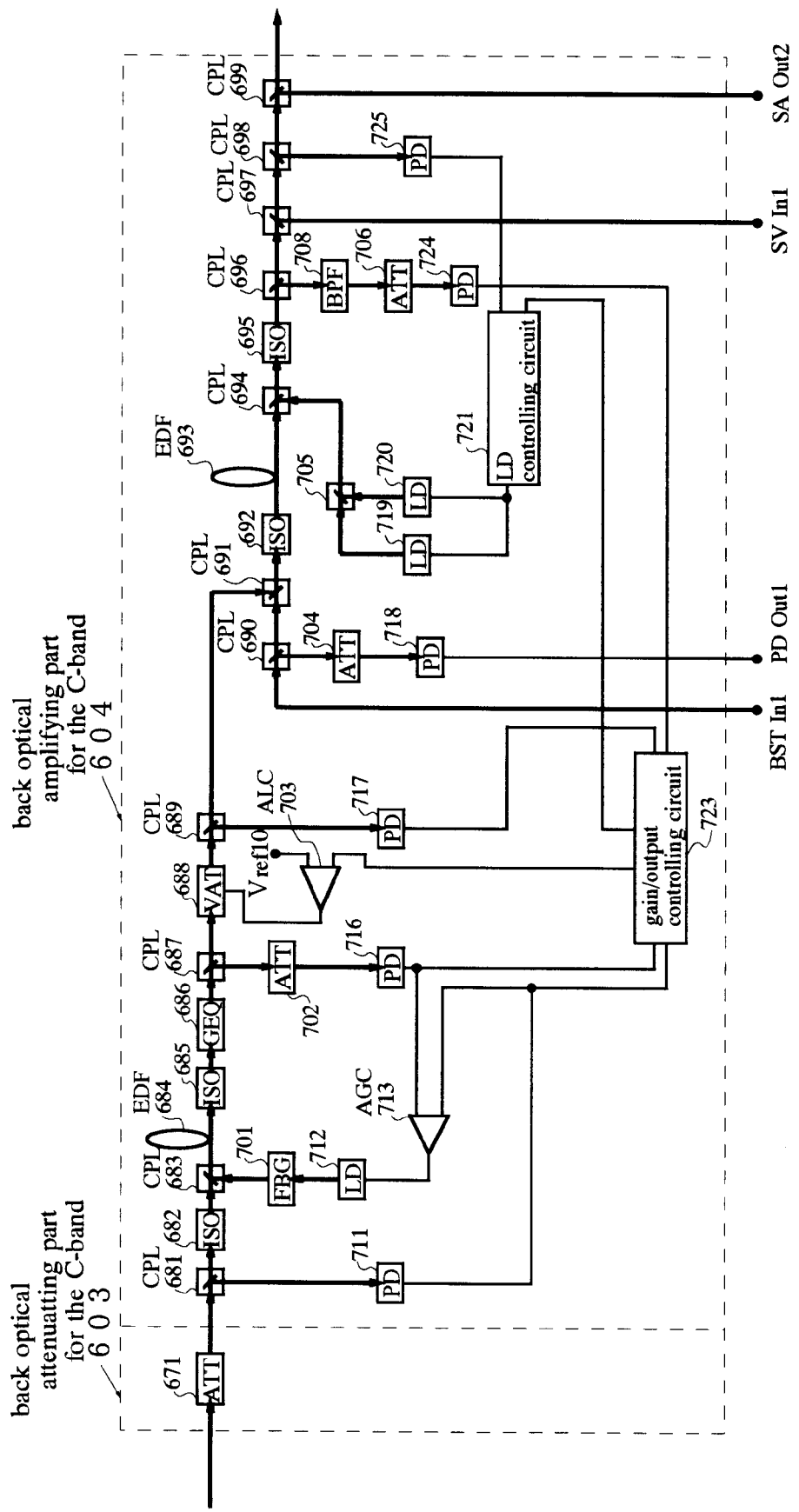
FIG. 25 is a diagram showing constructions of a back optical attenuating part and a back optical amplifying part for the C-band in the seventh embodiment.
Figure 26:
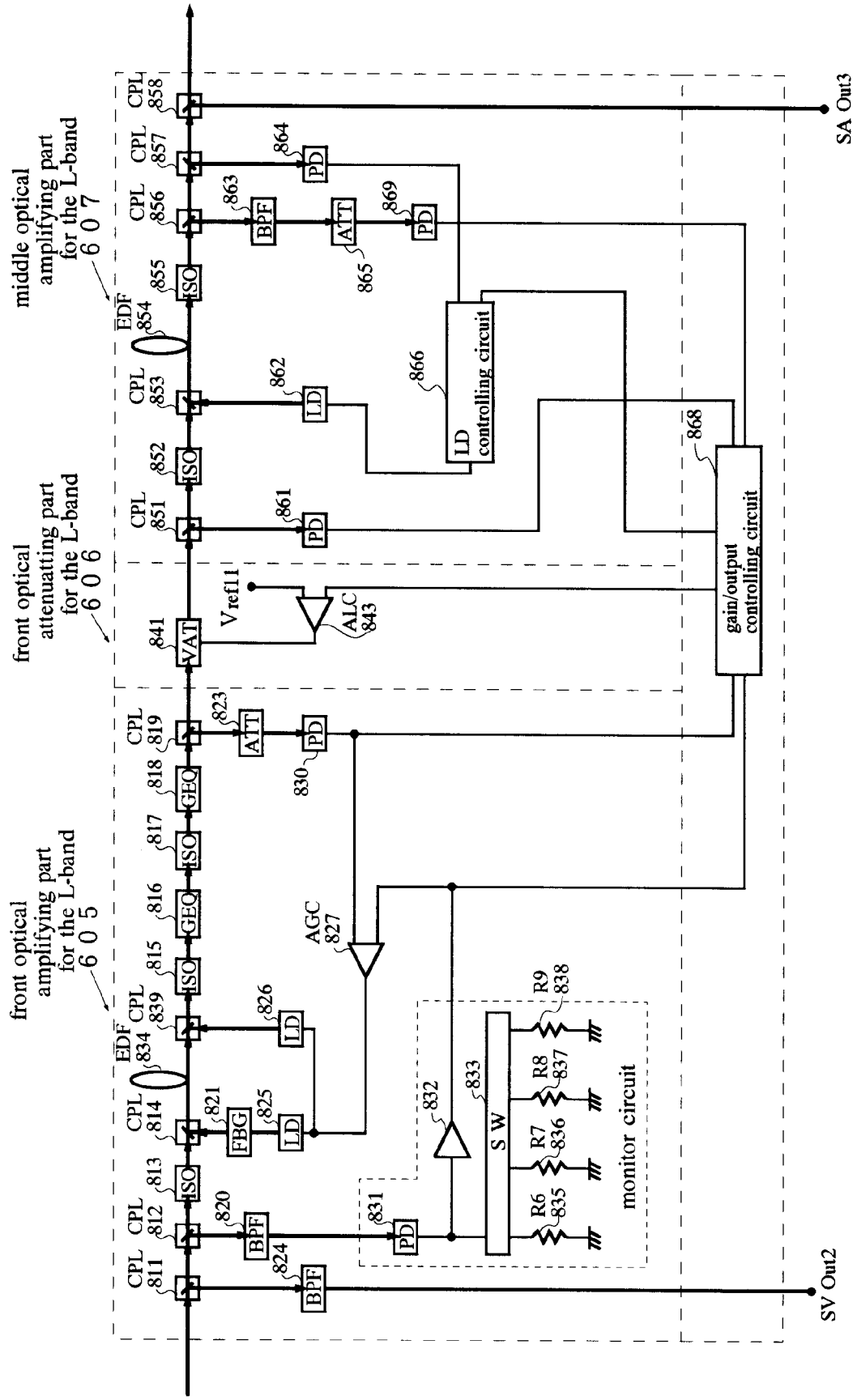
FIG. 26 is a diagram showing constructions of a front optical amplifying part, a front optical attenuating part and a back optical amplifying part for an L-band in the seventh embodiment.
Figure 27:
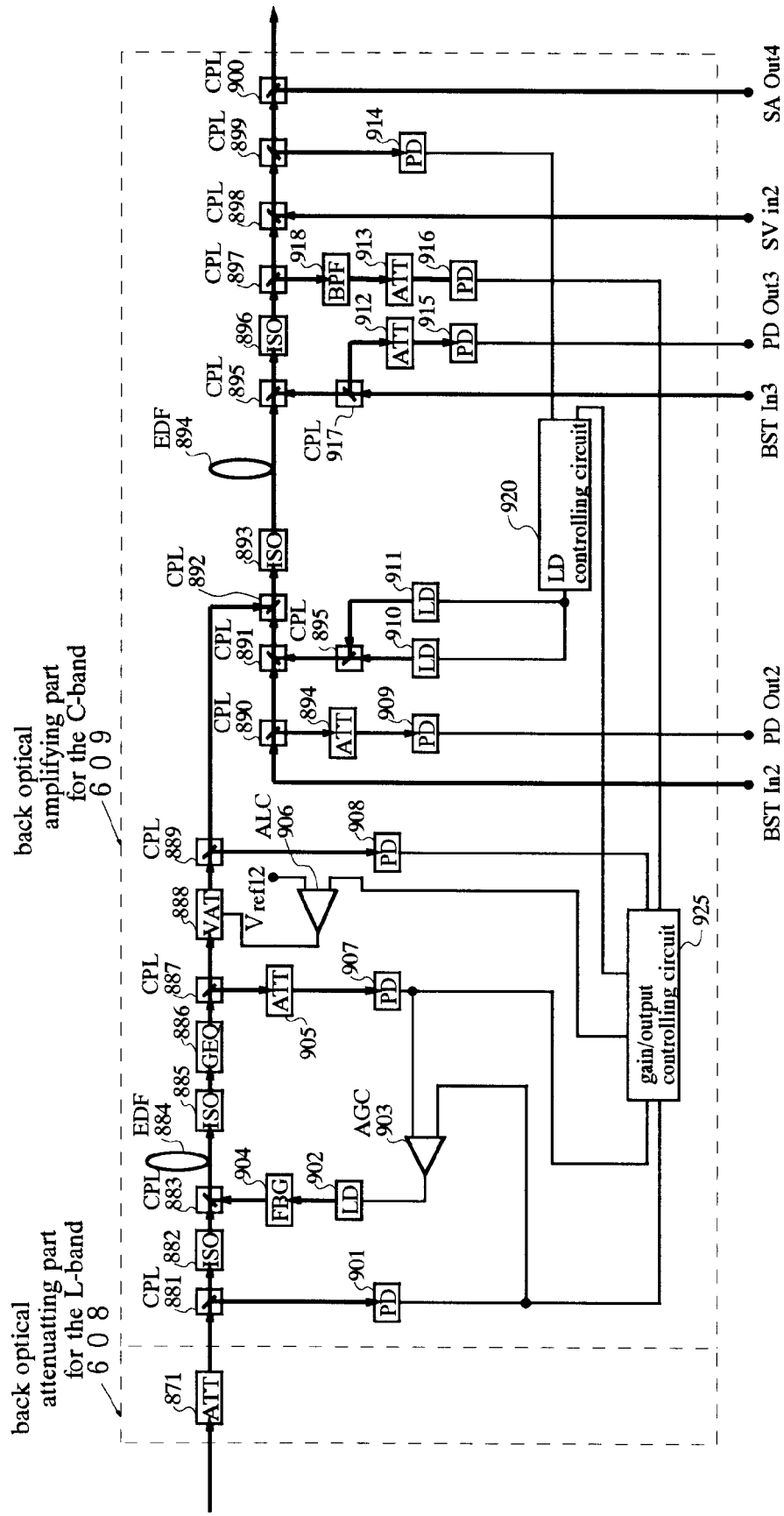
FIG. 27 is a diagram showing constructions of a back optical attenuating part and a back optical amplifying part for the L-band in the seventh embodiment.

The complex optical amplifying apparatus 516 is constructed, as described above, to include: the DEMUX 532; an optical amplifying apparatus 533-n1 capable of amplifying the C-band; an optical amplifying apparatus 533-n2 capable of amplifying the L-band; and an MUX 527. The optical amplifying apparatus 533-n1 for the C-band is constructed, as shown in FIGS. 24 and 25, to include a front optical amplifying part 600, a front optical attenuating part 601, a middle optical amplifying part 602, a back optical attenuating part 603 and aback optical amplifying part 604 for the C-band. The optical amplifying apparatus 533-n2 for the L-band is constructed, as shown in FIGS. 26 and 27, to include a front optical amplifying part 605, a front optical attenuating part 606, a middle optical amplifying part 607, a back optical attenuating part 608 and a back optical amplifying part 609 for the L-band.

Each optical amplifying apparatus 533 has two input light modes of the in-mode 1 and the in-mode 2, and two output lights of the out-mode 1 and the out-mode 2.

First of all, here will be described the construction of an optical amplifying apparatus 533-1 for the C-band for amplifying the WDM optical signal in the C-band.

In FIGS. 23 and 24, the supervising signal for the C-band and the WDM optical signal in the C-band, as wavelength-divided by the DEMUX 532 of the complex optical amplifying apparatus 516, are inputted to a CPL 611 in the front optical amplifying part 600 for the C-band.

The CPL 611 wavelength-divides the supervising signal for the C-band and the WDM optical signal in the C-band. The CPL for the wavelength-divisions is exemplified by a dielectric multilayer optical filter.

The wavelength-divided supervising signal is inputted to a band-pass filter (as will be abbreviated into the "BPF") 621. This BPF 621 is set at its center bandwidth to the supervising signal for the C-band. Even if the WDM optical signal in the C-band leak in the light to be inputted from the CPL 611 to the BPF 621, therefore, the light having transmitted through the BPF 621 is the supervising signal for the C-band. The supervising signal to be outputted from the BPF 621 is outputted to a terminal SV-Out1. The wavelength-divided WDM optical signal in the C-band is inputted to a CPL 612. Of the WDM optical signals branched by the CPL 612, one is inputted through a BPF 626 to a PD 627 whereas the other is inputted through an ISO 613 to a CPL 614.

The elimination wavelength of the BPF is set to pass the C-band but to eliminate the supervising signal for the C-band. Even if the WDM optical signal in the C-band leak in the light to be inputted from the CPL 612 to the BPF 626, therefore, the light having transmitted through the BPF 626 is the supervising signal for the C-band.

The WDM optical signal inputted to the PD 627 is photoelectrically converted. The output of the PD 627 is inputted to a variable gain amplifier 628 and an SW 629.

This SW 629 is a switch having one input and four outputs. These four output terminals of the SW 629 are individually connected with any of resistors: a resistor 631 of a resistance R1; a resistor 632 of a resistance R2; a resistor 633 of a resistance R3; and a resistor 634 of a resistance R4, which are individually grounded to the earth. The resistances R1 to R4 are determined according to the modes of the input lights of the optical amplifying apparatus 533-n1 for the C-band. The terminal voltage of the resistor, which has been connected with the PD 627 by the SW 6329, is supplied as the output of the PD 627 through the variable gain amplifier 628 to an AGC 623 and a gain/output controlling circuit 668.

The gain of the variable gain amplifier 628 is made so variable that the gain from the PD 627 to the output of the gain variable amplifier 628 may be kept constant when the SW 629 is switched.

The circuit, as composed of the PD 627, the SW 629 and the resistors 631, 632, 633 and 634, is a monitor circuit for detecting the optical level of the WDM optical signal of the C-band, as inputted to the optical amplifying apparatus 533-n1.

To the CPL 614, on the other hand, there is also inputted the laser beam of an LD 622 through an FBG 619.

The LD 622 oscillates the laser beam or the pump light of an EDF 615 and has its oscillating wavelength set to 980 nm. The EFD is excited with a light having a wavelength of 980 nm and 1,460 nm, but can a lower noise if it is excited with the light of the wavelength of 980 nm.

The FBG 619 is a reflection type optical filter which is provided for locking the oscillatory wavelength of the LD 619. In the LD, generally, the oscillatory wavelength fluctuates with a mode hopping. However, the oscillatory wavelength of the LD is locked by returning a portion of the laser beam to the LD by the FBG. Therefore, the reflection center wavelength of the FBG is set to 980 nm, and the reflectivity is set to a value sufficient for locking the oscillatory wavelength of the LD 622 at 980 nm and for exciting the EDF 615 with the laser beam of 980 nm. More specifically, the reflectivity of the FBG 619 is set at 3 to 10%. FBGs 701, 821, 822 and 891 likewise stabilize the oscillatory wavelength of the LD.

Thus, the oscillatory wavelength of the LD 622 is substantially locked so that the gain fluctuation of the EDF 615, as might otherwise be caused by the fluctuation of the oscillatory wavelength of the LD 622, can be prevented.

The WDM optical signal outputted from the ISO 613 and the laser beam of the LD 622 through the FBG 619 are combined and inputted to the EDF 615.

In the EDF 615, a population inversion is generated by the laser beam of the LD 622, and the WDM optical signal in the C-band are amplified by the stimulated emission.

The WDM optical signal in the C-band, as amplified by the EDF 615, is inputted through an ISO 616 and a GEQ 617 to a CPL 618. The GEQ is a gain equalizer for equalizing the gain wave length characteristics curve of the EDF 615 and an EDF 654.

Of the WDM optical signals branched by the CPL 618, one is inputted to the VAT 641 in the front optical attenuating part 601 for the C-band whereas the other is inputted through an ATT 620 to a PD 625.

The ATT 620 adjusts the optical level of the WDM optical signal in the C-band to be inputted to the PD 625, so that the PD 625 may not be broken with a light of an excessive optical level. ATTs 665, 702, 704, 706, 823, 865, 892, 894, 912 and 913 likewise protect the PDs against the breakages.

The output of the PD 625 is inputted to the AGC 623 and the gain/output controlling circuit 668.

The AGC 623 judges the gain of the EDF 615 from the output of the PD 625 and the output of the PD 627 through the variable gain amplifier 628. The AGC adjusts the gain of the EDF 615 to a predetermined constant gain by adjusting the driving current (or the injection current) of the LD 622 on the basis of the judge result within a range where the injection current does not reach the limiter value. The predetermined gain is set taking it into consideration to reduce the noise figure of the WDM optical signal in the C-band at a low optical level, as inputted to the optical amplifying apparatus 533-n1.

Next, the construction of the front optical attenuating part 601 for the C-band will be described with reference to FIG. 24.

The WDM optical signal in the C-band, as outputted from the CPL 618, is inputted to a VAT 641 in the front optical attenuating part 601. The WDM optical signal, as outputted from the VAT 641, is inputted to a CPL 651 in the middle optical amplifying part 602 for the C-band.

Here, the output according to the output light level of the WDM optical signal in the C-band, as outputted from the middle optical amplifying part 602 to the back optical attenuating part 603, is inputted from a PD 669 in the middle optical amplifying part 602 to the gain/output controlling circuit 668.

This gain/output controlling circuit 668 converts the output of the PD 669 into the logarithmic value of the voltage level, and the converted logarithmic value is inputted to one input terminal of an ALC 643.

This ALC 643 compares a predetermined reference voltage Vref9 and the value of the output of the gain/output controlling circuit 668 to adjust the attenuation amount of the VAT 641 so that the optical level of the WDM optical signal per channel, as outputted from the middle optical amplifying part 602, may be constant. The reference voltage Vref9 is a voltage value to be referred to so that the output light level of the portion composed of the front optical amplifying part 600, the front optical attenuating part 601 and the middle a optical amplifying part 602 (i.e., the output light level to be outputted from a CPL 659 to the back optical attenuating part 603) may be the first target value, and is prepared in the number equal to that of the input light modes. For example, a reference voltage Vref 9M1 for the in-mode 1 is prepared for the in-mode 1, and a reference voltage Vref9M2 for the in-mode 2 is prepared for the in-mode 2.

Next, the construction of the middle optical amplifying part 602 for the C-band will be described with reference to FIG. 24.

The WDM optical signal in the C-band, as outputted from the VAT 641, is inputted to the CPL 651 in the middle optical amplifying part 602.

Of the WDM optical signals branched by the CPL 651, one is inputted to a PD 661 whereas the other is inputted through an ISO 652, a CPL 653, the EDF 654, a CPL 655 and an ISO 656 to a CPL 657.

The PD 661 converts the received WDM optical signal photoelectrically, and its output is inputted to the gain/output controlling circuit 668.

To the CPL 653, there is also inputted the laser beam of a wavelength of 1,460 nm of an LD 662. The WDM optical signal outputted from the ISO 652 and the laser beam of the LD 662 are combined by the CPL 653 and are inputted to the EDF 654. To the CPL 655, there is also inputted the laser beam of a wavelength of 1,460 nm of an LD 663, which is further inputted to the EDF 654. Thus, the EDF 654 is forward pumped by the LD 662 and backward pumped by the LD 663.

The EDF 654 is excited with the laser beams of the LDs 662 and 663 to amplify the WDM optical signal in the C-band.

The CPL 657 branches the amplified WDM optical signal in the C-band into two. Of the branched WDM optical signals in the C-band, one is inputted to a CPL 658 whereas the other is inputted through a BPF 664 and the ATT 665 to the PD 669.

The transmission bandwidth of the BPF 664 is set to the bandwidth of the C-band. As a result, the light to be received by the PD 669 is the WDM optical signal of the C-band, from which the amplified spontaneous emission (ASE) to occur at the EDFs 615 and 654 are eliminated. As a result, the PD 669 can detect the optical level of the WDM optical signal of the C-band highly precisely.

The WDM optical signal, as inputted to the PD 669, is photoelectrically converted, and its output is inputted to the gain/output controlling circuit 668.

This gain/output controlling circuit 668 judges the gain of the front optical amplifying part 600 from the outputs of the PDS 625 and 627, judges the gain of the middle optical amplifying part 602 from the outputs of the PDs 669 and 661 and outputs a signal to an LD controlling circuit 666 so that the sum of the gain of the front optical amplifying part 600 and the gain of the middle optical amplifying part 602 may be constant. On the basis of this signal, the LD controlling circuit 666 adjusts the driving currents (or the injection currents) of the LDs 662 and 663 to adjust the gain of the EDF 654.

Moreover, the WDM optical signal of the C-band, as outputted from the CPL 657, is inputted to the CPL 658 to the CPL 659.

The CPL 658 inputs the return light, as outputted from the CPL 659, to a PD 667. This PD 667 converts the return light photoelectrically and inputs its output to the LD controlling circuit 666.

This LD controlling circuit 666 judges it, if the output of the PD 667 exceeds a predetermined threshold value, that nothing is connected with the output side of the middle optical amplifying part 602. Where an optical part such as optical fibers is connected with the output side of the middle optical amplifying part 602, the reflectivity on the connection face is low. As result, the return light is so little that the output of the PD 667 becomes low. Where the optical part is not connected with the output side of the middle optical amplifying part 602, on the other hand, the reflectivity on the connection face is higher than that where the optical part is connected. As a result, the return light is so much that the output of the PD 667 becomes high. More specifically, the optical level of the return light is substantially 0 dB in the connection case but about 14 dB in the disconnection case. This enables the LD controlling circuit 666 to judge the connection state of the output side of the middle optical amplifying part 602 in terms of the magnitude of the output of the PD 667.

The LD controlling circuit 666 reduces the driving currents of the LDs 662 and 663 if it judges that nothing is connected with the output side of the middle optical amplifying part 602. As a result,the gain of the ED Freduces. As a result, the optical level of the WDM optical signal of the C-band to be outputted from the middle optical amplifying part 602 lowers. Even if the output side of the middle optical amplifying part 602 is erroneously opened while the complex optical amplifying apparatus 516 is running, therefore, it is possible to retain the safety of the worker of the optical repeater station 503.

Where the output of the PD 667 does not exceed the predetermined threshold value, on the other hand, the LD controlling circuit 666 controls the LDs 662 and 663 in terms of the signal of the gain/output controlling circuit 668.

Moreover, the CPL 659 branches the WDM optical signal inputted into two. of these divided WDM optical signals, one is outputted as the output of the middle optical amplifying part 602 to the back optical attenuating part 603 whereas the other is outputted to the SA-Out1.

Next, the construction of the back optical attenuating part 603 for the C-band will be described with reference to FIG. 25.

The WDM optical signal of the C-band, as outputted from the CPL 659, is outputted through an ATT 671 to a CPL 681 in the back optical amplifying part 604 for the C-band.

The ATT 671 is prepared for each input light mode, and the attenuation amount of the ATT 671 for the in-mode 1 is set considering the output light level of the optical amplifying apparatus 533-n1 for the C-band. The optical attenuation amount of the ATT 671 for the in-mode 2 is set higher than that of the ATT 671 for the in-model by the value which is calculated in the back optical attenuating part 603 for the C-band by subtracting the input light level of the case of the in-mode 1 from the input light level of the case of the in-mode 2.

Here, the attenuation amount of the ATT 671 is adjusted together with the attenuation amount of an ATT 871 when this complex optical amplifying apparatus 516 is installed on the optical repeater station 503.

Next, the construction of the back optical amplifying part 604 for the C-band will be described with reference to FIG. 25.

The WDM optical signal of the C-band, as outputted from the ATT 671, is inputted to the CPL 681 in the back optical amplifying part 604.

Of the WDM optical signals branched by the CPL 681, one is inputted to a PD 711 whereas the other is inputted through an ISO 682, a CPL 683, an EDF 684, an ISO 685 and a GEQ 686 to a CPL 687.

The output of the PD 711 is outputted to an AGC 713 and a gain/output controlling circuit 723. The CPL 683 supplies the EDF 684 with the laser beam of an LD 712, as inputted through the FBG 701. The LD 712 oscillates the laser beam of a wavelength of 980 nm. The EDF 684 is excited with the laser beam of the LD 712 to amplify the WDM optical signal of the C-band. The GEQ 686 compensates the gain wavelength characteristics curves of the EDFs 684 and 693 so that they are generally flat.

The CPL 687 branches the amplified WDM optical signal of the C-band. Of these branched WDM optical signals, one is inputted to a VAT 688 whereas the other is inputted through the ATT 702 to a PD 716.

The output of the PD 716 is inputted to the AGC 713 and the gain/output controlling circuit 723. The AGC 713 adjusts the gain of the EDF 684 to a predetermined constant gain by judging the gain of the EDF 684 from the output of the PD 716 and the output of the PD 711 to adjust the driving current (or the injection current) of the LD 712.

The WDM optical signal in the C-band, as attenuated by the VAT 688, is inputted to a CPL 689. Of the WDM optical signals branched by the CPL 689, one is inputted to a PD 717 whereas the other is inputted to a CPL 691. The output of the PD 717 is inputted to the gain/output controlling circuit 723.

The WDM optical signal in the C-band, as outputted from the CPL 691, is inputted through an ISO 692 and the EDF 693 to a CPL 694.

Here is inputted to the CPL 694 a laser beam in which the laser beam of an LD 719 and that of an LD 720 respectively in a polarization state are combined by a CPL 705 so that they cross orthogonal to each other. The laser beam thus combined is supplied through the CPL 694 to the EDF 693. As a result, the EDF 693 is backward pumped with that laser beam to amplify the WDM optical signal in the C-band. The LDs 719 and 720 oscillate the laser beam of the wavelength of 1,480 nm. The CPL 705 is exemplified by a polarization beam splitter. Moreover, the optical fibers between the LDs 719 and 720 and the CPL 705 are exemplified by the polarization maintaining fibers.

Where the laser beam outputted from the CPL 694 cannot excite the EDF 693 sufficiently, that is, where the WDM optical signal of the C-band cannot be sufficiently amplified by the EDF 693 because of a low population inversion density, a pump light is further supplied from a terminal BST-In1.

The pump light from the terminal BST-In1 is inputted to a CPL 690 to the CPL 691. This CPL 691 combines the WDM optical signal of the C-band of the CPL 689 and the pump light and supplies the pump light through the ISO 692 to the EDF 693. As a result, the pump light from the terminal BST-IN1 pumps the EDF 693 forward.

A portion of the pump light at the terminal BST-IN1 is branched by the CPL 690 and is inputted through the ATT 704 to a PD 718. The output of this PD 718 is outputted to the terminal PD-Out1. The output of the terminal PD-Out1 is utilized to set the optical level of the aforementioned pump light to a predetermined constant value so that the optical level may be controlled.

The amplified WDM optical signal of the C-band is outputted from the CPL 694 through an ISO 695 to a CPL 696. Of the WDM optical signals branched by the CPL, one is outputted as the output light of the optical amplifying apparatus 533-n1 through CPLs 697, 698 and 699 to an MUX 534, whereas the other is outputted through the ATT 706 to a PD 724. The output of this PD 724 is inputted to the gain/output controlling circuit 723.

The CPL 697 wavelength-multiplexes the supervising signal for the C-band, as inputted from the terminal SV-In1, and the WDM optical signal in the C-band, as outputted from the CPL 696.

The supervising signal for the C-band, as outputted from the terminal SV-Out1 (FIG. 24), is converted from the optical signals into electric signals, from which the information for running/maintaining operations is extracted. These running/maintaining information is utilized in the optical repeater station 503, in which they are updated to be sent. These updated running/maintaining information is converted again from the electric signals to the optical signal and is inputted as the supervising signal for the C-band to the terminal SV-In1.

The CPL 698 inputs the return light from the CPL 699 to a PD 725. This PD 725 receives and converts the return light photoelectrically. The output of the PD 725 is inputted to an LD controlling circuit 721. On the basis of the magnitude of the output of the PD 725, the LD controlling circuit 721 judges the connection state of the output side of the back optical amplifying part 604 and judges that nothing is connected with the output side of the back optical amplifying part 604, if the output of the PD 725 exceeds a predetermined threshold value. If the output of the PD 725 is below the predetermined threshold value, on the other hand, the LD controlling circuit 721 controls the LDs 719 and 720 with the signal of the gain/output controlling circuit 723.

The LD controlling circuit 721 reduces the driving currents of the LD 719 and 720 if it judges that nothing is connected with the output side of the back optical amplifying part 604. As a result, the gain of the EDF 693 lowers. As a result, the optical level of the WDM optical signal of the C-band, as outputted from the back optical amplifying part 604, becomes so low that the safety for the worker handling the optical repeater station 503 can be retained.

The CPL 699 outputs a portion of the inputted WDM optical signal of the C-band to the terminal SA-Out2.

The gain/output controlling circuit 723 judges the gain of the EDF 684 from the outputs of the PDs 716 and 711 and the gain of the EDF 693 from the outputs of the PDS 724 and 717, and outputs a signal to the LD controlling circuit 721 so that the sum of the gain of the EDF 684 and the gain of the EDF 693 may be constant. On the basis of this signal, the LD controlling circuit 721 adjusts the driving currents (or the injection currents) of the LDs 719 and 720 and accordingly the gain of the EDF 694.

The gain/output controlling circuit 723 outputs a signal, as based on the output of the PD 724, to the ALC 703. This ALC 703 compares a predetermined reference voltage Vref10 and the output of the gain/output controlling circuit 723 to adjust the attenuation amount of the VAT 688 so that the optical level per channel of the WDM optical signal of the C-band, as outputted from the optical amplifying apparatus 535-n1, may be constant. The reference voltage Vref10 is a voltage value to be referred to so as to set a constant output light level with respect to the input light level of the back optical amplifying part 604.

Here will be described the construction of an optical amplifying apparatus 533-2 for the L-band for amplifying the WDM optical signal of the L-band.

The difference between the optical amplifying apparatus 533-2 for the L-band and the optical amplifying apparatus 533-1 for the C-band resides mainly in the construction of a gain equalizer and in the manner how to supply the pump light for exciting the EDF.

In FIGS. 23 and 26, the supervising signal for the L-band and the WDM optical signal for the L-band, as wavelength divided in the DEMUX of the complex optical amplifying apparatus 516, are inputted to a CPL 811 in the front optical amplifying part 605 for the L-band.

The CPL 811 wavelength-divides the supervising signal for the L-band and the WDM optical signal in the L-band. The wavelength-divided supervising signal is outputted to the terminal SV-Out2 through a BPF 824 functioning like the BPF 621. This BPF 824 is set at the center wavelength of its bandwidth to the wavelength of the supervising signal for the L-band.

The wavelength-divided WDM optical signal in the L-band is inputted through a CPL 812, an ISO 813, a CPL 814 and an EDF 834 to a CPL 839. The CPL 812 outputs a portion of the inputted WDM optical signal through a BPF 820 to a PD 831. The transmission bandwidth of the BPF 820 is so set to the L-band as to eliminate the supervising signal for the L-band. The PD 831 converts the received WDM optical signal photoelectrically, and its output is inputted to a variable gain amplifier 832 and an SW 833.

This SW 833 is a switch having one input and four outputs. These four output terminals of the SW 833 are individually connected with any of resistors: a resistor 835 of a resistance R6; a resistor 836 of a resistance R7; a resistor 837 of a resistance R8; and a resistor 838 of a resistance R9, which are individually grounded to the earth. The resistances R6 to R9 are determined according to the modes of the input lights of the optical amplifying apparatus 533-n2 for the L-band.

The gain of the variable gain amplifier 832 is made so variable that the gain from the PD 831 to the output of the gain variable amplifier 832 may be kept constant when the SW 833 is switched.

The CPL 814 supplies the EDF 834 with the laser beam of the wavelength of 980 nm, as inputted from an LD 825 through the FBG 821. The CPL 839 also supplies the EDF 834 with the laser beam of the wavelength of 1,460 nm, as inputted from an LD 826 through the FBG 822. The EDF 834 is pumped forward by the LD 825 and backward by the LD 826. The EDF 834 is excited with the laser beams of the LDs 825 and 826 to amplify the WDM optical signal in the L-band.

In order to amplify the bandwidth of the L-band, the EDF 834 has longer optical fibers than those of the EDFS 615, 654, 684 and 693 for amplifying the bandwidth of the C-band. The EDF 834 is thus elongated because it intrinsically has an amplifying bandwidth at the bandwidth of the C-band and the bandwidth of the L-band, the gain of which is smaller of the latter than of the former. Therefore, the length of the optical fibers of the EDF 834 has to be longer, more specifically about ten times longer than that of the EDF of the bandwidth of the C-band so that the optical amplification in the bandwidth of the L-band may be substantially equalized to that in the bandwidth of the C-band. EDFs 854, 884 and 894 are elongated like the EDF 834.

The WDM optical signal in the L-band, as outputted from the CPL 839, is inputted through an ISO 815, a GEQ 816, an ISO 817 and a GEQ 818 to a CPL 819. The set of the GEQ 816, the ISO 817 and the GEQ 8181 equalizes the gain wavelength characteristics curves of the EDFs 834 and 854. The reason why the ISO 817 is interposed between the two GEQs 816 and 818 is to prevent the loss wavelength characteristics of the GEQ 818 from being changed by the reflected light of the GEQ 816 and the loss wavelength characteristics of the GEQ 816 from being changed by the reflected light of the GEQ 818. Here, the GEQ may be only one where the gain wavelength characteristics of the EDF 834 can be equalized to such an extent that the optical amplifying apparatus 533-2 is demanded.

The CPL 819 branches the inputted WDM optical signal in the L-band into two, one of which is inputted to a VAT 841 in the front optical attenuating part 606 for the L-band and the other of which is inputted through the ATT 623 to a PD 830. The output of this PD 830 is inputted to an AGC 827 and the gain/output controlling circuit 826.

The AGC 827 judges the gain of the EDF 834 from the output of the PD 830 and the output of the PD 831 through the variable gain amplifier 832. On the basis of this judgment result, the AGC 827 adjusts the driving currents (or the injection currents) of the LDs 825 and 826 to adjust the gain of the EDF 834 to a predetermined constant gain. This predetermined gain is set while being considered to reduce the noise figure of the WDM optical signal in the L-band at the low optical level, as inputted to the optical amplifying apparatus 533-n2.

Next, the construction of the front optical attenuating part 606 will be described with reference to FIG. 26.

The WDM optical signal of the L-band, as outputted from the CPL 819, is inputted to the VAT 841 in the front optical attenuating part 606. The VAT 841 attenuates and outputs the inputted WDM optical signal to a CPL 851 in the middle optical amplifying part 607 for the L-band.

Here, the output according to the output light level of the WDM optical signal of the L-band, as outputted from the middle optical amplifying part 607 to the back optical attenuating part 608, is inputted from a PD 869 in the middle optical amplifying part 607 to a gain/output controlling circuit 868.

This gain/output controlling circuit 868 converts the output of the PD 869 into a logarithmic value of the voltage level, and the converted logarithmic value is inputted to one input terminal of an ALC 843. This ALC 843 compares a predetermined reference voltage Vref11 and the output value of the gain/output controlling circuit 868 thereby to adjust the attenuation amount of the VAT 841 so that the optical level per channel of the WDM optical signal of the L-band to be outputted from the middle optical amplifying part 607 may be constant. The reference voltage Vref11 is a voltage value to be referred to when the output light level of the portion composed of the front optical amplifying part 605, the front optical attenuating part 606 and the middle optical amplifying part 607 (i.e., the output light level to be outputted from the CPL 858 to the back optical attenuating part 608) may be the first target value, and is prepared in number equal to that of the input light modes. For example, a reference voltage Vref11M1 for the in-mode 1 is prepared for the in-mode 1, and a reference voltage Vref11M2 for the in-mode 2 is prepared for the in-mode 2.

Next, the construction of the middle optical amplifying part 607 for the L-band will be described with reference to FIG. 26.

The WDM optical signal of the L-band, as outputted from the VAT 841, is inputted to the CPL 851 in the middle optical amplifying part 607.

Of the WDM optical signals branched by the CPL 851, one is inputted to a PD 861 whereas the other is inputted through an ISO 852, a CPL 853, the EDF 854 and an ISO 855 to a CPL 856. The output of the PD 861 is outputted to the gain/output controlling circuit 868. The CPL 853 supplies the EDF 854 with a laser beam of the wavelength of 1,460 nm inputted from an LD 862. This EDF 854 is excited with the laser beam to amplify the WDM optical signal of the L-band.

The CPL 856 branches the inputted WDM optical signal of the L-band into two, one of which is inputted through a BPF 863 and the ATT 865 to the PD 869. The transmission bandwidth of the BPF 863 is set to the bandwidth of the L-band. The output of the PD 869 is inputted to the gain/output controlling circuit 868.

This gain/output controlling circuit 868 judges the gain of the front optical amplifying part 605 from the outputs of the PDs 830 and 831 and the gain of the middle optical amplifying part 607 from the outputs of the PD 869 and 861, and outputs a signal to an LD controlling circuit 866 so that the sum of the gain of the front optical amplifying part 605 and the gain of the middle optical amplifying part 607 may be constant. On the basis of this signal, the LD controlling circuit 866 adjusts the driving current (or the injection current) of the LD 862 to adjust the gain of the EDF 854.

The other of the WDM optical signal in the L-band divided in the CPL 856 is inputted as the output of the middle optical amplifying part 607 through the CPLs 857 and 858 to the ATT 871 in the back optical attenuating part 608 for the L-band. The CPL 857 inputs the return light from the CPL 858 to a PD 864. The output of this PD 864 is inputted to the LD controlling circuit 866.

On the basis of the magnitude of the output of the PD 864, the LD controlling circuit 866 judges the connection state of the output side of the middle optical amplifying part 607. The LD controlling circuit 866 judges that nothing is connected with the output side of the middle optical amplifying part 607, if the output of the PD 864 exceeds a predetermined threshold value. Under this judgment, the LD controlling circuit 866 reduces the driving current of the LD 862. As a result, the gain of the EDF 854 lowers. Therefore, the optical level of the WDM optical signal of the L-band, as outputted from the middle optical amplifying part 607, lowers so remarkably that the safety for the operator handling the optical repeater station 503 can be retained. Where the output of the PD 864 does not exceed the predetermined threshold value, on the other hand, the LD controlling circuit 866 controls the LD 862 with the signal of the gain/output controlling circuit 868.

The CPL 858 outputs a portion of the WDM optical signal in the L-band to a terminal SA-Out2.

Next, the construction of the back optical attenuating part 608 for the L-band will be described with reference to FIG. 27.

The WDM optical signal of the L-band, as outputted from the CPL 858, is outputted through an ATT 871 to a CPL 881 in the back optical amplifying part 609 for the L-band.

The ATT 871 is prepared for each input light mode, and the attenuation amount of the ATT 871 for the in-mode 1 is set considering the output light level of the optical amplifying apparatus 533-n2 for the L-band. The optical attenuation amount of the ATT 871 for the in-mode 2 is set higher than that of the ATT 871 for the in-mode 1 by the value which is calculated in the back optical attenuating part 608 for the L-band by subtracting the input light level of the case of the in-mode 1 from the input light level of the case of the in-mode 2.

Next, the construction of the back optical amplifying part 609 for the L-band will be described with reference to FIG. 27.

The WDM optical signal of the L-band, as outputted from the ATT 871, is inputted to the CPL 881 in the back optical amplifying part 609.

Of the WDM optical signals branched by the CPL 881, one is inputted to a PD 901 whereas the other is inputted through an ISO 882, a CPL 883, an EDF 884, an ISO 885 and a GEQ 886 to a CPL 887.

The output of the PD 901 is outputted to an AGC 903 and a gain/output controlling circuit 925. The CPL 883 supplies the EDF 884 with the laser beam of an LD 902, as inputted through the FBG 891. The LD 902 oscillates the laser beam of a wavelength of 980 nm. The EDF 884 is excited with the laser beam of the LD 902 to amplify the WDM optical signal of the L-band. The GEQ 886 compensates the gain wavelength characteristics curves of the EDFs 884 and 894 so that they are generally flat.

The CPL 887 branches the amplified WDM optical signal of the L-band. Of these branched WDM optical signals, one is inputted to a VAT 888 whereas the other is inputted through the ATT 892 to a PD 907.

The output of the PD 907 is inputted to the AGC 903 and the gain/output controlling circuit 925. The AGC 903 adjusts the gain of the EDF 884 to a predetermined constant gain by judging the gain of the EDF 884 from the output of the PD 907 and the output of the PD 901 to adjust the driving current (or the injection current) of the LD 902.

The WDM optical signal of the L-band, as attenuated by the VAT 888, is inputted to a CPL 889. Of the WDM optical signals branched by the CPL 889, one is inputted to a PD 908 whereas the other is inputted to a CPL 892. The output of the PD 908 is inputted to the gain/output controlling circuit 925.

On the other hand, LDs 910 and 911 oscillate laser beams of the wavelength of 1,460 nm, which are combined by a CPL 895 and inputted through the CPL 891 to the CPL 892. The CPL 895 for the combining is exemplified by a polarization beam splitter. The optical fibers between the LDs 910 and 911 and the CPL 895 are exemplified by the polarization maintaining optical fibers.

The CPL 892 combines the WDM optical signal in the L-band of the CPL 889 and the laser beams of the LDs 910 and 911 through the CPLs 895 and 891. The combined light is inputted through an ISO 893, the EDF 894, the CPL 895 and an ISO 896 to a CPL 897. As a result, the EDF 894 is pumped forward with the laser beams of the LDs 910 and 911 to amplify the WDM optical signal of the L-band.

Here, where the WDM optical signal of the L-band cannot be sufficiently amplified by the EDF 894 because this EDF 894 cannot be sufficiently excited with the laser beams of the LDs 910 and 911, there are further supplied the pump light of a terminal BST-In2 and/or the pump light of a terminal BST-In3.

The pump light of the terminal BST-In2 is inputted through a CPL 890 to the CPL 891. This CPL 891 combines the laser beams of the LDs 910 and 911, as inputted through the CPL 895, and the pump light. The combined light is supplied through the CPL 892 and the ISO 893 to the EDF 894. As a result, the pump light of the terminal BST-In2 pumps the EDF 894 forward. A portion of the pump light of the terminal BST-In2 is branched by the CPL 890 and inputted through the ATT 894 to a PD 909. The output of the PD 909 is outputted to a terminal PD-Out2.

The pump light of the terminal BST-In3 is supplied through the CPLs 896 and 895 to the EDF 894. As a result, the pump light of the terminal BST-In3 pumps the EDF 894 backward. The CPL 896 branches a portion of the pump light of the terminal BST-In3 through the ATT 912 to a PD 915. This PD 915 converts the received pump light photoelectrically, and its output is outputted to a terminal PD-Out3.

The CPL 897 branches the inputted WDM optical signal of the L-band into two. One of the branched WDM optical signals is outputted as the output light of the optical amplifying apparatus 533-n2 through CPLs 898, 899 and 890 to the MUX 534 (FIG. 23), whereas the other is outputted through the BPF 897 and the ATT 913 to a PD 916. The output of this PD 916 is inputted to the gain/output controlling circuit 925.

The CPL 898 wavelength-multiplexes the supervising signal for the L-band, as inputted to a terminal SV-In2, with the WDM optical signal of the L-band, as outputted from the CPL 897. The supervising signal for the L-band is the optical signal which is outputted from the terminal SV-Out2 (FIG. 26), utilized/updated in the optical repeater station 503 and inputted to the terminal SV-In2.

The CPL 899 inputs the return light from the CPL 890 to a PD 914. This PD 914 receives and converts the return light photoelectrically. The output of the PD 914 is inputted to an LD controlling circuit 920. On the basis of the magnitude of the output of the PD 914, the LD controlling circuit 920 judges the connection condition of the output side of the back optical amplifying part 609 and judges that nothing is connected with the output side of the back optical amplifying part 609, if the output of the PD 914 exceeds a predetermined threshold value. If the output of the PD 914 is below the predetermined threshold value, on the other hand, the LD controlling circuit 920 controls the LDs 910 and 911 with the signal of the gain/output controlling circuit 925.

The LD controlling circuit 920 reduces the driving currents of the LD 910 and 911 if it judges that nothing is connected with the output side of the back optical amplifying part 609. As a result, the gain of the EDF 894 lowers. As a result, the optical level of the WDM optical signal of the L-band, as outputted from the back optical amplifying part 609, becomes so low that the safety for the worker handling the optical repeater station 503 can be retained.

The CPL 890 outputs a portion of the inputted WDM optical signal of the L-band to the terminal SA-Out4.

The gain/output controlling circuit 925 judges the gain of the EDF 884 from the outputs of the PDs 907 and 901 and the gain of the EDF 894 from the outputs of the PDs 916 and 908, and outputs a signal to the LD controlling circuit 920 so that the sum of the gain of the EDF 884 and the gain of the EDF 894 may be constant. On the basis of this signal, the LD controlling circuit 920 adjusts the driving currents (or the injection currents) of the LDs 910 and 911 and accordingly the gain of the EDF 894.

The gain/output controlling circuit 925 outputs a signal, as based on the output of the PD 916, to the ALC 893. This ALC 893 compares a predetermined reference voltage Vref 12 and the output of the gain/output controlling circuit 925 to adjust the attenuation amount of the VAT 888 so that the optical level per channel of the WDM optical signal of the L-band, as outputted from the optical amplifying apparatus 535-n2, may be constant.

Here will be described the complex optical amplifying apparatus 513.

The difference between the complex optical amplifying apparatus 513 and the complex optical amplifying apparatus 516 resides in that the complex optical amplifying apparatus 513 is provided with neither the DEMUX 532 nor the CPLs 611 and 811 and the BPFs 621 and 824 in the front optical amplifying parts 600 and 605.

The complex optical amplifying apparatus 513 is not provided with the DEMUX 532, because the WDM optical signal in the individual bands are individually generated in the optical sending station 501 by the OS 521 and the MUX 522 so that the WDM optical signal in the individual bands need not be wavelength-divided from the WDM optical signal in the two bandwidths. The complex optical amplifying apparatus 513 is not provided with the CPLs 611 and 811 and the BPFs 621 and 824, because the supervising signals for the individual bands are not generated before the optical sending station 501 so that the supervising signals and the WDM optical signal need not be wavelength-divided.

Therefore, the complex optical amplifying apparatus 513 is provided with an optical amplifying apparatus 523 and the MUX 524. In the corresponding relations between the complex optical amplifying apparatus 513 and the complex optical amplifying apparatus 516: the optical amplifying apparatus 523-1 corresponds to the optical amplifying apparatus 533-n1; the optical amplifying apparatus 523-2 corresponds to the optical amplifying apparatus 533-n2; and the MUX 524 corresponds to the MUX 534.

Here will be described the complex optical amplifying apparatus 517.

The difference between the complex optical amplifying apparatus 517 and the complex optical amplifying apparatus 516 resides in that the complex optical amplifying apparatus 517 is provided with neither the MUX 534 nor the CPLs 697 and 898 in the back optical amplifying parts 600 and 605.

The complex optical amplifying apparatus 517 is not provided with the MUX 534, because the individual optical signal in the WDM optical signal is received/processed in the optical receiving station 504 by an OR 549, as has been described herein before, so that the WDM optical signal in the individual bands need not be so wavelength-multiplexed over the WDM optical signal in the two bandwidths that they may be transmitted again to the optical transmission line. The complex optical amplifying apparatus 517 is not provided with the CPLs 697 and 898, because the supervising signals for the individual bands need not be transmitted any more to the optical transmission line.

Therefore, the complex optical amplifying apparatus 517 is provided with the DEMUX 542 and the optical amplifying apparatus 543.

In the corresponding relations between the complex optical amplifying apparatus 517 and the complex optical amplifying apparatus 516: the DEMUX 542 corresponds to the DEMUX 532; the optical amplifying apparatus 543-1 corresponds to the optical amplifying apparatus 533-n1; and the optical amplifying apparatus 543-2 corresponds to the optical amplifying apparatus 533-n2.

Operations and Effects of Seventh Embodiment

This optical communication system is provided at the optical sending station 501 with the optical amplifying apparatus 523-1 and 523-2 so that the input light mode of the complex optical amplifying apparatus 513 can accord to the output light levels of the MUXex 522-1 and 522-2, and so that the output light mode of the complex optical amplifying apparatus 513 can accord to the input light level of the optical transmission line 502-1.

The optical repeater station 503 is provided with the optical amplifying apparatus 533-n1 and 533-n2 so that the input light mode of the complex optical amplifying apparatus 516 can accord to the output light level of the optical transmission line 502 on the input side and so that the output light mode of the complex optical amplifying apparatus 516 can accord to the input light level of the optical transmission line 502 on the output side.

The optical receiving station 504 is provided with the optical amplifying apparatus 543-1 and 543-2 so that the input light mode of the complex optical amplifying apparatus 517 can accord to the output light level of the optical transmission line 502 and so that the output light mode of the complex optical amplifying apparatus 517 can accord to the input light levels of the DEMUXes 548-1 and 548-2.

Here, the operations and effects of the individual optical amplifying apparatus 523, 533 and 543 in the seventh embodiment are similar in the individual in-modes and in the individual out-modes to those of the second to fifth embodiments so that their description will be omitted.

Therefore, this optical communication system can match the various optical transmission lines 502 such as the SMF or the NZ-DSF. As a result, the existing optical transmission lines can be effectively exploited. In this optical communication system, moreover, the degradation of the noise figure to occur in the complex optical amplifying apparatus 513, 516 and 517 can be suppressed to allow a longer-distance transmission and to reduce the number of optical repeater stations.

In the case of the transmission of the WDM optical signal in a wide bandwidth such as the WDM optical signal in two bandwidths, the optical level of the channel on the shorter wavelength side is lowered with a rise in the optical level of the channel on the lower wavelength side by the stimulated Raman scattering. Therefore, the optical amplifying apparatus for amplifying the WDM optical signal in the wide bandwidth is demanded to have a wide input dynamic range. The complex optical amplifying apparatus in the seventh embodiment is suited for amplifying the WDM optical signal in the wide bandwidth because it has the wide input dynamic range.

The complex optical amplifying apparatus 523, 533 and 543 in the seventh embodiment are provided at the middle optical amplifying parts 602 and 607 and the back optical amplifying parts 604 and 609 with the functions to lower the optical levels of the laser beams to be outputted, by detecting the opening of the output side. Even where the ATTs 671 and 871 in the back optical attenuating parts 603 and 608 are replaced because the change into the in-mode or the out-mode makes it necessary to change the attenuation amounts of the ATTs 671 and 871, therefore, the safety for the operator can be ensured.

Here in the seventh embodiment, the WDM optical signal arranged in the C-band and the WDM optical signal arranged in the L-band is transmitted in the same direction but may be transmitted in the opposite directions. For example, the WDM optical signal in the C-band is transmitted upward whereas the WDM optical signal in the L-band is transmitted downward.

In the seventh embodiment, on the other hand, the attenuation amounts in the back optical attenuating parts 603 and 608 are changed when the complex optical amplifying apparatus is installed in the optical communication system, but may be automatically changed by the VATs 173, 252 and 262 as in the back optical attenuating parts 106, 108 and 109.

Where such VATs are utilized, moreover, the functions to lower the optical levels of the laser beams outputted, automatically can be omitted by detecting the opening of the output side belonging to the middle optical amplifying part.

On the other hand, the seventh embodiment has been described on the case in which the back optical attenuating parts 603 and 608 have only the function to attenuate the light. However, the function to compensate the chromatic dispersion may be added by providing the back optical attenuating part 108 with the DCF. By adding the OADM as in the back optical attenuating part 109, the optical repeater station can be modified to have the function to drop/add the channels from the WDM optical signal to be transmitted through the optical repeater station.

In the second to fifth embodiments, moreover, the WDM optical signal is arranged in the bandwidth of the C-band, but the invention should not be limited to this arrangement. The invention can be applied to the arrangement where the WDM optical signal is in any bandwidth. The EDF for amplifying the WDM optical signal is suitably selected according to the bandwidth of the WDM optical signal. Where the WDM optical signal is arranged in the bandwidth of the L-band (from 1,570 to 1,610 nm), for example, it is possible to utilize an gain-shift erbium-doped fibers. Where WDM optical signal is arranged in the bandwidth of the S+–band (1,450 to 1,490 nm), it is possible to utilize the thulium-doped fiber amplifier for amplifying the bandwidth of the S+–band. The oscillatory wavelength of the LD or the pump source is suitably selected.

In the second embodiment, on the other hand, the attenuation amount of the back optical attenuating part 104 is constructed to replace the ATT 171 in accordance with the input light mode when the optical amplifying apparatus 301 is to be installed. In the back optical attenuating part 106 of the third embodiment, however, the VAT may be used in place of the ATT 171 to change the attenuation amount. In the third embodiment, on the contrary, the ATT may be used in place of the VAT 173 for the attenuation amount of the back optical attenuating part 106 and may be replaced according to the input light mode when the optical amplifying apparatus 302 is installed as in the second embodiment.

In the second to fifth embodiments, moreover, the adjustments of the attenuation amounts of the back optical attenuating parts 104, 106, 108 and 109 may be made by using a semi-stationary optical attenuator so that the attenuation amount of the semi-stationary optical attenuator may be adjusted according to the input light mode when the optical amplifying apparatus 301, 302, 303 and 304 are installed. The VAT itself may be supplied with a predetermined voltage to adjust the attenuation amount.

In the second to fifth embodiments, on the other hand, the output light level of the middle optical amplifying part 103 is made to change the reference voltage Vref2 according to the input light mode when the optical amplifying apparatus 301, 302, 303 and 304 are installed. In accordance with the mode of each input light, however, the reference voltage Vref2 may be determined, and a control circuit may be provided for switching the determined reference voltage Vref2 by detecting the input light level of the front optical amplifying part 101. This optical amplifying apparatus is enabled to switch the input light mode automatically by that control circuit.

The invention is not limited to the above embodiments and various modifications may be made without departing from the spirit and scope of the invention. Any improvement may be made in part or all of the components.

What is claimed is:

1. An optical amplifying apparatus comprising:
   a first optical amplifying part for changing the target value of output light level when input light level reaches a predetermined value;
   an optical attenuating part for attenuating the output light of said first optical amplifying part;
   a second optical amplifying part for amplifying the output light of said optical attenuating part; and
   a controlling part for changing the attenuation amount of said optical attenuating part, and wherein
      said controlling part changes the attenuation amount of said optical attenuating part in accordance with a difference between the target value and the changed target value, when the target value of the output light level of said first optical amplifying part is changed.

2. An optical amplifying apparatus according to claim 1, wherein
   said predetermined value of said input light level is a value within one of a plurality of divided ranges of input light level; and
   one said target value of output light level of said first optical amplifying part is respectively set in every divided range.

3. An optical amplifying apparatus according to claim 1, wherein the output light of said optical attenuating part has a constant value irrespective of said target value of said output light level of said first optical amplifying part.

4. An optical amplifying apparatus according to claim 1,
   wherein said second optical amplifying part amplifies the output light of said optical attenuating part to a predetermined target value, and
   wherein said controlling part changes the attenuation amount of said optical attenuating part in accordance with the total value of said difference between said target value and said changed target value of said output light level of said first optical amplifying part and a difference between the target value and the changed target value of said second optical amplifying part, when the target value of said output light level of said second optical amplifying part is changed.

5. An optical amplifying apparatus comprising:
   a first optical amplifying part;
   an optical attenuating part for attenuating the output light of said first optical amplifying part;
   a second optical amplifying part for amplifying the output light of said optical attenuating part to a predetermined target value; and
   a controlling part for changing the attenuation amount of said optical attenuating part, and wherein said controlling part changes the attenuation amount of said optical attenuating part in accordance with a difference between the target value and the changed target value, when the target value of the output light level of said second optical amplifying part is changed.

6. An optical amplifying apparatus according to claim 2, wherein
said second optical amplifying part amplifies the output light of said optical attenuating part to a predetermined target value; and
said controlling part changes the attenuation amount of said optical attenuating part in accordance with the total value of said difference between said target value and said changed target value of said output light level of said first optical amplifying part and a difference between the target value and the changed target value of the output light level of said second optical amplifying part, when the target value of said output light of said second optical amplifying part is changed.

7. An optical amplifying apparatus according to claim 1, wherein
the input light of said first optical amplifying part is a wavelength-multiplexed optical signal wherein a plurality of optical signals having different wavelengths are wavelength-multiplexed; and
the output light of said second optical amplifying part keeps the output light level of a specific wavelength in said wavelength-multiplexed optical signal at a constant value.

8. An optical amplifying apparatus according to claim 6, wherein
the input light of said first optical amplifying part is a wavelength-multiplexed optical signal wherein a plurality of optical signals having different wavelengths are wavelength-multiplexed; and
the output light of said second optical amplifying part keeps the output light level of a specific wavelength in said wavelength-multiplexed optical signal at a constant value.

9. An optical amplifying apparatus according to claim 1, wherein
the input light of said first optical amplifying part is a wavelength-multiplexed optical signal wherein a plurality of optical signals having different wavelengths are wavelength-multiplexed; and
said second optical amplifying part keeps a gain constant.

10. An optical amplifying apparatus according to claim 6, wherein
the input light of said first optical amplifying part is a wavelength-multiplexed optical signal wherein a plurality of optical signals having different wavelengths are wavelength-multiplexed; and
said second optical amplifying part keeps a gain constant.

11. An optical amplifying apparatus according to claim 1, wherein said first optical amplifying part comprises:
a first optical amplifier and a second optical amplifier for amplifying received light;
an optical attenuator connected between said first optical amplifier and said second optical amplifier; and
a controller for adjusting the attenuation amount of said optical attenuator so that a sum of the gains of said first optical amplifier and said second optical amplifier and the output light of said second optical amplifier are kept constant.

12. An optical amplifying apparatus according to claim 5, wherein said first optical amplifying part comprises:
a first optical amplifier and a second optical amplifier for amplifying received light;
an optical attenuator connected between said first optical amplifier and said second optical amplifier; and
a controller for adjusting the attenuation amount of said optical attenuator so that a sum of the gains of said first optical amplifier and said second optical amplifier and the output light of said second optical amplifier are kept constant.

13. An optical amplifying apparatus according to claim 1, wherein said first optical amplifying part and said second optical amplifying part respectively comprise:
a first optical amplifier and a second optical amplifier for amplifying received light;
an optical attenuator connected between said first optical amplifier and said second optical amplifier; and
a controller for adjusting the attenuation amount of said optical attenuator so that a sum of the gains of said first optical amplifier and said second optical amplifier and the output light of said second optical amplifier are kept constant.

14. An optical amplifying apparatus according to claim 6, wherein said first optical amplifying part and said second optical amplifying part respectively comprise:
a first optical amplifier and a second optical amplifier for amplifying received light;
an optical attenuator connected between said first optical amplifier and said second optical amplifier; and
a controller for adjusting the attenuation amount of said optical attenuator so that a sum of the gains of said first optical amplifier and said second optical amplifier and the output light of said second optical amplifier are kept constant.

15. A wide-band optical amplifying apparatus comprising:
a first optical amplifying part for changing the target value of output light level when input light level reaches a predetermined value;
an optical attenuating part for attenuating the output light of said first optical amplifying part;
a second optical amplifying part for amplifying the output light of said optical attenuating part; and
a controlling part for changing the attenuation amount of said optical attenuating part, and wherein:
said controlling part comprises a plurality of optical amplifying sections for changing the attenuation amount of said optical attenuating part in accordance with a difference between the target value and the changed target value, when the target value of the output light level of said first optical amplifying part is changed; and
each of said optical amplifying section respectively amplifies corresponding input light in which the input light is made by wide-band input light wavelength-dividing into input light each having a band corresponding to each of said optical amplifying section.

16. A wide-band optical amplifying apparatus according to claim 15, wherein
said predetermined value of said input light level is a value within one of a plurality of divided ranges of input light level;
one said target value of output light level of said first optical amplifying part is respectively set in every divided range;

said second optical amplifying part amplifies the output light of said optical attenuating part to a predetermined target value; and said controlling part changes the attenuation amount of said optical attenuating part in accordance with the total value of said difference between said target value and said changed target value of the output light level of said first optical amplifying part and a difference between the target value and the changed target value of the output light level of said second optical amplifying part, when the target value of said output light of said second optical amplifying part is changed.

17. A wide-band optical amplifying apparatus comprising:

a first optical amplifying part for changing the target value of output light level when input light level reaches a predetermined value;

an optical attenuating part for attenuating the output light of said first optical amplifying part;

a second optical amplifying part for amplifying the output light of said optical attenuating part; and a controlling part for changing the attenuation amount of said optical attenuating part, and wherein said controlling part comprises a first optical amplifying section and a second optical amplifying section for changing the attenuation amount of said optical attenuating part in accordance with a difference between the target value and the changed target value, when the target value of the output light level of said first optical amplifying part is changed;

said first optical amplifying section amplifies input light in a first bandwidth; and said second optical amplifying section amplifies input light in a second bandwidth different from said first bandwidth.

18. An optical communication system comprising:

an optical sending station;

an optical transmission line for transmitting the optical signal of said optical sending station;

an optical receiving station for receiving the optical signal transmitted through said optical transmission line; and at least one optical repeater station connected with said optical transmission line, and wherein an optical amplifying apparatus provided in at least one of said optical sending station, said optical receiving station and said optical repeater station comprises:

a first optical amplifying part for changing the target value of output light level when input light level reaches a predetermined value;

an optical attenuating part for attenuating the output light of said first optical amplifying part;

a second optical amplifying part for amplifying the output light of said optical attenuating part; and a controlling part for changing the attenuation amount of said optical attenuating part, and wherein said controlling part changes the attenuation amount of said optical attenuating part in accordance with a difference between the target value and the changed target value, when the target value of the output light level of said first optical amplifying part is changed.

19. An optical communication system according to claim 18, wherein said predetermined value of said input light level is a value within one of a plurality of divided ranges of input light level;

one said target value of output light level of said first optical amplifying part is respectively set in every divided range; and said controlling part changes the attenuation amount of said optical attenuating part in accordance with the total value of said difference between said target value and said changed target value of the output light level of said first optical amplifying part and a difference between the target value and the changed target value of the output light level of said second optical amplifying part, when the target value of said output light of said second optical amplifying part is changed.

20. An optical communication system comprising:

an optical sending station;

an optical transmission line for transmitting an optical signal of said optical sending station;

an optical receiving station for receiving an optical signal transmitted through said optical transmission line; and at least one optical repeater station connected with said optical transmission line, and wherein a wide-band optical amplifying apparatus provided in at least one of said optical sending station, said optical receiving station, and said optical repeater station comprises:

a first optical amplifying part for changing the target value of output light level when input light level reaches a predetermined value;

an optical attenuating part for attenuating the output light of said first optical amplifying part;

a second optical amplifying part for amplifying the output light of said optical attenuating part; and a controlling part for changing the attenuation amount of said optical attenuating part, and wherein:

said controlling part comprises a plurality of optical amplifying apparatus for changing the attenuation amount of said optical attenuating part in accordance with a difference between the target value and the changed target value, when the target value of the output light level of said first optical amplifying part is changed; and each of said optical amplifying apparatus respectively amplifies corresponding input light in which the input light is made by wide-band input light wavelength-dividing into input light each having a band corresponding to each of said optical amplifying apparatus.

21. An optical communication system according to claim 20, wherein said predetermined value of said input light level is a value within one of a plurality of divided ranges of input light level;

one said target value of the output light level of said first optical amplifying part is respectively set in every divided range;

said second optical amplifying part amplifies the output light of said optical attenuating part to a predetermined target value of output light; and said controlling part changes the attenuation amount of said optical attenuating part in accordance with the total value of said difference between said target value and said changed target value of said output light level of said first optical amplifying part and a difference between the target value and the changed target value of the output light level of said second optical amplifying part, when the target value of said output light level of said second optical amplifying part is changed.

22. An optical amplifying apparatus comprising:
- a first optical amplifier amplifying a received input light to thereby output an amplified input light, the first optical amplifier changing a target value of a level of the amplified input light when a level of the received input light reaches a predetermined value;
- an optical attenuator attenuating the amplified input light output from the first optical amplifier by an attenuation amount, to thereby output an attenuated light;
- a second optical amplifier amplifying the attenuated light output from the optical attenuator; and
- a controller, when the target value is changed, changing the attenuation amount of the optical attenuator in accordance with a difference between the target value and the changed target value.

23. An optical amplifying apparatus according to claim 22, wherein
the predetermined value is a value within one of a plurality of divided ranges of input light level; and one said target value is respectively set in every divided range.

24. An optical amplifying apparatus according to claim 22, wherein the attenuated light output from the optical attenuator has a constant value irrespective of the target value.

25. An optical amplifying apparatus according to claim 22, wherein
the second optical amplifier amplifies the attenuated light output from the optical attenuator to a predetermined target value, and
the controller, when the target value of the amplified, attenuated light output from the second optical amplifier is changed, changes the attenuation amount in accordance with a total value of a difference between the target value and the changed target value of the level of the amplified input light output from the first optical amplifier and a difference between the predetermined target value and the changed target value of the amplified, attenuated light output from the second optical amplifier.

26. An optical amplifying apparatus comprising:
- a first optical amplifier amplifying a light, to thereby output an amplified light;
- an optical attenuator attenuating the amplified light output from the first optical amplifier by an attenuation amount, to thereby output an attenuated light;
- a second optical amplifier amplifying the attenuated light output from the optical attenuator to a predetermined target value; and
- a controller, when the target value is changed, changing the attenuation amount in accordance with a difference between the predetermined target value and the changed target value.

27. An optical amplifying apparatus according to claim 23, wherein
the second optical amplifier amplifies the attenuated light output from the optical attenuator to a predetermined target value; and
the controller, when the target value of the amplified, attenuated light output from the second optical amplifier is changed, changes the attenuation amount in accordance with a total value of a difference between the target value and the changed target value of the level of the amplified input light output from the first optical amplifier and a difference between the predetermined target value and the changed target value of the amplified, attenuated light from the second optical amplifier.

28. An optical amplifying apparatus according to claim 22, wherein
the received input light is a wavelength-multiplexed optical signal comprising a plurality of optical signals having different wavelengths multiplexed together; and
a level of a specific wavelength in the wavelength-multiplexed optical signal is maintained constant in the amplified, attenuated light output from the second optical amplifier.

29. An optical amplifying apparatus according to claim 27, wherein
the received input light is a wavelength-multiplexed optical signal comprising a plurality of optical signals having different wavelengths multiplexed together; and
a level of a specific wavelength in the wavelength-multiplexed optical signal is maintained constant in the amplified, attenuated light output from the second optical amplifier.

30. An optical amplifying apparatus according to claim 22, wherein
the received input light is a wavelength-multiplexed optical signal comprising a plurality of optical signals having different wavelengths multiplexed together; and
the second optical amplifier has a constant gain.

31. An optical amplifying apparatus according to claim 27, wherein
the received input light is a wavelength-multiplexed optical signal comprising a plurality of optical signals having different wavelengths multiplexed together; and
the second optical amplifier has a constant gain.

32. An optical amplifying apparatus according to claim 22, wherein the first optical amplifier comprises:
- a first stage optical amplifier which amplifies the received input light, to thereby output a first stage amplified light,
- an optical attenuator optically attenuating the first stage amplified light by an attenuation amount,
- a second stage optical amplifier amplifying the attenuated, first stage amplified light, to thereby output a second stage amplified light, and
- a controller adjusting the attenuation amount so that a sum of gains of the first stage optical amplifier and the second stage optical amplifier are maintained to be constant, and so that a level of the second stage amplified light is maintained to be constant.

33. An optical amplifying apparatus according to claim 26, wherein the first optical amplifier comprises:
- a first stage optical amplifier which amplifies the received light, to thereby output a first stage amplified light,
- an optical attenuator optically attenuating the first stage amplified light by an attenuation amount,
- a second stage optical amplifier amplifying the attenuated, first stage amplified light, to thereby output a second stage amplified light, and
- a controller adjusting the attenuation amount so that a sum of gains of the first stage optical amplifier and the second stage optical amplifier are maintained to be constant, and so that a level of the second stage amplified light is maintained to be constant.

34. An optical amplifying apparatus according to claim 22, wherein each of the first and second optical amplifiers comprise:
a first stage optical amplifier which amplifies received light, to thereby output a first stage amplified light,
an optical attenuator optically attenuating the first stage amplified light by an attenuation amount,
a second stage optical amplifier amplifying the attenuated, first stage amplified light, to thereby output a second stage amplified light, and
a controller adjusting the attenuation amount so that a sum of gains of the first stage optical amplifier and the second stage optical amplifier are maintained to be constant, and so that a level of the second stage amplified light is maintained to be constant.

35. An optical amplifying apparatus according to claim 27, wherein each of the first and second optical amplifiers comprise:
a first stage optical amplifier which amplifies received light, to thereby output a first stage amplified light,
an optical attenuator optically attenuating the first stage amplified light by an attenuation amount,
a second stage optical amplifier amplifying the attenuated, first stage amplified light, to thereby output a second stage amplified light, and
a controller adjusting the attenuation amount so that a sum of gains of the first stage optical amplifier and the second stage optical amplifier are maintained to be constant, and so that a level of the second stage amplified light is maintained to be constant.

36. A wide-band optical amplifying apparatus comprising:
a first optical amplifier amplifying a received input light to thereby output an amplified input light, the first optical amplifier changing a target value of a level of the amplified input light when a level of the received input light reaches a predetermined value;
an optical attenuator attenuating the amplified input light output from the first optical amplifier by an attenuation amount, to thereby output an attenuated light; and
a controller, comprising a plurality of optical amplifying sections, which, when the target value is changed, changes the attenuation amount in accordance with a difference between the target value and the changed target value, the input light being a wavelength division multiplexed light including lights at different wavelengths multiplexed together, the plurality of optical amplifying sections amplifying wavelengths of the input light in a plurality of different wavelength bands, respectively.

37. A wide-band optical amplifying apparatus according to claim 36, wherein
the predetermined value is within one of a plurality of divided ranges of input light level;
one said target value is respectively set in every divided range;
the second optical amplifier amplifies the attenuated light output from the optical attenuator to a predetermined target value; and
the controller, when the target value of the amplified, attenuated light output from the second optical amplifier is changed, changes the attenuation amount in accordance with a total value of a difference between the target value and the changed target value of the level of the amplified input light output from the first optical amplifier and a difference between the predetermined target value and the changed target value of the amplified, attenuated light output from the second optical amplifier.

38. A wide-band optical amplifying apparatus comprising:
a first optical amplifier amplifying a received input light to thereby output an amplified input light, the first optical amplifier changing a target value of a level of the amplified input light when a level of the received input light reaches a predetermined value;
an optical attenuator attenuating the amplified input light output from the first optical amplifier by an attenuation amount, to thereby output an attenuated light;
a second optical amplifier amplifying the attenuated light output from the optical attenuator; and
a controller, comprising a first optical amplifying section and a second optical amplifying section, wherein, when the target value is changed, the controller changes the attenuation amount in accordance with a difference between the target value and the changed target value, the input light being a wavelength division multiplexed light including lights at different wavelengths multiplexed together, the first amplifying section amplifying lights in the input light having wavelengths in a first band, and the second amplifying section amplifying lights in the input light having wavelengths in a second band different from the first band.

39. An optical communication system comprising:
an optical transmission line;
an optical sending station transmitting an optical signal through the transmission line;
an optical receiving station receiving the optical signal transmitted through the transmission line;
an optical repeater positioned along the transmission line between the optical sending station and the optical receiving station, the optical repeater amplifying the optical signal as the optical signal is transmitted through the transmission line, the optical repeater comprising:
a first optical amplifier receiving the optical signal from the transmission line and amplifying the received optical signal to thereby output an amplified optical signal, the first optical amplifier changing a target value of a level of the amplified optical signal when a level of the received optical signal reaches a predetermined value,
an optical attenuator attenuating the amplified optical signal output from the first optical amplifier by an attenuation amount, to thereby output an attenuated light,
a second optical amplifier amplifying the attenuated light output from the optical attenuator, and providing the amplified, attenuated light to the transmission line for transmission to the optical receiving station, and
a controller, when the target value is changed, changing the attenuation amount of the optical attenuator in accordance with a difference between the target value and the changed target value.

40. An optical communication system according to claim 39, wherein
the second optical amplifier amplifies the attenuated light output from the optical attenuator to a predetermined target value, and
the controller, when the target value of the amplified, attenuated light output from the second optical amplifier is changed, changes the attenuation amount in accordance with a total value of a difference between the target value and the changed target value of the level of the amplified optical signal output from the first optical amplifier and a difference between the predetermined target value and the changed target value of the amplified, attenuated light output from the second optical amplifier.

41. An optical communication system comprising:
an optical transmission line;
an optical sending station transmitting an optical signal through the transmission line;
an optical receiving station receiving the optical signal transmitted through the transmission line;
an optical repeater positioned along the transmission line between the optical sending station and the optical receiving station, the optical repeater amplifying the optical signal as the optical signal is transmitted through the transmission line; and
an optical amplifying apparatus positioned in one of the group consisting of the optical sending station, the optical receiving station and the optical repeater, the optical amplifying apparatus comprising
    a first optical amplifier receiving the optical signal and amplifying the received optical signal to thereby output an amplified optical signal, the first optical amplifier changing a target value of a level of the amplified optical signal when a level of the received optical signal reaches a predetermined value,
    an optical attenuator attenuating the amplified optical signal output from the first optical amplifier by an attenuation amount, to thereby output an attenuated light,
    a second optical amplifier amplifying the attenuated light output from the optical attenuator, and
    a controller, comprising a first optical amplifying section and a second optical amplifying section, wherein, when the target value is changed, the controller changes the attenuation amount in accordance with a difference between the target value and the changed target value, the optical signal being a wavelength division multiplexed light including lights at different wavelengths multiplexed together, the first amplifying section amplifying lights in the optical signal having wavelengths in a first band, and the second amplifying section amplifying lights in the optical signal having wavelengths in a second band different from the first band.

42. An optical communication system according to claim 41, wherein
the predetermined value is within one of a plurality of divided ranges;
one said target value is respectively set in every divided range;
the second optical amplifier amplifies the attenuated light output from the optical attenuator to a predetermined target value; and
the controller, when the target value of the amplified, attenuated light output from the second optical amplifier is changed, changes the attenuation amount in accordance with a total value of a difference between the target value and the changed target value of the level of the amplified optical signal output from the first optical amplifier and a difference between the predetermined target value and the changed target value of the amplified, attenuated light output from the second optical amplifier.

43. An optical amplifying apparatus comprising:
a first optical amplifier amplifying a received input light to thereby output an amplified input light, the first optical amplifier changing a target value of a level of the amplified input light when a level of the received input light reaches a predetermined value;
an optical attenuator attenuating the amplified input light output from the first optical amplifier by an attenuation amount, to thereby output an attenuated light;
a second optical amplifier amplifying the attenuated light output from the optical attenuator; and
means, when the target value is changed, for changing the attenuation amount of the optical attenuator in accordance with a difference between the target value and the changed target value.

44. An optical amplifying apparatus comprising:
a first optical amplifier amplifying a light, to thereby output an amplified light;
an optical attenuator attenuating the amplified light output from the first optical amplifier by an attenuation amount, to thereby output an attenuated light;
a second optical amplifier amplifying the attenuated light output from the optical attenuator to a predetermined target value; and
means, when the target value is changed, for changing the attenuation amount in accordance with a difference between the predetermined target value and the changed target value.

45. An apparatus comprising:
a multi-stage optical amplifier comprising:
    a first optical amplifier amplifying a received input light to thereby output an amplified input light, the first optical amplifier changing a target value of a level of the amplified input light when a level of the received input light reaches a predetermined value,
    an optical attenuator attenuating the amplified input light output from the first optical amplifier by an attenuation amount, to thereby output an attenuated light,
    a second optical amplifier amplifying the attenuated light output from the optical attenuator, and
    a controller, when the target value is changed, changing the attenuation amount of the optical attenuator in accordance with a difference between the target value and the changed target value.

46. An apparatus comprising:
a multi-stage optical amplifier comprising:
    a first optical amplifier amplifying a light, to thereby output an amplified light, an optical attenuator attenuating the amplified light output from the first optical amplifier by an attenuation amount, to thereby output an attenuated light,
    a second optical amplifier amplifying the attenuated light output from the optical attenuator to a predetermined target value, and
    a controller, when the target value is changed, changing the attenuation amount in accordance with a difference between the predetermined target value and the changed target value.

47. An apparatus comprising:
a multi-stage optical amplifier comprising:
- a first optical amplifier amplifying a received input light to thereby output an amplified input light, the first optical amplifier changing a target value of a level of the amplified input light when a level of the received input light reaches a predetermined value,
- an optical attenuator attenuating the amplified input light output from the first optical amplifier by an attenuation amount, to thereby output an attenuated light,
- a second optical amplifier amplifying the attenuated light output from the optical attenuator, and
- means, when the target value is changed, for changing the attenuation amount of the optical attenuator in accordance with a difference between the target value and the changed target value.

48. An apparatus comprising:
a multi-stage optical amplifier comprising:
- a first optical amplifier amplifying a light, to thereby output an amplified light,
- an optical attenuator attenuating the amplified light output from the first optical amplifier by an attenuation amount, to thereby output an attenuated light,
- a second optical amplifier amplifying the attenuated light output from the optical attenuator to a predetermined target value, and
- means, when the target value is changed, for changing the attenuation amount in accordance with a difference between the predetermined target value and the changed target value.

* * * * *